(12) United States Patent
Krampotich et al.

(10) Patent No.: US 10,627,593 B2
(45) Date of Patent: Apr. 21, 2020

(54) TELECOMMUNICATIONS ASSEMBLY

(71) Applicant: CommScope Technologies LLC, Hickory, NC (US)

(72) Inventors: Dennis Krampotich, Shakopee, MN (US); Jonathan Walter Coan, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/257,522

(22) Filed: Jan. 25, 2019

(65) Prior Publication Data

US 2019/0302387 A1    Oct. 3, 2019

Related U.S. Application Data

(63) Continuation of application No. 16/153,493, filed on Oct. 5, 2018, now Pat. No. 10,268,014, which is a
(Continued)

(51) Int. Cl.
*G02B 6/44* (2006.01)
*G02B 6/46* (2006.01)

(52) U.S. Cl.
CPC ......... *G02B 6/4457* (2013.01); *G02B 6/4452* (2013.01); *G02B 6/4455* (2013.01);
(Continued)

(58) Field of Classification Search
None
See application file for complete search history.

(56) References Cited

U.S. PATENT DOCUMENTS 1,276,825 A    8/1918    Swope
1,442,999 A    1/1923    Boyle
(Continued)

FOREIGN PATENT DOCUMENTS

CN    1799296 A    7/2006
DE    42 26 368 A1    2/1994
(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
(Continued)

*Primary Examiner* — Jerry Rahll
(74) *Attorney, Agent, or Firm* — Merchant & Gould P.C.

(57) ABSTRACT

A telecommunications assembly includes a chassis defining an interior region and a tray assembly disposed in the interior region. The tray assembly includes a tray and a cable spool assembly. The cable spool assembly is engaged to a base panel of the tray. The cable spool assembly is adapted to rotate relative to the tray. The cable spool assembly includes a hub, a flange engaged to the hub and an adapter module. The flange defines a termination area. The adapter module is engaged to the termination module of the flange. The adapter module is adapted to slide relative to the flange in a direction that is generally parallel to the flange between an extended position and a retracted position.

18 Claims, 33 Drawing Sheets

Related U.S. Application Data continuation of application No. 15/945,891, filed on Apr. 5, 2018, now Pat. No. 10,126,516, which is a continuation of application No. 15/589,582, filed on May 8, 2017, now Pat. No. 9,995,898, which is a continuation of application No. 15/096,707, filed on Apr. 12, 2016, now Pat. No. 9,678,296, which is a continuation of application No. 14/855,971, filed on Sep. 16, 2015, now Pat. No. 9,341,802, which is a continuation of application No. 14/597,936, filed on Jan. 15, 2015, now Pat. No. 9,170,392, which is a continuation of application No. 14/060,223, filed on Oct. 22, 2013, now Pat. No. 8,938,147, which is a continuation of application No. 13/167,550, filed on Jun. 23, 2011, now Pat. No. 8,565,572.

(60) Provisional application No. 61/487,542, filed on May 18, 2011, provisional application No. 61/378,710, filed on Aug. 31, 2010, provisional application No. 61/357,898, filed on Jun. 23, 2010.

(52) U.S. Cl.
CPC .......... *G02B 6/4446* (2013.01); *G02B 6/4448* (2013.01); *G02B 6/4453* (2013.01); *G02B 6/46* (2013.01)

(56) References Cited

U.S. PATENT DOCUMENTS

| | | |
|---|---|---|
| 1,446,410 A | 2/1923 | Bennett et al. |
| 1,474,580 A | 11/1923 | Clark et al. |
| RE20,995 E | 2/1939 | Beasley |
| 2,502,496 A | 4/1950 | Wickman |
| 2,521,226 A | 9/1950 | Keller |
| 2,727,703 A | 12/1955 | Bonnett |
| 3,131,729 A | 5/1964 | Leysinger |
| 3,657,491 A | 4/1972 | Ryder et al. |
| 3,667,417 A | 6/1972 | Clinkenbeard |
| 3,920,308 A | 11/1975 | Murray |
| 3,940,086 A | 2/1976 | Stoqulet |
| 4,053,118 A | 10/1977 | Aikins |
| 4,081,258 A | 3/1978 | Goell et al. |
| 4,201,278 A | 5/1980 | Balde |
| 4,384,688 A | 5/1983 | Smith |
| 4,587,801 A | 5/1986 | Missout et al. |
| 4,635,875 A | 1/1987 | Apple |
| 4,657,140 A | 4/1987 | Zagar et al. |
| 4,666,237 A | 5/1987 | Mallinson |
| 4,767,073 A | 8/1988 | Malzacher |
| 4,869,437 A | 9/1989 | Berz et al. |
| 4,883,337 A | 11/1989 | Dahlgren |
| 4,913,369 A | 4/1990 | Lia et al. |
| 4,939,798 A | 7/1990 | Last |
| 4,940,859 A | 7/1990 | Peterson |
| 4,953,194 A | 8/1990 | Hansen et al. |
| 4,968,929 A | 11/1990 | Hauck et al. |
| 4,978,310 A | 12/1990 | Shichida |
| 5,016,554 A | 5/1991 | Harris, Jr. et al. |
| 5,052,940 A | 10/1991 | Bengal |
| 5,066,149 A | 11/1991 | Wheeler et al. |
| 5,071,211 A | 12/1991 | Debortoli et al. |
| 5,074,863 A | 12/1991 | Dines |
| 5,100,221 A | 3/1992 | Carney et al. |
| 5,107,532 A | 4/1992 | Hansen et al. |
| 5,161,988 A | 11/1992 | Krupka |
| 5,166,970 A | 11/1992 | Ward |
| 5,167,001 A | 11/1992 | Debortoli et al. |
| 5,185,843 A | 2/1993 | Aberson et al. |
| 5,222,164 A | 6/1993 | Bass, Sr. et al. |
| 5,265,187 A | 11/1993 | Morin et al. |
| 5,265,815 A | 11/1993 | Soyka et al. |
| 5,280,861 A | 1/1994 | Corriveau |
| 5,305,405 A | 4/1994 | Emmons et al. |
| 5,317,663 A | 5/1994 | Beard et al. |
| 5,326,040 A | 7/1994 | Kramer |
| 5,335,874 A | 8/1994 | Shrum et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,418,334 A | 5/1995 | Williams |
| 5,419,717 A | 5/1995 | Abendschein et al. |
| 5,434,944 A | 7/1995 | Kerry et al. |
| 5,448,015 A | 9/1995 | Jamet et al. |
| 5,448,675 A | 9/1995 | Leone et al. |
| 5,467,062 A | 11/1995 | Burroughs et al. |
| 5,473,715 A | 12/1995 | Schofield et al. |
| 5,483,467 A | 1/1996 | Krupka et al. |
| 5,490,229 A | 2/1996 | Ghandeharizadeh et al. |
| 5,494,234 A | 2/1996 | Kramer |
| 5,494,446 A | 2/1996 | DeLucia et al. |
| 5,497,444 A | 3/1996 | Wheeler |
| 5,519,275 A | 5/1996 | Scott et al. |
| 5,522,561 A | 6/1996 | Koyamatsu et al. |
| 5,544,836 A | 8/1996 | Pera |
| 5,551,545 A | 9/1996 | Gelfman |
| 5,613,030 A | 3/1997 | Hoffer et al. |
| 5,638,481 A | 6/1997 | Arnett |
| 5,657,412 A | 8/1997 | Caudrelier |
| 5,685,741 A | 11/1997 | Dewey et al. |
| 5,703,990 A | 12/1997 | Robertson et al. |
| 5,709,347 A | 1/1998 | Hoffmann et al. |
| 5,712,942 A | 1/1998 | Jennings et al. |
| 5,717,810 A | 2/1998 | Wheeler |
| 5,718,397 A | 2/1998 | Stevens |
| 5,734,774 A | 3/1998 | Morrell |
| 5,749,148 A | 5/1998 | White, III et al. |
| 5,787,219 A | 7/1998 | Mueller et al. |
| 5,821,510 A | 10/1998 | Cohen et al. |
| 5,854,824 A | 12/1998 | Bengal et al. |
| 5,915,640 A | 6/1999 | Wagter et al. |
| 5,987,203 A | 11/1999 | Abel et al. |
| 5,987,207 A | 11/1999 | Hoke |
| 5,992,787 A | 11/1999 | Burke |
| 6,002,331 A | 12/1999 | Laor |
| 6,077,108 A | 6/2000 | Lorscheider et al. |
| 6,095,837 A | 8/2000 | David et al. |
| 6,116,961 A | 9/2000 | Henneberger et al. |
| 6,215,938 B1 | 4/2001 | Reitmeier et al. |
| 6,220,413 B1 | 4/2001 | Walters et al. |
| 6,222,908 B1 | 4/2001 | Bartolutti et al. |
| 6,222,975 B1 | 4/2001 | Gilbert et al. |
| 6,234,830 B1 | 5/2001 | Ensz et al. |
| 6,238,235 B1 | 5/2001 | Shavit et al. |
| 6,285,293 B1 | 9/2001 | German et al. |
| 6,300,877 B1 | 10/2001 | Schannach et al. |
| 6,315,598 B1 | 11/2001 | Elliot et al. |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,367,347 B1 | 4/2002 | Blaschke et al. |
| 6,421,322 B1 | 7/2002 | Koziy et al. |
| 6,424,710 B1 | 7/2002 | Bartolutti et al. |
| 6,456,768 B1 | 9/2002 | Boncek et al. |
| D466,479 S | 12/2002 | Pein et al. |
| 6,494,396 B2 | 12/2002 | Sugata |
| 6,499,861 B1 | 12/2002 | German et al. |
| 6,511,231 B2 | 1/2003 | Lampert et al. |
| 6,522,737 B1 | 2/2003 | Bartolutti et al. |
| 6,522,826 B2 | 2/2003 | Gregory |
| 6,533,216 B1 | 3/2003 | Bumgarner et al. |
| 6,554,221 B2 | 4/2003 | Hinds |
| 6,554,484 B2 | 4/2003 | Lampert |
| 6,574,586 B1 | 6/2003 | David et al. |
| 6,591,051 B2 | 7/2003 | Solheid et al. |
| 6,616,080 B1 | 9/2003 | Edwards et al. |
| 6,626,697 B1 | 9/2003 | Martin et al. |
| 6,636,152 B2 | 10/2003 | Schannach et al. |
| 6,643,443 B2 | 11/2003 | Holman et al. |
| 6,669,129 B1 | 12/2003 | Shah |
| 6,684,179 B1 | 1/2004 | David |

(56) References Cited

U.S. PATENT DOCUMENTS

| | | |
|---|---|---|
| 6,711,339 B2 | 3/2004 | Puetz et al. |
| 6,715,619 B2 | 4/2004 | Kim et al. |
| 6,725,177 B2 | 4/2004 | David et al. |
| 6,743,044 B2 | 6/2004 | Musolf et al. |
| 6,745,971 B1 | 6/2004 | Renzoni |
| 6,760,530 B1 | 7/2004 | Mandry |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,814,624 B2 | 11/2004 | Clark et al. |
| 6,834,517 B1 | 12/2004 | Sheehy, Jr. |
| 6,845,207 B2 | 1/2005 | Schray |
| 6,850,685 B2 | 2/2005 | Tinucci et al. |
| 6,856,748 B1 | 2/2005 | Elkins, II et al. |
| 6,885,799 B2 | 4/2005 | Lee |
| 6,898,368 B2 | 5/2005 | Colombo et al. |
| 6,901,200 B2 | 5/2005 | Schray |
| 6,905,363 B2 | 6/2005 | Musolf et al. |
| 6,915,058 B2 | 7/2005 | Pons |
| 6,932,517 B2 | 8/2005 | Swayze et al. |
| 6,933,441 B2 | 8/2005 | Fuller et al. |
| 6,937,725 B2 | 8/2005 | Liao |
| D510,068 S | 9/2005 | Haggay et al. |
| 6,944,387 B2 | 9/2005 | Howell et al. |
| 6,961,675 B2 | 11/2005 | David |
| 6,971,895 B2 | 12/2005 | Sago et al. |
| 6,976,867 B2 | 12/2005 | Navarro et al. |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,027,704 B2 | 4/2006 | Frohlich et al. |
| 7,077,710 B2 | 7/2006 | Haggay et al. |
| 7,081,808 B2 | 7/2006 | Colombo et al. |
| 7,112,090 B2 | 9/2006 | Caveney et al. |
| 7,123,810 B2 | 10/2006 | Parrish |
| 7,139,461 B2 | 11/2006 | Puetz et al. |
| 7,142,764 B2 | 11/2006 | Allen et al. |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,210,858 B2 | 5/2007 | Sago et al. |
| 7,220,144 B1 | 5/2007 | Elliot et al. |
| 7,226,217 B1 | 6/2007 | Benton et al. |
| 7,234,944 B2 | 6/2007 | Nordin et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,315,681 B2 | 1/2008 | Kewitsch |
| 7,346,253 B2 | 3/2008 | Bloodsworth et al. |
| 7,352,289 B1 | 4/2008 | Harris |
| 7,364,108 B2 | 4/2008 | Kim et al. |
| 7,369,739 B2 | 5/2008 | Kline et al. |
| 7,370,106 B2 | 5/2008 | Caveney |
| 7,397,997 B2 | 7/2008 | Ferris et al. |
| 7,400,814 B1 | 7/2008 | Hendrickson et al. |
| 7,406,242 B1 | 7/2008 | Braga |
| 7,477,829 B2 | 1/2009 | Kaplan |
| 7,479,032 B2 | 1/2009 | Hoath et al. |
| 7,519,000 B2 | 4/2009 | Caveney et al. |
| 7,522,806 B2 | 4/2009 | Hendrickson et al. |
| 7,533,841 B1 | 5/2009 | Harrison et al. |
| 7,534,137 B2 | 5/2009 | Caveney et al. |
| 7,546,018 B2 | 6/2009 | Hendrickson et al. |
| 7,552,872 B2 | 6/2009 | Tokita et al. |
| 7,570,861 B2 | 8/2009 | Smrha et al. |
| 7,591,667 B2 | 9/2009 | Gatnau Navarro et al. |
| 7,676,136 B2 | 3/2010 | Wakileh et al. |
| 7,697,811 B2 | 4/2010 | Murano et al. |
| 7,711,233 B2 | 5/2010 | Mahoney |
| 7,715,679 B2 | 5/2010 | Kowalczyk et al. |
| 7,751,672 B2 | 7/2010 | Smith et al. |
| 7,756,379 B2 | 7/2010 | Kowalczyk et al. |
| 7,809,234 B2 | 10/2010 | Smith et al. |
| 7,811,119 B2 | 10/2010 | Caveney et al. |
| 7,869,426 B2 | 1/2011 | Hough et al. |
| 7,869,682 B2 | 1/2011 | Kowalczyk et al. |
| 7,872,738 B2 | 1/2011 | Abbott |
| 7,885,505 B2 | 2/2011 | Zimmel |
| 7,894,701 B2 | 2/2011 | Kowalczyk et al. |
| 8,081,857 B2 | 12/2011 | Nair et al. |
| 8,131,126 B2 | 3/2012 | Kowalczyk et al. |
| 8,157,582 B2 | 4/2012 | Frey et al. |
| 8,189,984 B2 | 5/2012 | Kowalczyk et al. |
| 8,229,267 B2 | 7/2012 | Kowalczyk et al. |
| 8,254,740 B2 | 8/2012 | Smith et al. |
| 8,326,107 B2 | 12/2012 | Cooke et al. |
| 8,380,035 B2 | 2/2013 | Kowalczyk et al. |
| 8,422,847 B2 | 4/2013 | Kowalczyk et al. |
| 8,494,333 B2 | 7/2013 | Kowalczyk et al. |
| 8,494,334 B2 | 7/2013 | Kowalczyk et al. |
| 8,565,572 B2 | 10/2013 | Krampotich et al. |
| 8,705,929 B2 | 4/2014 | Kowalczyk et al. |
| 8,891,931 B2 | 11/2014 | Kowalczyk et al. |
| 8,929,706 B2 | 1/2015 | Teymouri |
| 8,938,147 B2 | 1/2015 | Krampotich et al. |
| 9,170,392 B2 | 10/2015 | Krampotich et al. |
| 9,261,663 B2 | 2/2016 | Loeffelholz et al. |
| 9,261,666 B2 | 2/2016 | Kowalczyk et al. |
| 9,341,802 B2 | 5/2016 | Krampotich et al. |
| 2001/0019002 A1 | 9/2001 | Walters et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0126980 A1 | 9/2002 | Holman et al. |
| 2002/0164121 A1 | 11/2002 | Brennan, III et al. |
| 2002/0171002 A1 | 11/2002 | Krestsch et al. |
| 2003/0037480 A1 | 2/2003 | Davis |
| 2004/0170369 A1 | 9/2004 | Pons |
| 2004/0240807 A1 | 12/2004 | Frohlich et al. |
| 2004/0244430 A1 | 12/2004 | Sheehy, Jr. |
| 2004/0258384 A1 | 12/2004 | Trebesch et al. |
| 2005/0103515 A1 | 5/2005 | Fuller et al. |
| 2005/0145522 A1 | 7/2005 | Bloodworth et al. |
| 2005/0184186 A1 | 8/2005 | Tsoi et al. |
| 2005/0213920 A1 | 9/2005 | Tanaka et al. |
| 2005/0247136 A1 | 11/2005 | Cross et al. |
| 2005/0258411 A1 | 11/2005 | Zeitler |
| 2006/0045458 A1 | 3/2006 | Sasaki et al. |
| 2006/0148279 A1 | 7/2006 | German et al. |
| 2006/0160395 A1 | 7/2006 | Macauley et al. |
| 2006/0163403 A1 | 7/2006 | Dickson |
| 2006/0183362 A1 | 8/2006 | Mullaney et al. |
| 2006/0210230 A1 | 9/2006 | Kline et al. |
| 2006/0280418 A1 | 12/2006 | Mahoney |
| 2007/0025675 A1 | 2/2007 | Kramer |
| 2007/0127201 A1 | 6/2007 | Mertesdorf et al. |
| 2007/0165995 A1 | 7/2007 | Reagan et al. |
| 2007/0189691 A1 | 8/2007 | Barth et al. |
| 2007/0237470 A1 | 10/2007 | Aronson et al. |
| 2008/0013909 A1 | 1/2008 | Kostet et al. |
| 2008/0035778 A1 | 2/2008 | Belden et al. |
| 2008/0037945 A1 | 2/2008 | Gniadek et al. |
| 2008/0100467 A1 | 5/2008 | Downie et al. |
| 2008/0218947 A1 | 9/2008 | Atkinson |
| 2008/0236209 A1 | 10/2008 | Conti et al. |
| 2008/0292261 A1 | 11/2008 | Kowalczyk et al. |
| 2008/0315030 A1 | 12/2008 | Hendrickson et al. |
| 2009/0060441 A1 | 3/2009 | Kowalczyk et al. |
| 2009/0074370 A1 | 3/2009 | Kowalczyk et al. |
| 2009/0097846 A1 | 4/2009 | Kozischek et al. |
| 2009/0098763 A1 | 4/2009 | Below et al. |
| 2009/0166404 A1 | 7/2009 | German et al. |
| 2009/0190894 A1 | 7/2009 | Nhep et al. |
| 2009/0215310 A1 | 8/2009 | Hoath et al. |
| 2009/0257726 A1 | 10/2009 | Redmann et al. |
| 2009/0310929 A1 | 12/2009 | Reinhardt et al. |
| 2010/0054680 A1 | 3/2010 | Lochkovic et al. |
| 2010/0054682 A1 | 3/2010 | Cooke |
| 2010/0054684 A1 | 3/2010 | Cooke et al. |
| 2010/0074587 A1 | 3/2010 | Loeffelholz et al. |
| 2010/0090830 A1 | 4/2010 | Conti et al. |

(56) References Cited

U.S. PATENT DOCUMENTS

| | | |
|---|---|---|
| 2010/0166376 A1 | 7/2010 | Nair et al. |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0322583 A1 | 12/2010 | Cooke et al. |
| 2011/0044599 A1 | 2/2011 | Kowalczyk et al. |
| 2011/0092100 A1 | 4/2011 | Coffey et al. |
| 2011/0094274 A1 | 4/2011 | Conti et al. |
| 2011/0103761 A1 | 5/2011 | LeBlanc et al. |
| 2011/0158598 A1 | 6/2011 | LeBlanc et al. |
| 2013/0094828 A1 | 4/2013 | Loeffelholz et al. |
| 2013/0170810 A1 | 7/2013 | Badar et al. |
| 2013/0170811 A1 | 7/2013 | Kowalczyk et al. |
| 2013/0242866 A1 | 9/2013 | Lin et al. |
| 2014/0010512 A1 | 1/2014 | Kowalczyk et al. |
| 2014/0010513 A1 | 1/2014 | Kowalczyk et al. |
| 2015/0063770 A1 | 3/2015 | Kowalczyk et al. |
| 2015/0093088 A1 | 4/2015 | Matz et al. |

FOREIGN PATENT DOCUMENTS

| | | |
|---|---|---|
| DE | 102 44 304 B3 | 3/2004 |
| EP | 1 107 031 A1 | 6/2001 |
| EP | 2 618 195 A2 | 7/2013 |
| FR | 2 566 997 A1 | 1/1986 |
| GB | 2 236 398 A | 4/1991 |
| JP | 9-236709 | 9/1997 |
| JP | 11-349230 | 12/1999 |
| JP | 2003-114339 | 4/2003 |
| JP | 2005-73365 | 3/2005 |
| JP | 2005-249858 | 9/2005 |
| JP | 2007-121609 | 5/2007 |
| WO | WO 2009/048680 A1 | 4/2009 |
| WO | WO 2010/001400 A1 | 1/2010 |
| WO | WO 2010/081186 A1 | 7/2010 |

OTHER PUBLICATIONS

*Avaya's Enhanced SYSTIMAX® iPatch System Enables IT Managers to Optimise Network Efficiency and Cut Downtime,* Press Release, May 20, 2003, obtained from http://www.avaya.com/usa/about-avaya/newsroom/news-releases/2003/pr-030520 on Jan. 7, 2009.
*Intelligent patching systems carving out a 'large' niche,* Cabling Installation & Maintenance, vol. 12, Issue 7, Jul. 2004 (5 pages).
*intelliMAC: The intelligent way to make Moves, Adds or Changes!* NORDX/CDT © 2003 (6 pages).
International Search Report and Written Opinion for PCT/US2010/052872 dated Jan. 12, 2011.
International Search Report and Written Opinion for PCT/US2011/041605 dated Feb. 24, 2012.
Meredith, L., "Managers missing point of intelligent patching," *Daa Center News,* Jun. 21, 2005, obtained Dec. 2, 2008 from http://searchdatacenter.techtarget.com/news/article/0,289142, sid80_gci1099991,00.html.
Ohtsuki, F. et al., "Design of Optical Connectors with ID Modules," *Electronics and Communications in Japan,* Part 1, vol. 77, No. 2, pp. 94-105 (Feb. 1994).
*SYSTIMAX® iPatch System Wins Platinum Network of the Year Award,* Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet; May 2008; 8 pages.
Complaint, *CommScope Technologies LLC v. Clearfield, Inc.,* Case No. 0:17-cv-00307, 77 pages (Jan. 31, 2017).
Complaint Exhibit G, *CommScope Technologies LLC v. Clearfield, Inc.,* Case No. 0:17-cv-00307-PJS-BRT, 3 pages (Jan. 31, 2017).
Complaint Exhibit H, *CommScope Technologies LLC v. Clearfield, Inc.,* Case No. 0:17-cv-00307-PJS-BRT, 3 pages (Jan. 31, 2017).
Answer, *CommScope Technologies LLC v. Clearfield, Inc.,* Case No. 0:17-cv-00307-PJS-BRT, 27 pages (Apr. 24, 2017).
Defendant Clearfield Inc.'s Preliminary Invalidity Claim Charts and Disclosures, *CommScope Technologies LLC v. Clearfield, Inc.,* Case No. 0:17-cv-00307-PJS-BRT, 62 pages (Oct. 6, 2017).
Defendant Clearfield Inc.'s Invalidity Claim Chart Exhibit 10, *CommScope Technologies LLC v. Clearfield, Inc.,* Case No. 0:17-cv-00307-PJS-BRT, 36 pages (Oct. 6, 2017).
Defendant Clearfield Inc.'s Invalidity Claim Chart Exhibit 11, *CommScope Technologies LLC v. Clearfield, Inc.,* Case No. 0:17-cv-00307-PJS-BRT, 60 pages (Oct. 6, 2017).
Defendant Clearfield Inc.'s Invalidity Claim Chart Table D, *CommScope Technologies LLC v. Clearfield, Inc.,* Case No. 0:17-cv-00307-PJS-BRT, 7 pages (Oct. 6, 2017).
Defendant Clearfield Inc.'s Invalidity Claim Chart Table E, *CommScope Technologies LLC v. Clearfield, Inc.,* Case No. 0:17-cv-00307-PJS-BRT, 7 pages (Oct. 6, 2017).
Plaintiff CommScope's Initial Claim Charts including Exhibits J and K, *CommScope Technologies LLC v. Clearfield, Inc.,* Case No. 0:17-cv-00307-PJS-BRT, 28 pages (Oct. 9, 2017).
Plaintiff CommScope Technologies LLC's Response to Defendant's First Set of Interrogatories to Plaintiff (Nos. 1-15), *CommScope Technologies LLC v. Clearfield, Inc.,* Case No. 0:17-cv-00307-PJS-BRT, 26 pages (Oct. 9, 2017).
Plaintiff CommScope Technologies LLC's Supplemental Response to Defendant's Interrogatory No. 2, *CommScope Technologies LLC v. Clearfield, Inc.,* Case No. 0:17-cv-00307-PJS-BRT, 5 pages (Oct. 9, 2017).
Plaintiff CommScope Technologies LLC's Memorandum in Support of Motion to Compel Discovery, *CommScope Technologies LLC v. Clearfield, Inc.,* Case No. 0:17-cv-00307-PJS-BRT, 21 pages (Oct. 9, 2017).
Petition for Inter Partes Review of U.S. Pat. No. 8,705,929, *Clearfield Inc. v. CommScope Technologies LLC,* Case No. IPR2017-02122, 67 pages (Sep. 15, 2017).
Inter Partes Review Case No. IPR2017-02122, Ex. 1003—Declaration of Dr. Michael Lebby, 141 pages (Sep. 15, 2017).
Inter Partes Review Case No. IPR2017-02122, Ex. 1007—Prosecution History of U.S. Appl. No. 12/182,705, filed Jul. 30, 2008., 332 pages.
Inter Partes Review Case No. IPR2017-02122, Ex. 1008—PCT Patent No. WO 2009/048680 A1.
Inter Partes Review Case No. IPR2017-02122, Ex. 1009—European Patent No. 2 618 195 A2.
Inter Partes Review Case No. IPR2017-02122, Ex. 1010—File Wrapper of EP App. No. 13163032.9, downloaded from European Patent Office on Aug. 10, 2017, 222 pages.
Inter Partes Review Case No. IPR2017-02122, Ex. 1011—U.S. Pat. No. 4,657,140.
Inter Partes Review Case No. IPR2017-02122, Ex. 1012—USConec MTP® Brand Connectors Data Sheet (© 2014), 2 pages.
Inter Partes Review Case No. IPR2017-02122, Ex. 1013—Katsuki Suematsu et al., "Super Low-Loss, Super High-Density Multi-Fiber Optical Connectors," Furukawa Review (n. 23), 2003 ("Suematsu").
Australian Office Action (Appln. No. 2008247361), dated Nov. 8, 2013.
Complaint relating to Civil Action No. 1:11cv-735 (GBL-IDD), *ADC Telecommunications, Inc v. Opterna Am, Inc.* filed Jul. 12, 2011 (5 pages).
Complaint relating to Civil Action No. 5:11-cv-02509-JS, *ADC Telecommunications, Inc v. Opterna Am, Inc.* filed Apr. 11, 2011 (14 pages).
Description of Admitted Prior Art, 30 pages.
European Search Report for Application No. 13163032.9 dated Jul. 4, 2013.
European Search Report for Application No. 15182271.5 dated Dec. 2, 2015.
F3DF Modules, ADC Telecommunications, Inc. © 1995, "Individual 12-Pack Assemblies", pp. 90.
Fiber Cable Management Products, Third Edition, ADC Telecommunications, Inc., © 1995, 1998.

(56) References Cited

OTHER PUBLICATIONS

Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
International Search Report and Written Opinion for PCT/US2008/062764 dated Aug. 8, 2008.
International Search Report and Written Opinion for PCT/US2008/075196 dated Nov. 18, 2008.
International Search Report and Written Opinion for PCT/US2008/072218 dated Mar. 18, 2009.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Extended European Search Report for Application No. 11798913.7 dated Sep. 26, 2017.
Preliminary Response by Patent Owner Under 37 C.F.R. § 42.107, Paper No. 6, Case No. IPR2017-02122, 71 pages (Dec. 22, 2017)).
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 10 to Second Revised Preliminary Invalidity Claim Charts and Disclosures, Civil Action No. 17-cv-00307-PJS-BRT, 43 pages (Jan. 12, 2018).
Exhibit 11 to Second Revised Preliminary Invalidity Claim Charts and Disclosures, Civil Action No. 17-cv-00307-PJS-BRT, 47 pages (Jan. 12, 2018).
Commscope's Response to Clearfield's Second Revised Invalidity Claim Charts and Disclosure, Civil Action No. 17-cv-00307-PJS-BRT, 105 pages (Jan. 19, 2018).
Exhibit J to Second Revised Preliminary Invalidity Claim Charts and Disclosures, Civil Action No. 17-cv-00307-PJS-BRT, 21 pages (Jan. 19, 2018).
Exhibit K to Second Revised Preliminary Invalidity Claim Charts and Disclosures, Civil Action No. 17-cv-00307-PJS-BRT, 19 pages (Jan. 19, 2018).
Defendant Clearfield Inc.'s Revised Preliminary Invalidity Claim Charts and Disclosures, Civil Action No. 17-cv-00307-PJS-BRT, 51 pages (Dec. 11, 2017).
Defendant Clearfield Inc.'s Revised Invalidity Claim Chart Exhibit 10, *CommScope Technologies LLC* v. *Clearfield, Inc.*, Case No. 0:17-cv-00307-PJS-BRT, 38 pages (Dec. 11, 2017).
Defendant Clearfield Inc.'s Revised Invalidity Claim Chart Exhibit 11, *CommScope Technologies LLC* v. *Clearfield, Inc.*, Case No. 0:17-cv-00307-PJS-BRT, 39 pages (Dec. 11, 2017).
Defendant Clearfield Inc.'s Revised Invalidity Claim Chart Table D, *CommScope Technologies LLC* v. *Clearfield, Inc.*, Case No. 0:17-cv-00307-PJS-BRT, 7 pages (Dec. 11, 2017).
Defendant Clearfield Inc.'s Revised Invalidity Claim Chart Table E, *CommScope Technologies LLC* v. *Clearfield, Inc.*, Case No. 0:17-cv-00307-PJS-BRT, 6 pages (Dec. 11, 2017).
Joint Status Report, *CommScope Technologies LLC* v. *Clearfield, Inc.*, Case No. 0:17-cv-00307-PJS-BRT, 11 pages (Feb. 9, 2018.
Joint Status Report Exhibit A, *CommScope Technologies LLC* v. *Clearfield, Inc.*, Case No. 0:17-cv-00307-PJS-BRT, 33 pages (Feb. 9, 2018).
Joint Status Report Exhibit B, *CommScope Technologies LLC* v. *Clearfield, Inc.*, Case No. 0:17-cv-00307-PJS-BRT, 21 pages (Feb. 9, 2018).
Stipulation of Dismissal, *CommScope Technologies LLC* v. *Clearfield, Inc.*, Case No. 0:17-cv-00307-PJS-BRT, 2 pages (Feb. 19, 2018).
Order of Dismissal, *CommScope Technologies LLC* v. *Clearfield, Inc.*, Case No. 0:17-cv-00307-PJS-BRT, 1 page (Feb. 20, 2018).

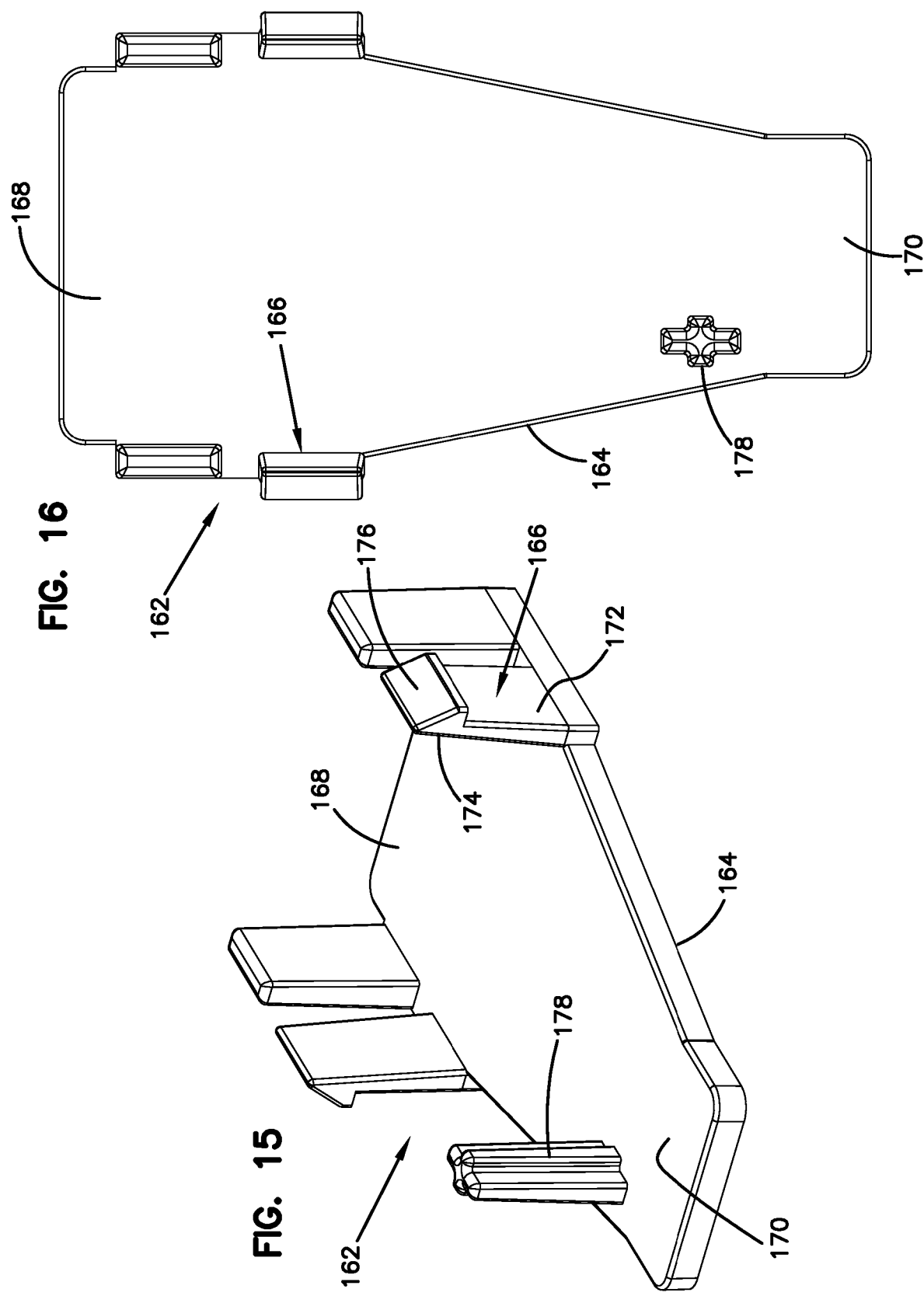

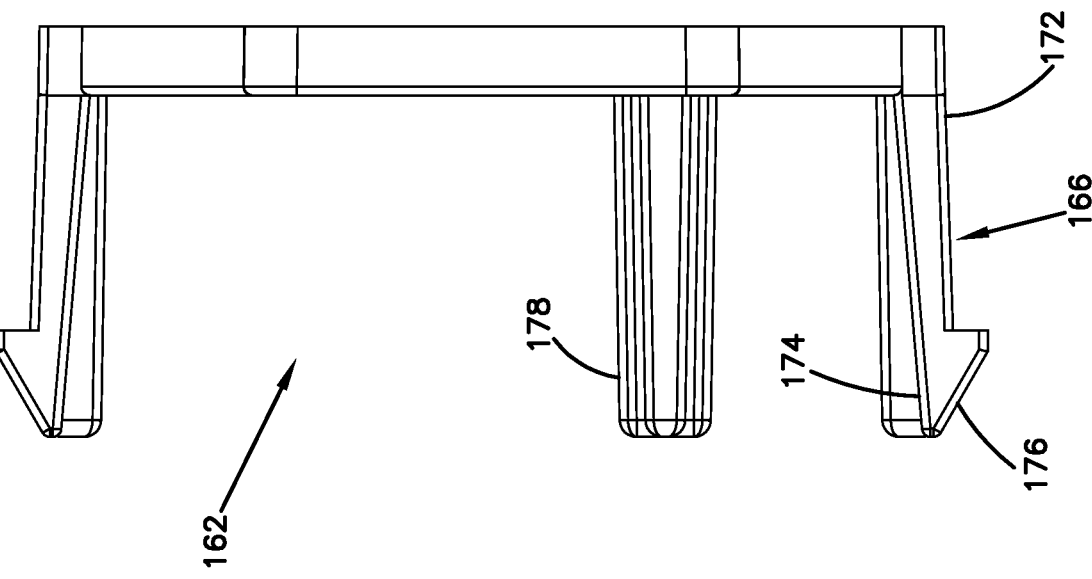
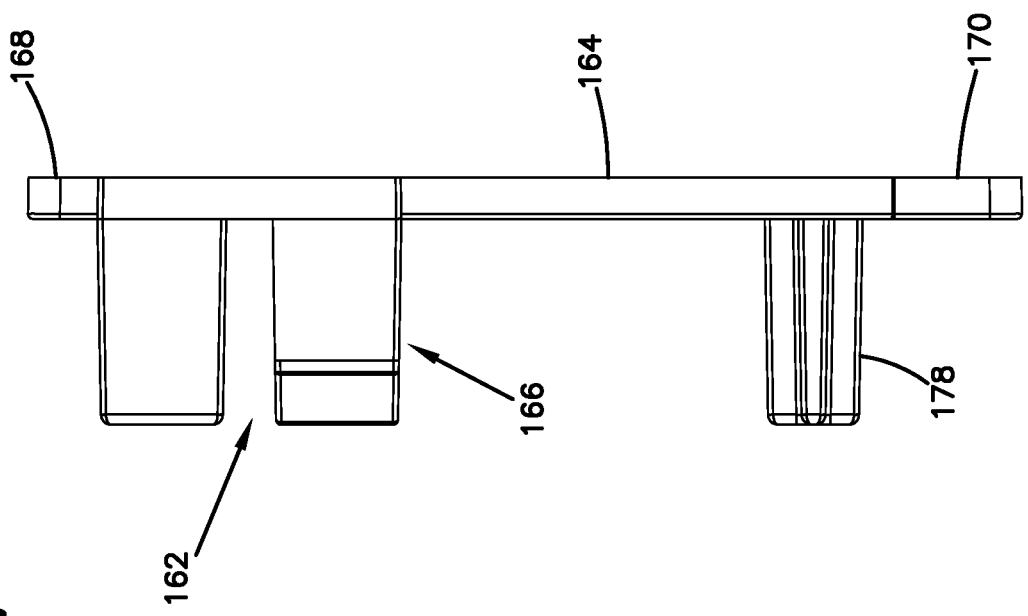

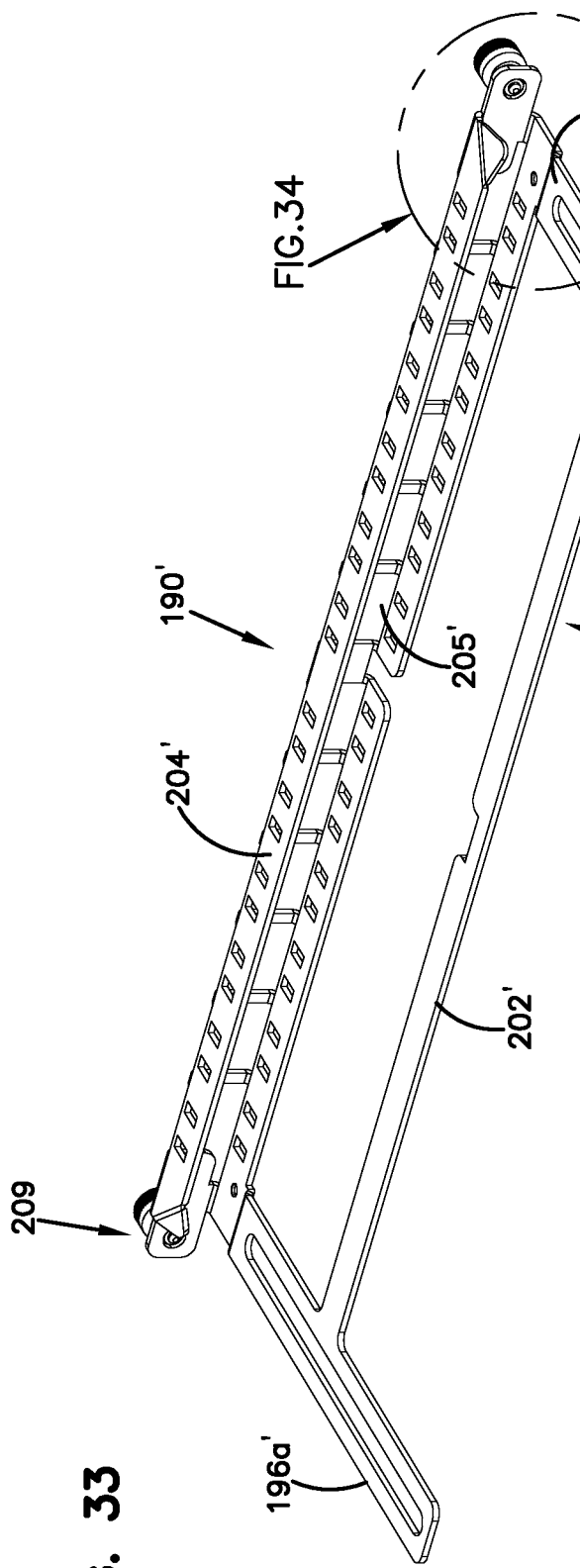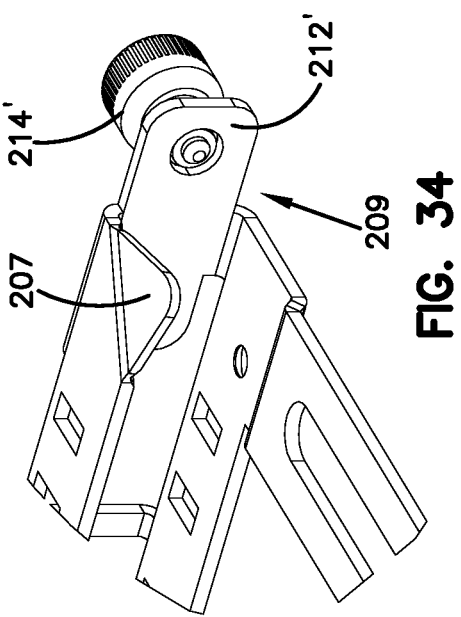

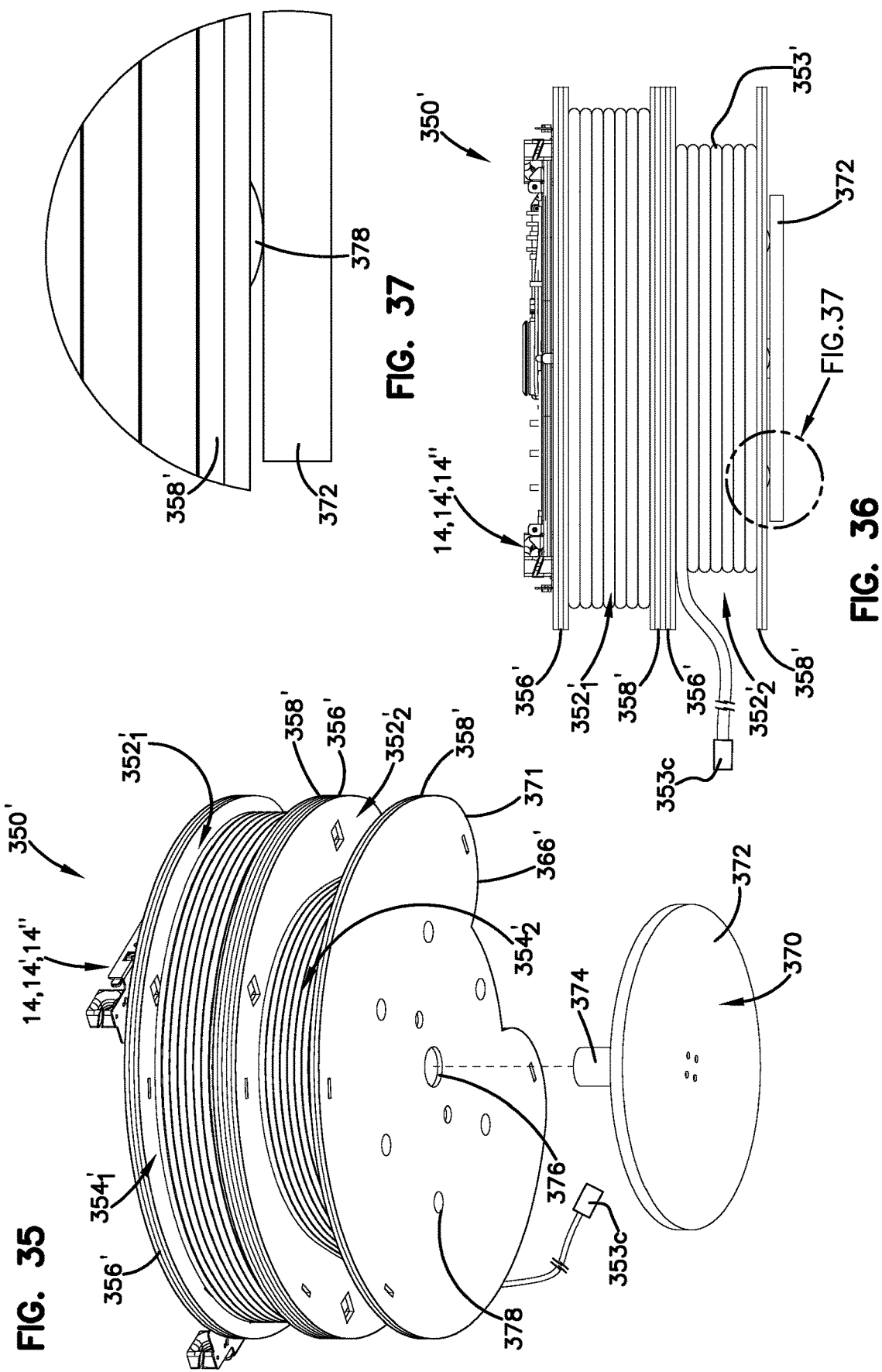

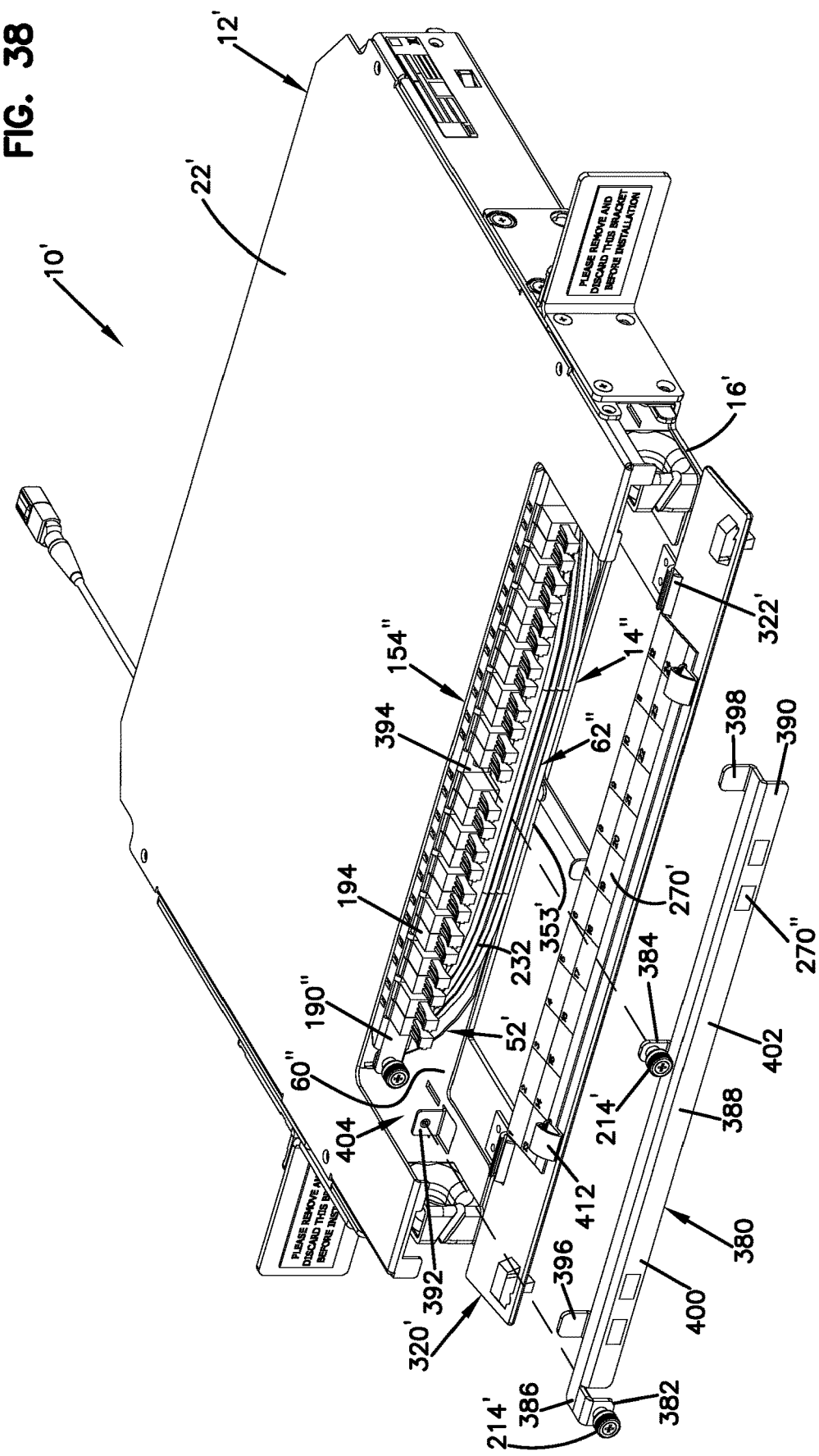

TELECOMMUNICATIONS ASSEMBLY

CROSS-REFERENCE TO RELATED APPLICATIONS

The present application is a continuation of U.S. patent application Ser. No. 16/153,493, filed Oct. 5, 2018, issued as U.S. Pat. No. 10,268,014 on Apr. 23, 2019; which is a continuation of U.S. patent application Ser. No. 15/945,891, filed Apr. 5, 2018, issued as U.S. Pat. No. 10,126,516 on Nov. 13, 2018; which is a continuation of U.S. patent application Ser. No. 15/589,582, filed May 8, 2017, issued as U.S. Pat. No. 9,995,898 on Jun. 12, 2018; which is a continuation of U.S. patent application Ser. No. 15/096,707, filed Apr. 12, 2016, issued as U.S. Pat. No. 9,678,296 on Jun. 13, 2017; which is a continuation of U.S. patent application Ser. No. 14/855,971, filed Sep. 16, 2015, issued as U.S. Pat. No. 9,341,802 on May 17, 2016; which is a continuation of U.S. patent application Ser. No. 14/597,936 filed Jan. 15, 2015, issued as U.S. Pat. No. 9,170,392, on Oct. 27, 2015; which is a continuation of U.S. patent application Ser. No. 14/060,223, filed Oct. 22, 2013, issued as U.S. Pat. No. 8,938,147 on Jan. 20, 2015; which is a continuation of U.S. patent application Ser. No. 13/167,550, filed Jun. 23, 2011, issued as U.S. Pat. No. 8,565,572, on Oct. 22, 2013; which claims the benefit of U.S. Provisional Patent Application Serial Nos. 61/487,542, filed May 18, 2011; 61/378,710, filed Aug. 31, 2010; and 61/357,898, filed Jun. 23, 2010, which applications are hereby incorporated by reference in their entireties.

FIELD

The inventive aspects of this disclosure pertain to devices and methods for deploying, routing, housing, storing, shipping, connecting, and managing telecommunications cable and connections.

BACKGROUND

Telecommunication cabling systems typically include cabinets that house terminations and connections/interconnections of telecommunication cables. The telecommunication cables can include electrical cable, fiber optic cable, and/or hybrid cable that includes both electrical and optical conductors. The cabinets typically allow terminations of the various cables to be connected, disconnected, and/or reconnected to other terminations of the various cables. In this way, the routing of signals across a telecommunications network can be configured and reconfigured as desired. For example, a trunk cable from a main office of a telecommunications provider or a data center may be branched to various branch cables at the cabinet. Each of the branch cables may then be routed to an end-user or to another cabinet.

The telecommunications cable can be stored on, delivered on, and deployed by spools. The cable is typically wound on the spool at a factory that produced the cable. Upon delivery to an installation site, the cable can be unwound from the spool and deployed. The cabinet can hold terminations/connectors of the cables that are routed to it.

SUMMARY

An aspect of the present disclosure relates to a telecommunications assembly having a chassis defining an interior region and a tray assembly disposed in the interior region. The tray assembly includes a tray and a cable spool assembly. The cable spool assembly is engaged to a base panel of the tray. The cable spool assembly is adapted to rotate relative to the tray. The cable spool assembly includes a hub, a flange engaged to the hub and an adapter module. The flange defines a termination area. The adapter module is engaged to the termination module of the flange. The adapter module is adapted to slide relative to the flange in a direction that is generally parallel to the flange between an extended position and a retracted position.

Another aspect of the present disclosure relates to a telecommunications assembly. The telecommunications assembly includes a chassis that is adapted for connection to a rack. A tray assembly is removably mounted in the chassis. The tray assembly includes a tray, a cable spool rotatably mounted to the tray and a plurality of adapters mounted to the tray. The tray assembly can be inserted into and removed from the chassis as a unit without requiring the cable spool or the plurality of adapters to be detached from the tray. The tray carries the cable spool and the plurality of adapters during insertion and removal.

Another aspect of the present disclosure relates to a cable assembly. The cable assembly includes a first cable spool. The first cable spool includes a drum having a first axial end and an oppositely disposed second axial end. A first flange is engaged to the first axial end of the drum while a second flange is engaged to the second axial end of the drum. A tray assembly is mounted to an outer surface of the first flange of the cable spool. The tray assembly includes a tray that defines a lateral direction and a front-to-back direction that is generally perpendicular to the lateral direction. A second cable spool is rotatably mounted to the tray. A plurality of adapters is slidably mounted to the second cable spool of the tray assembly. The plurality of adapters is adapted to slide relative to the tray in a direction that is generally parallel to the front-to-back direction.

Another aspect of the present disclosure relates to a telecommunications apparatus. The telecommunications apparatus includes a tray, a first spool, a plurality of fiber optic adapters, a second spool, and a fiber optic cable assembly. The tray is configured to mount within a housing. The housing is adapted for connection to a telecommunications rack. The tray includes a base having a top side and a bottom side. The first spool is mounted to the tray at a location above the top side of the base. The first spool is rotatable relative to the tray. The fiber optic adapters are carried by the first spool when the first spool is rotated relative to the tray. The second spool is mounted to the tray at a location below the bottom side of the base. The fiber optic cable assembly includes a main cable portion that is spooled about the first spool and is also spooled about the second spool. The main cable portion includes a jacket containing a plurality of optical fibers. The fiber optic cable assembly also includes a broken-out portion where the optical fibers are broken-out from the jacket and incorporated into separate pigtails having connectorized ends that are received within the fiber optic adapters. The connectorized pigtails extend at least partially along a fiber routing path that extends along the top side of the base of the tray from the first spool to the fiber optic adapters. The second spool is mounted to the tray such that the tray rotates in concert with the second spool when the main cable portion of the fiber optic cable assembly is paid out from the second spool. The first spool rotates relative to the tray when the main cable portion of the fiber optic cable assembly is paid out from the first spool.

Another aspect of the present disclosure relates to a telecommunications apparatus. The telecommunications apparatus includes a tray, a first spool, at least one fiber optic adapter, a second spool, and a fiber optic cable. The tray is configured to mount within a housing that is adapted for connection to a telecommunications rack. The tray includes a base having a top side and a bottom side. The first spool is mounted to the tray at a location above the top side of the base. The first spool is rotatable relative to the tray. The at least one fiber optic adapter is carried by the first spool when the first spool is rotated relative to the tray. The second spool is mounted to the tray at a location below the bottom side of the base. The fiber optic cable is spooled about the first spool and is also spooled about the second spool. The second spool is mounted to the tray such that the tray rotates in concert with the second spool when the fiber optic cable is paid out from the second spool. The first spool rotates relative to the tray when the fiber optic cable is paid out from the first spool.

Another aspect of the present disclosure relates to a telecommunications apparatus. The telecommunications apparatus includes a housing, a tray, a first spool, and a fiber optic cable. The housing is adapted for connection to a telecommunications rack. The housing includes a housing body that defines a cross-dimension, a height, and a depth. The cross-dimension is measured in a direction perpendicular relative to the height and the depth. The housing also including flanges for fastening the housing body to the telecommunications rack. The flanges are separated from one another by the cross-dimension of the housing. The tray can be inserted into the housing and removed from the housing. The first spool is mounted to the tray. The first spool is rotatable relative to the tray about an axis of rotation. The first spool includes first and second flanges that are spaced apart along the axis of rotation. The first spool also includes a core aligned along the axis of rotation and positioned between the first and second flanges. The core defines an elongated spooling path that defines a major dimension and a minor dimension. The fiber optic cable is spooled about the elongated spooling path of the core. The first spool rotates about the axis of rotation relative to the tray when the fiber optic cable is paid out from the first spool.

Another aspect of the present disclosure relates to a telecommunications apparatus. The telecommunications apparatus includes a housing and a tray. The housing is adapted for connection to a telecommunications rack. The housing includes a housing body that defines a cross-dimension, a height, and a depth. The cross-dimension is measured in a direction perpendicular relative to the height and the depth. The housing also includes flanges for fastening the housing body to the telecommunications rack. The flanges are separated from one another by the cross-dimension of the housing body. The housing body includes front and back ends that are separated by the depth of the housing body. The tray can be mounted in the housing body. The tray carries at least one fiber optic adapter. The housing body and the tray are configured such that: a) the tray can be inserted into the housing body and removed from the housing body through the front end of the housing body; and b) the tray can be inserted into the housing body and removed from the housing body through the back end of the housing body.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 15 is a perspective view of a fan-out clip suitable for use with the tray assembly of FIG. 7;

FIG. 16 is a front view of the fan-out clip of FIG. 15;

FIG. 17 is a side view of the fan-out clip of FIG. 15;

FIG. 18 is a top view of the fan-out clip of FIG. 15;

FIG. 33 is a perspective view of an adapter module of the tray assembly of FIG. 30;

FIG. 34 is an enlarged portion of the perspective view of FIG. 33;

FIG. 35 is an exploded perspective view of a cable assembly;

FIG. 36 is a side view of the cable assembly of FIG. 35;

FIG. 37 is an enlarged portion of the side view of FIG. 36;

FIG. 38 is an exploded perspective view of a telecommunications assembly having exemplary features of aspects in accordance with the principles of the present disclosure;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
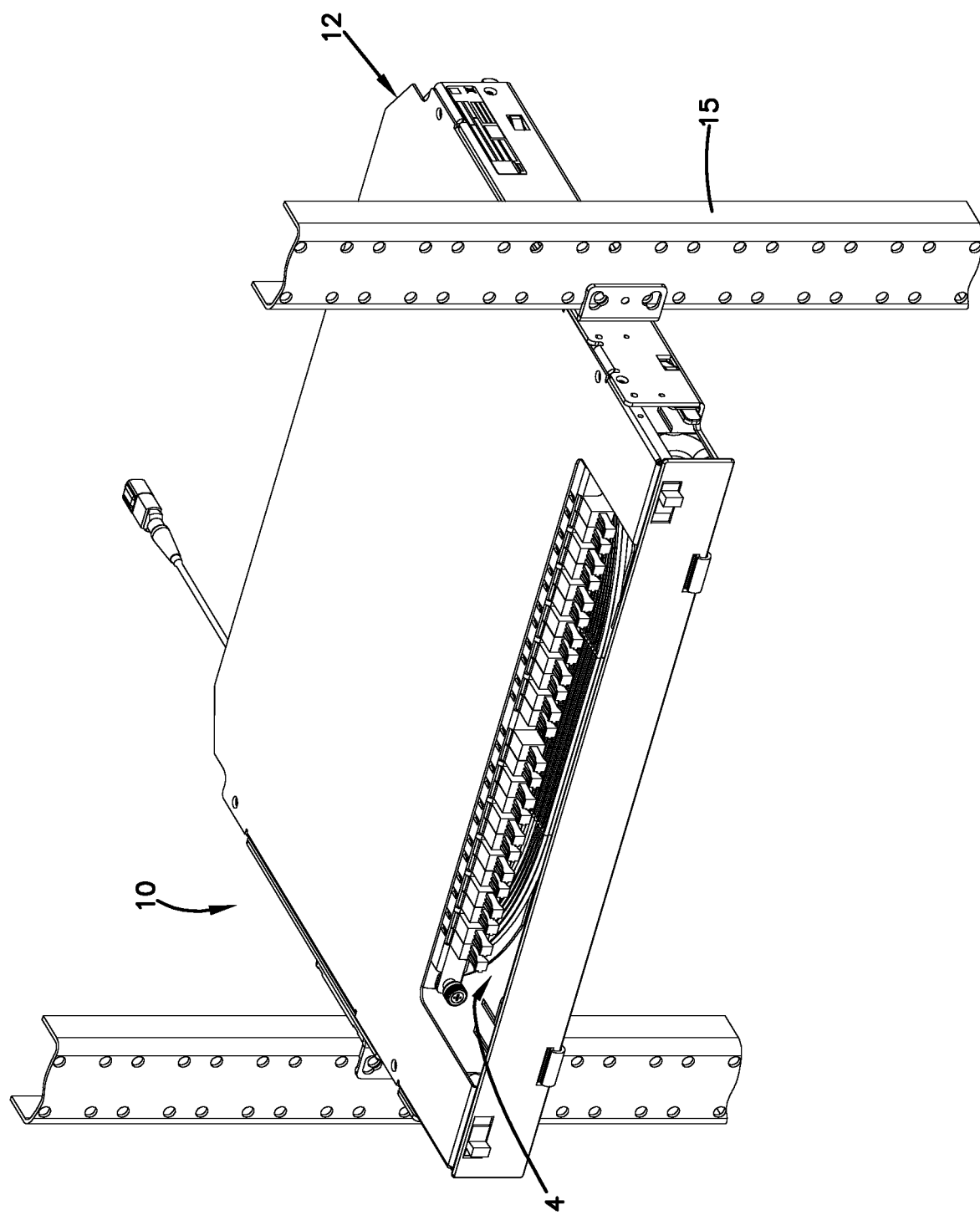
FIG. 1 is a perspective view of a telecommunications assembly having exemplary features of aspects in accordance with the principles of the present disclosure.
Figure 2:
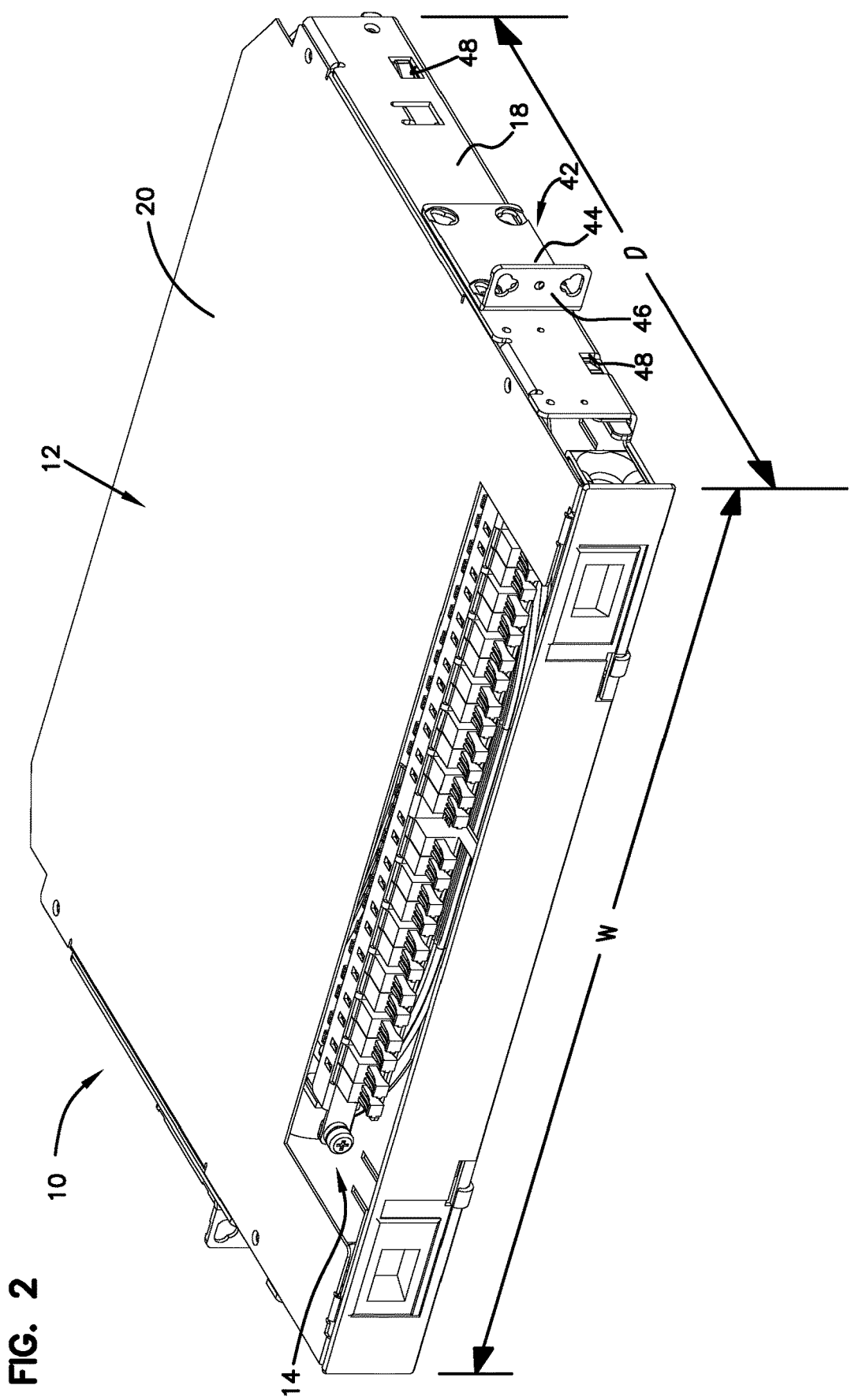
FIG. 2 is a perspective view of the telecommunications assembly of FIG. 1.
Figure 3:
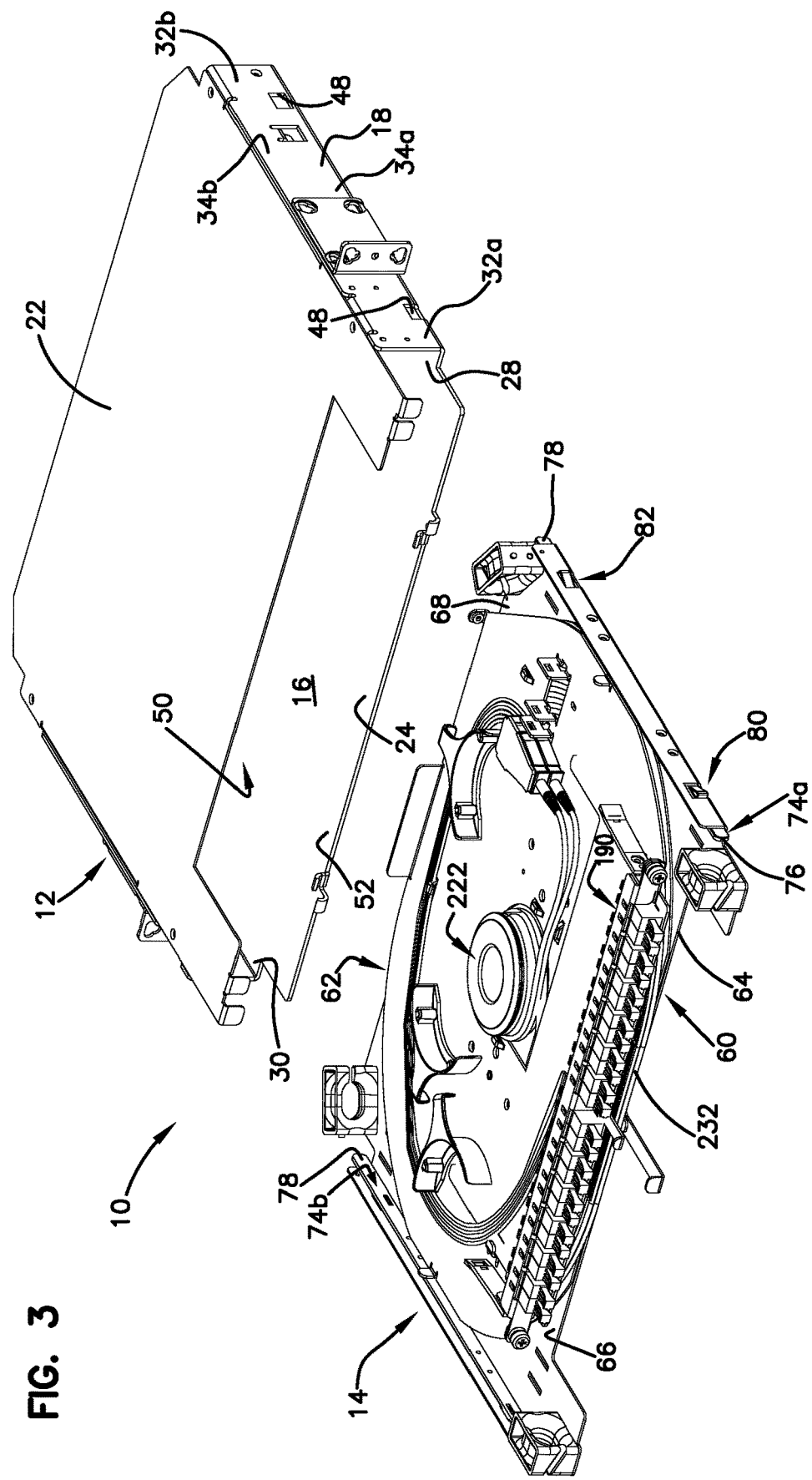
FIG. 3 is an exploded perspective view of the telecommunications assembly of FIG. 2.
Figure 4:
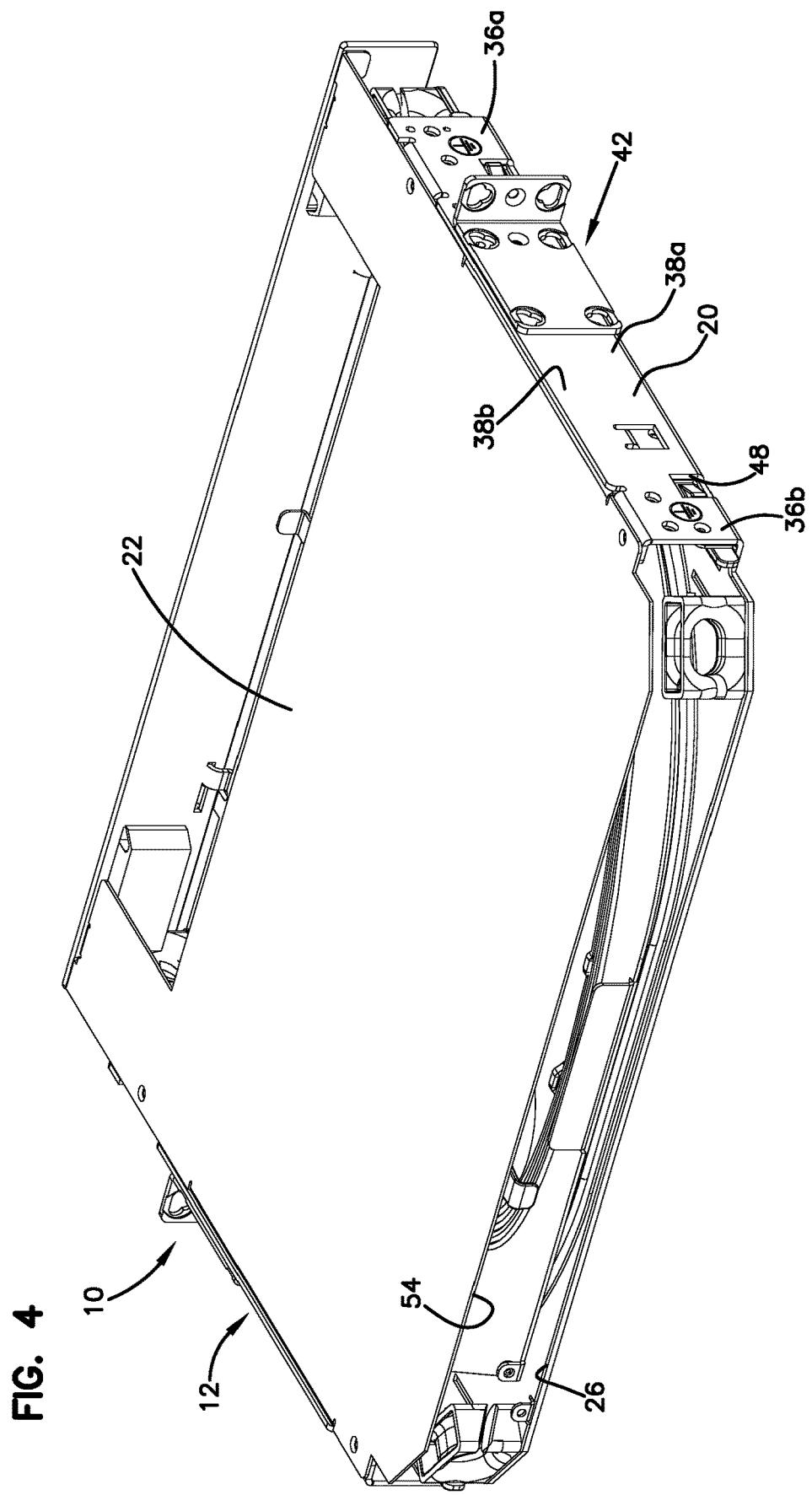
FIG. 4 is a rear perspective view of the telecommunications assembly of FIG. 2.
Figure 5:
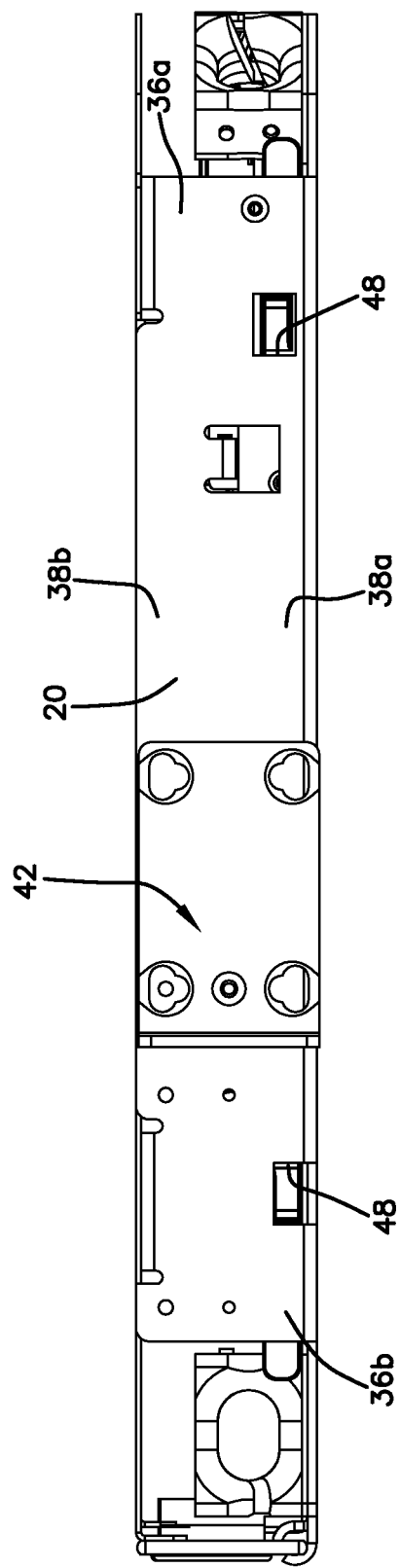
FIG. 5 is a side view of the telecommunications assembly of FIG. 2.
Figure 6:
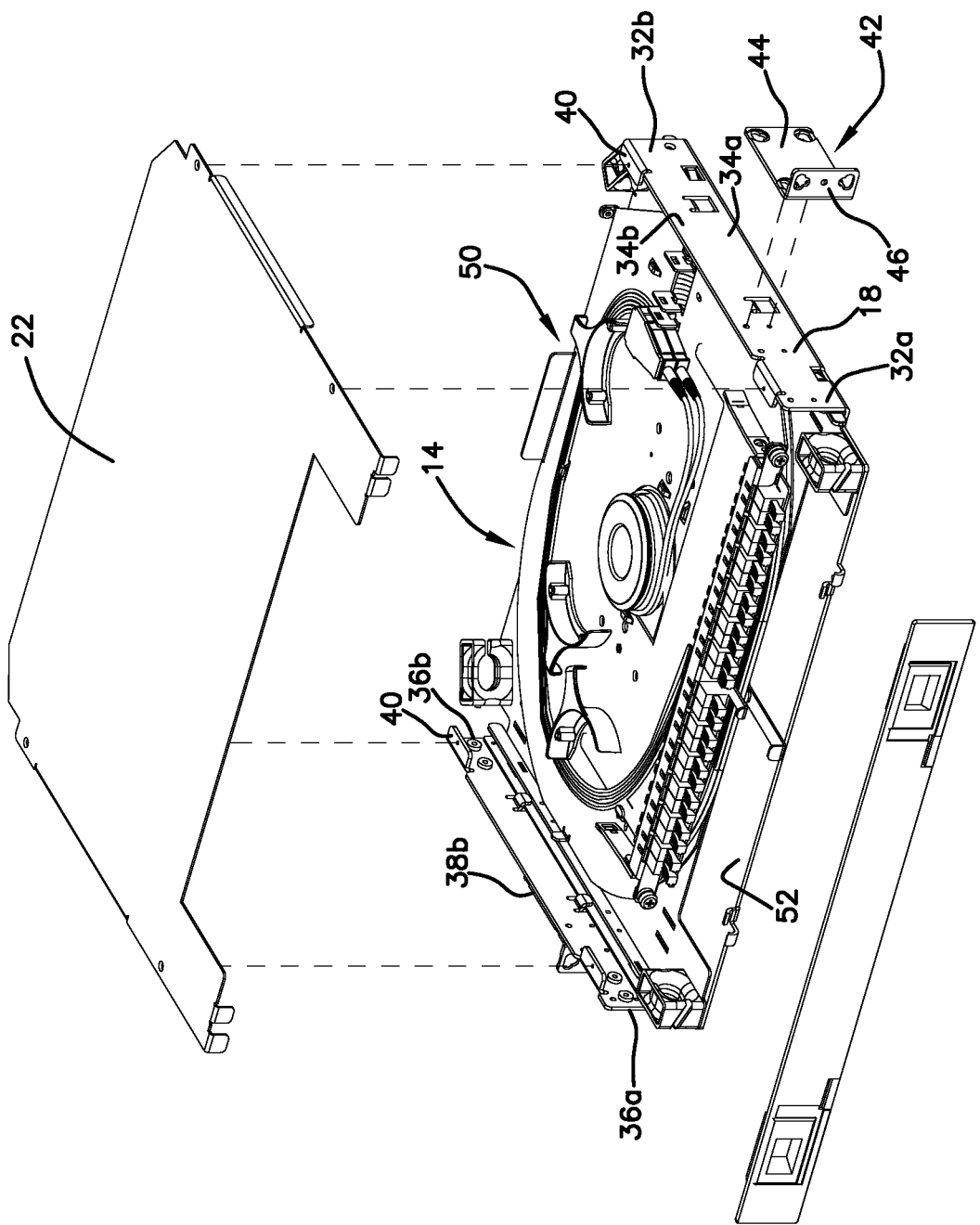
FIG. 6 is an exploded perspective view of the telecommunications assembly of FIG. 2.

Referring now to FIGS. 1-3, a telecommunications assembly 10 is shown. The telecommunications assembly 10 includes a chassis 12 (e.g., an enclosure, a case, etc.) and a tray assembly 14 (e.g., a shelf assembly, a drawer assembly, etc.) that removably mounts in the chassis 12. The telecommunications assembly 10 is adapted for mounting to a telecommunications rack 15.

Referring now to FIGS. 1-6, the chassis 12 will be described. The chassis 12 is adapted for connection to the rack 15. In the depicted embodiment, the chassis 12 is generally rectangular in shape. The chassis 12 includes a base 16, a first sidewall 18, an oppositely disposed second sidewall 20 and a cover 22. The base 16 includes a first end 24, an oppositely disposed second end 26, a first side 28 that extends between the first and second ends 24, 26 and an oppositely disposed second side 30. In the depicted embodiment, the first end 24 is a front end of the base 16 while the second end 26 is a back end. In one embodiment, the chassis 12 includes a major dimension W, which is measured from the first side 28 to the second side 30, and a minor dimension D, which is measured from the first end 24 to the second end 26. In the depicted embodiment, the major dimension W is greater than the minor dimension D.

The first and second sidewalls 18, 20 extend outwardly from the base 16. In the depicted embodiment, the first and second sidewalls 18, 20 extend outwardly in a direction that is generally perpendicular to the base 16. In another embodiment, the first and second sidewalls 18, 20 extend outwardly from the base 16 at an oblique angle.

The first sidewall 18 is disposed at the first side 28 of the base 16 while the second sidewall 20 is disposed at the second side 30 of the base 16. The first sidewall 18 includes a first end 32a, an oppositely disposed second end 32b, a first side 34a that extends between the first and second ends 32a, 32b of the first sidewall 18 and an oppositely disposed second side 34b. The second sidewall 20 includes a first end 36a, an oppositely disposed second end 36b, a first side 38a that extends between the first and second ends 36a, 36b of the second sidewall 20 and an oppositely disposed second side 38b.

The first side 34a of the first sidewall 18 is engaged to the first side 28 of the base 16 so that the first end 32a of the first sidewall 18 is adjacent to the first end 24 of the base 16. The first side 38a of the second sidewall 20 is engaged to the second side 30 of the base 16 so that the first end 36a of the second sidewall 20 is adjacent to the first end 24 of the base 16. In the depicted embodiment, the first sides 34a, 38a of the first and second sidewalls 18, 20 are integral with the base 16. In another embodiment, the first sides 34a, 38a of the first and second sidewalls 18, 20 are fastened (e.g., welded, pop riveted, bolted, screwed, glued, etc.) to the base 16.

The second sides 34b, 38b of the first and second sidewalls 18, 20 are engaged to the cover 22. In the depicted embodiment, the second sides 34b, 38b include tabs 40 that are engaged to the cover 22 by fasteners (e.g., screws, bolts, rivets, welds, adhesive, etc.).

Each of the first and second sidewalls 18, 20 includes a mounting bracket 42. In the depicted embodiment, the mounting bracket 42 is generally L-shaped. The mounting bracket 42 includes a first end portion 44 that mounts to one of the first and second sidewalls 18, 20 and a second end portion 46 that is adapted for engagement with the rack 15. In the depicted embodiment, the first end portion 44 is engaged to the first and second sidewalls 18, 20 by a plurality of fasteners (e.g., screws, bolts, rivets, welds, adhesive, etc.).

Each of the first and second sidewalls 18, 20 define a plurality of holes 48. In the depicted embodiment, the holes 48 are disposed adjacent to the first sides 34a, 38a of the first and second sidewalls 18, 20. In the depicted embodiment, the holes 48 are generally rectangular in shape.

The base 16, the first and second sidewalls 18, 20 and the cover 22 cooperatively define an interior region 50. The interior region 50 is adapted to receive the tray assembly 14.

The first ends 32a, 36a of the first and second sidewalls 18, 20 and the first end 24 of the base 16 cooperatively define a first opening 52. The first opening 52 provides access to the interior region 50. In the depicted embodiment, the first opening 52 is a front opening to the interior region 50.

The second ends 32b, 36b of the first and second sidewalls 18, 20 and the second end 26 of the base 16 cooperatively define a second opening 54. The second opening 54 provides access to the interior region 50. In the depicted embodiment, the second opening 54 is oppositely disposed from the first opening 52. In the depicted embodiment, the second opening 54 is a back opening.

Figure 7:
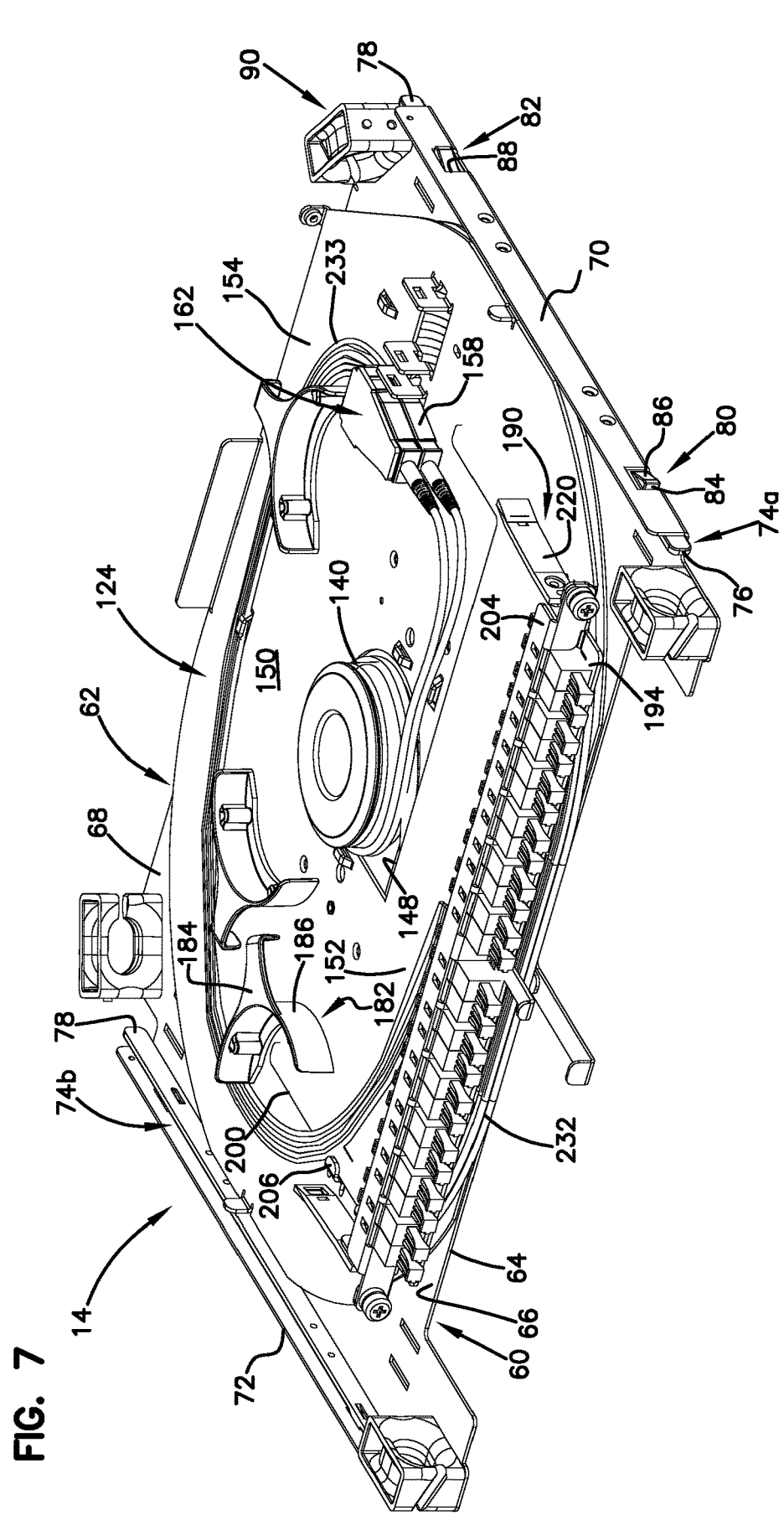
FIG. 7 is a perspective view of a tray assembly suitable for use with the telecommunications assembly of FIG. 2.
Figure 8:
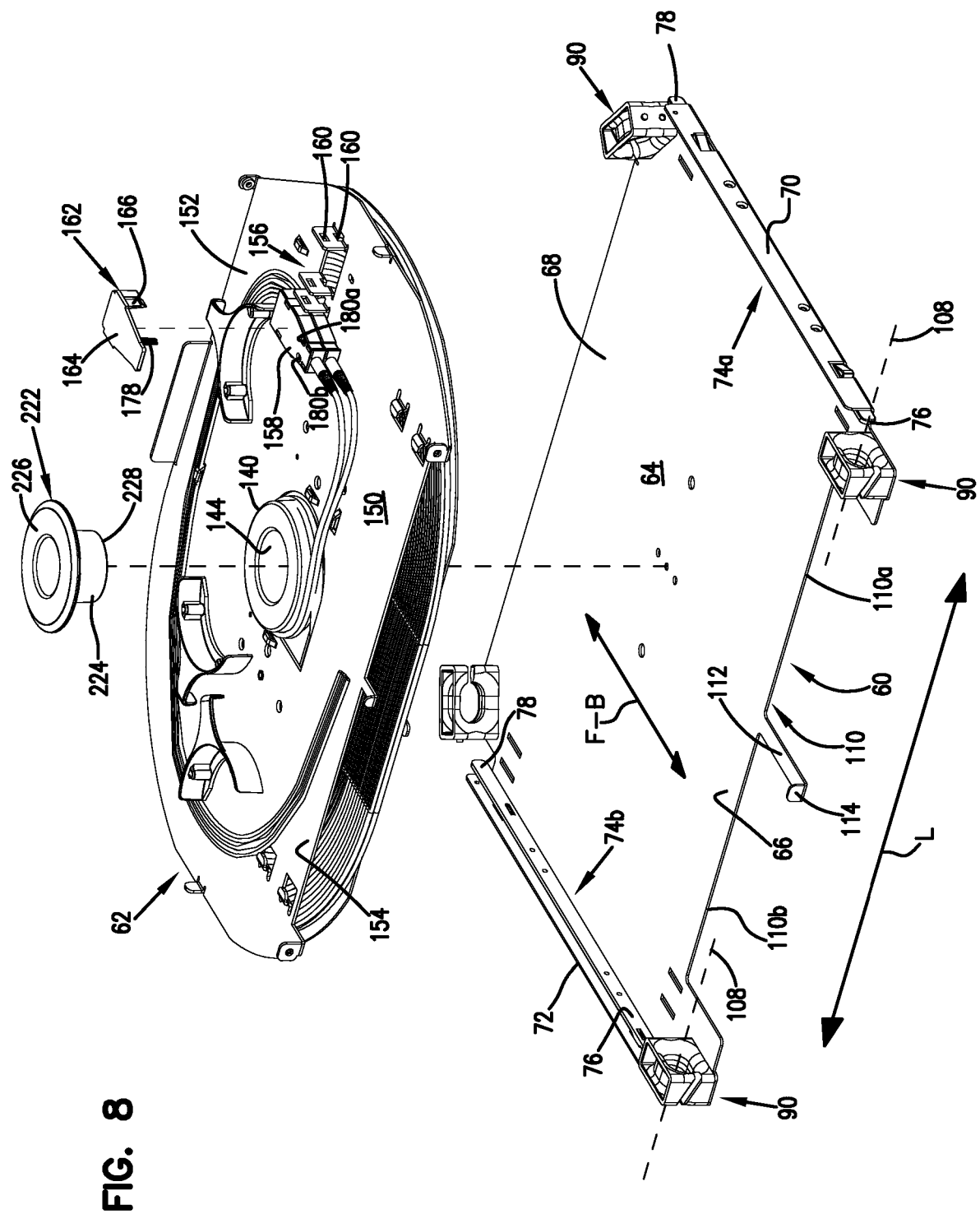
FIG. 8 is an exploded perspective view of the tray assembly of FIG. 7.
Figure 9:
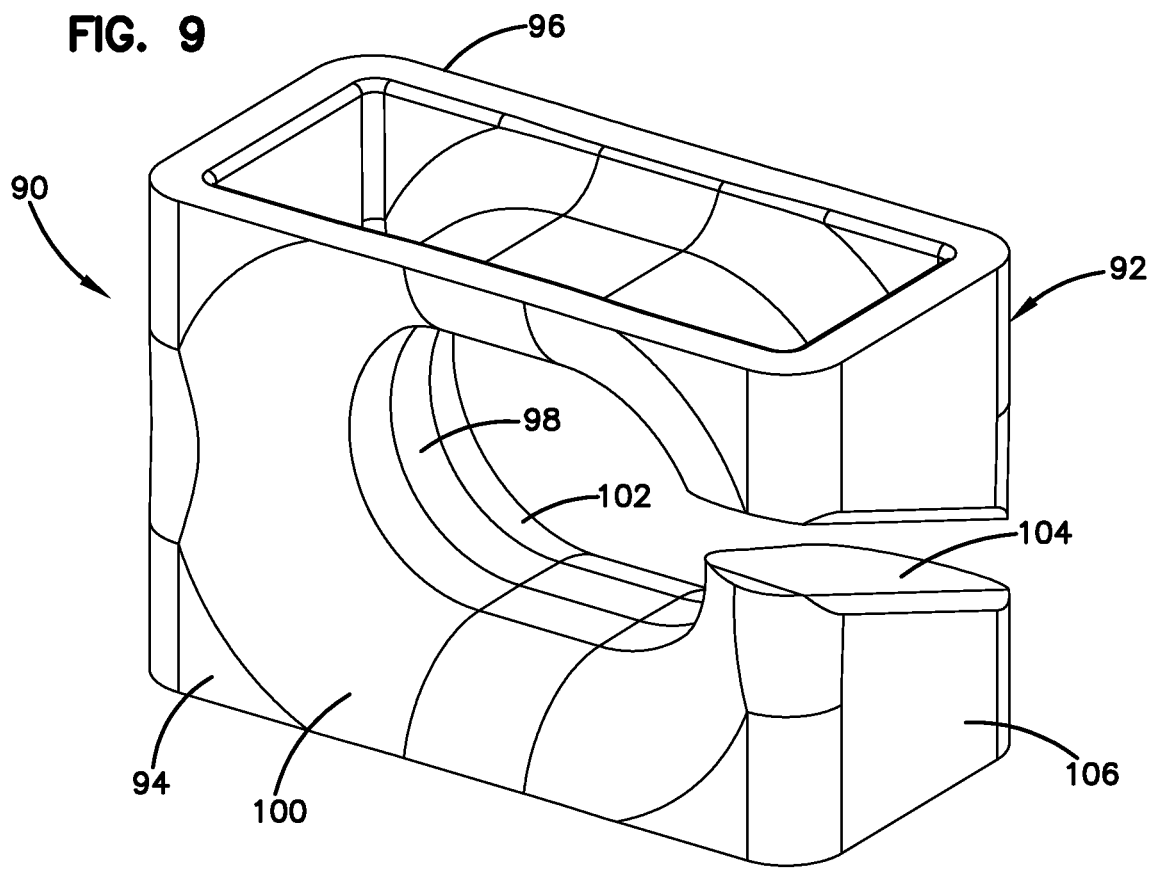
FIG. 9 is a perspective view of a bend radius protector suitable for use with the tray assembly of FIG. 7.
Figure 10:
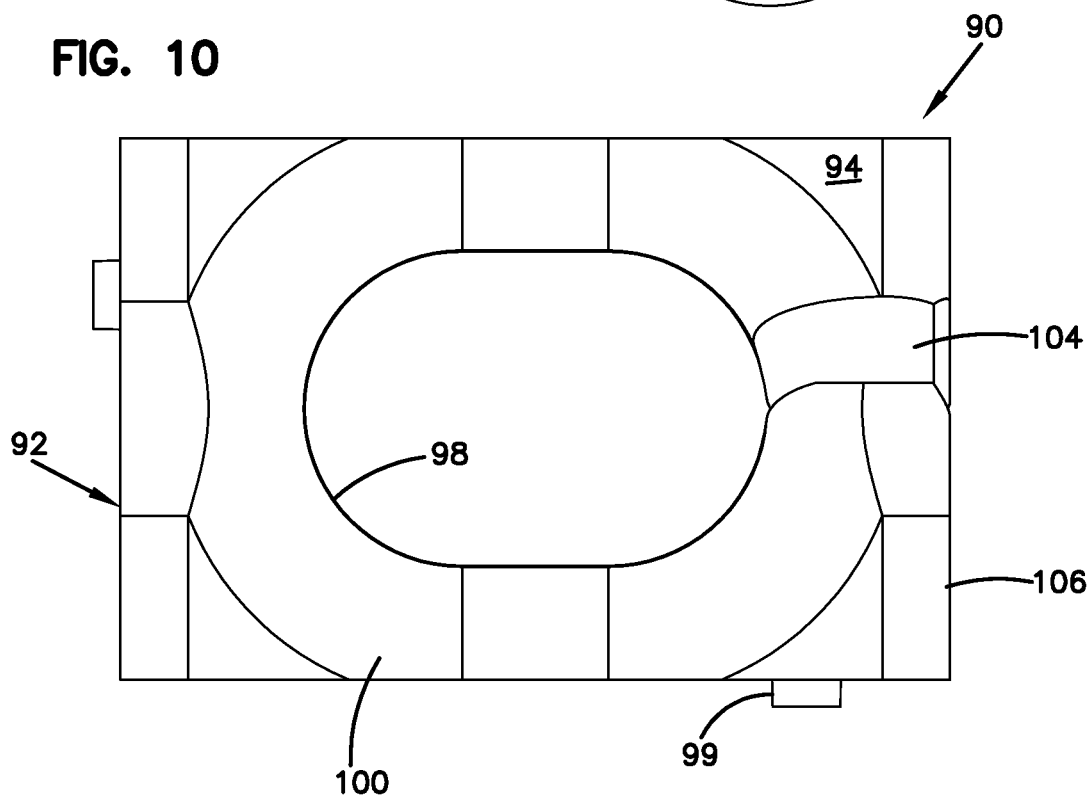
FIG. 10 is a front view of the bend radius protector of FIG. 9.
Figure 11:
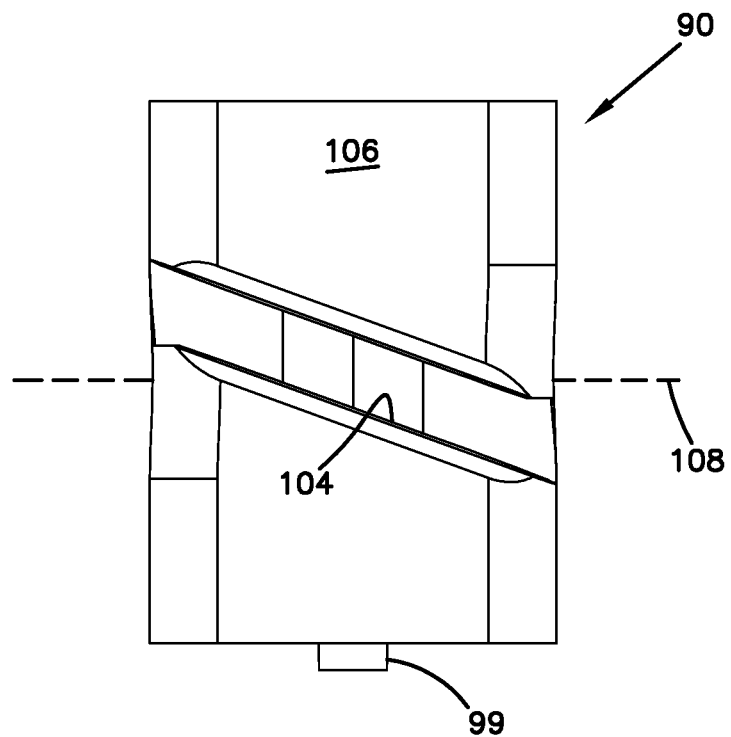
FIG. 11 is a side view of the bend radius protector of FIG. 9.
Figure 12:
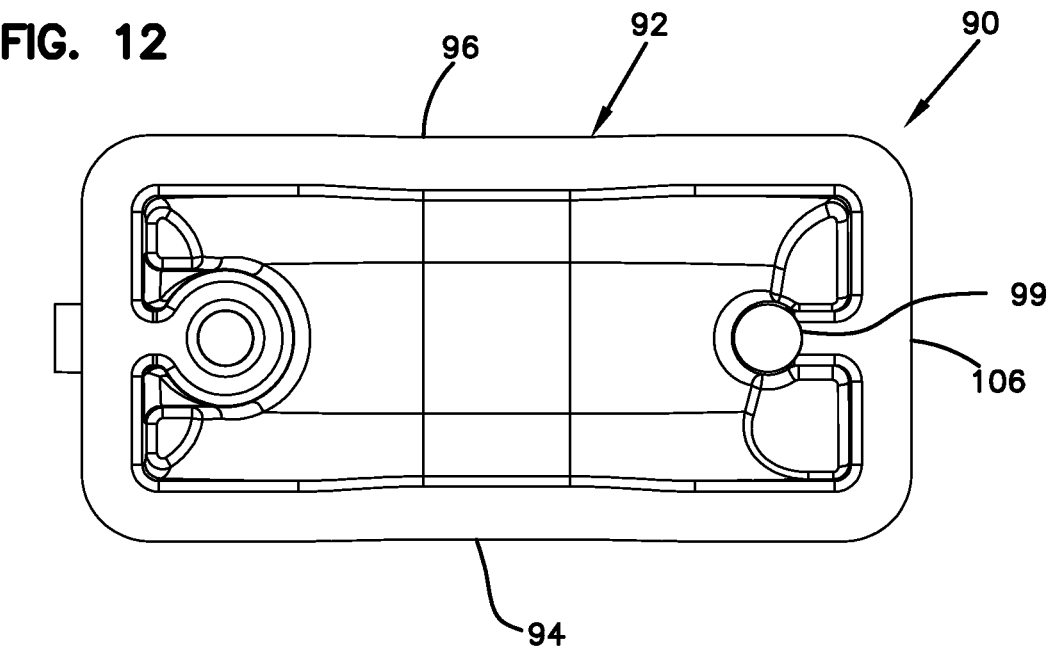
FIG. 12 is a bottom view of the bend radius protector of FIG. 9.
Figure 13:
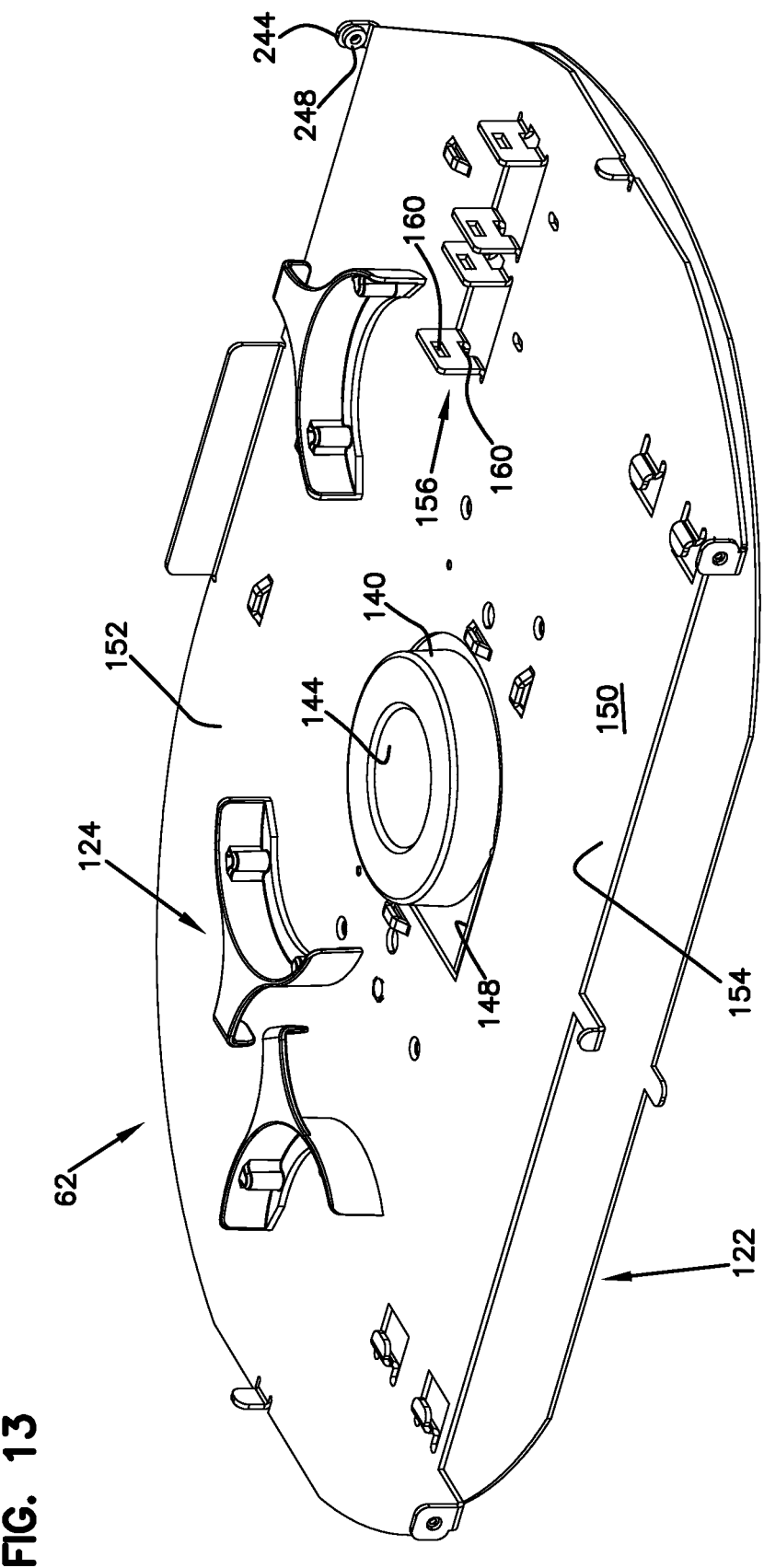
FIG. 13 is a perspective view of a cable spool assembly suitable for use with the tray assembly of FIG. 7.

Referring now to FIGS. 7 and 8, the tray assembly 14 is shown. The tray assembly 14 includes a tray 60 (e.g., a shelf, a drawer, etc.) and a cable spool assembly 62 rotatably mounted to the tray 60. The tray assembly 14 is adapted for insertion and removal from the chassis 12 as a unit without requiring the cable spool assembly 62 to be detached from the tray 60.

The tray 60 includes a base panel 64 having a first end portion 66 (e.g., a front end portion), an oppositely disposed second end portion 68 (e.g., a back end portion), a first side portion 70 that extends at least partially between the first and second end portions 66, 68 and an oppositely disposed second side portion 72 that extends at least partially between the first and second end portions 66, 68. In the depicted embodiment, the first and second side portions 70, 72 extend outwardly from the base panel 64 in a generally perpendicular direction.

The tray 60 defines a lateral direction L and a front-to-back direction F-B. The lateral direction L extends between the first and second side portions 70, 72. In the depicted embodiment, the lateral direction L is generally perpendicular to the first and second side portions 70, 72. The front-to-back direction F-B extends between the first and second end portions 66, 68. The front-to-back direction F-B is generally perpendicular to the lateral direction L.

The tray 60 includes a plurality of resilient latches 74. In the depicted embodiment, the tray 60 includes a first resilient latch 74*a* engaged to the first side portion 70 and a second resilient latch 74*b* engaged to the second side portion 72.

In the depicted embodiment, the resilient latch 74 includes a first axial end portion 76 and an oppositely disposed second axial end portion 78. The first axial end portion 76 includes a first protrusion 80 while the second axial end portion 78 includes a second protrusion 82. Each of the first and second protrusions 80, 82 includes a lip 84 and an angled surface 86. The first and second protrusions 80, 82 are oppositely disposed on the resilient latch 74 so that the lip 84 of the first protrusion 80 faces the first end portion 66 of the base panel 64 while the lip 84 of the second protrusion 82 faces the second end portion 68 of the base panel 64. The angled surface 86 of the first protrusion 80 flares outwardly toward the first axial end portion 76 while the angled surface 86 of the second protrusion 82 flares outwardly toward the second axial end portion 78.

The first resilient latch 74*a* is secured to the first side portion 70 by a plurality of fasteners (e.g., screws, bolts, rivets, welds, adhesive, etc.). The first resilient latch 74*a* is secured to the first side portion 70 at a location disposed between the first and second axial end portions 76, 78 of the first resilient latch 74*a*. In the depicted embodiment, the first resilient latch 74*a* is secured to the first side portion 70 at a location disposed between the first and second protrusions 80, 82.

The second resilient latch 74*b* is secured to the second side portion 72 by a plurality of fasteners (e.g., screws, bolts, rivets, welds, adhesive, etc.). The second resilient latch 74*b* is secured to the second side portion 72 at a location disposed between the first and second axial ends 76, 78 of the second resilient latch 74*b*. In the depicted embodiment, the second resilient latch 74*b* is secured to the second side portion 72 at a location disposed between the first and second protrusions 80, 82 of the second resilient latch 74*b*.

In the depicted embodiment, the first and second side portions 70, 72 of the base panel 64 include a plurality of openings 88 through which the first and second protrusions 80, 82 extend. Each of the first and second axial ends 76, 78 of the first and second resilient latches 74*a*, 74*b* is adapted to flex inwardly toward the tray 60. As the first axial ends 76 of the first and second resilient latches 74*a*, 74*b* flex inwardly, the distance that the first protrusion 80 extends outwardly through the openings 88 decreases.

Referring now to FIGS. 8-12, the tray 60 includes a plurality of bend radius protectors 90. A first plurality of bend radius protectors 90*a* is disposed adjacent to the first end portion 66 of the base panel 64. A second plurality of bend radius protectors 90*b* is disposed adjacent to the second end 68 of the base panel 64.

In the depicted embodiment, the bend radius protector 90 includes a body 92 having a first end surface 94 and an oppositely disposed second end surface 96. The body 92 defines a passage 98 that extends through the first and second end surfaces 94, 96. In the depicted embodiment, the passage 98 is generally oblong in shape. The passage 98 includes a first arcuate edge 100 at the first end surface 94 and a second arcuate edge 102 at the second end surface 96. Each of the first and second arcuate edges 100, 102 includes a radius that is greater than the minimum bend radius of a fiber optic cable that passes through passage 98 so as to reduce the risk of attenuation damage to the fiber optic cable.

The body 92 encloses the passage 98. A slot 104 is defined by a side 106 of the body 92. The slot 104 extends through the side 106 of the body 92 and into the passage 98. The slot 104 extends through the first and second end surface 94, 96. The slot 104 is adapted to allow a fiber optic cable to be inserted laterally into the passage 98 rather than threading the fiber optic cable through the passage 98. In the depicted embodiment, the slot 104 is disposed at an angle relative to a central axis 108 that extends through the passage 98. The slot 104 angles as it extends from the first end surface 94 to the second end surface 96. In one embodiment, the angle is an oblique angle.

The first and second pluralities of bend radius protectors 90 are fastened to the base panel 64 of the tray 60. In the depicted embodiments of FIGS. 9-12, the bend radius protectors 90 include a pin 99 that is adapted for receipt in a hole in the base panel 64 of the tray 60 of the tray assembly 14. The pin 99 and the fastener cooperatively secure the bend radius protectors to the base panel 64.

In the depicted embodiments of FIG. 8, the first plurality of bend radius protectors 90 is disposed at the first end portion 66 of the base panel 64 so that the central axes 108 that extend through the passages 98 of the first plurality of bend radius protectors 90 are aligned. In the depicted embodiment, the central axes 108 of the first plurality of bend radius protectors 90 are generally parallel to the lateral direction L.

The second plurality of bend radius protectors 90 is disposed at the second end portion 68 of the base panel 64 so that the central axes 108 of the bend radius protectors 90 are angled outwardly. In the depicted embodiment, the central axes 108 of the second plurality of bend radius protectors 90 are disposed at an oblique angle relative to the lateral direction L and the front-to-back direction F-B.

Referring now to FIG. 8, the first end portion 66 of the tray 60 defines a recess 110. A tab 112 extends from the base panel 64 into the recess 110 and separates the recess 110 into a first recess 110*a* and a second recess 110*b*. The tab 112 is generally coplanar with the base panel 64. The tab 112 includes a free end 114 that extends in a direction that is generally perpendicular to the base panel 64. In the depicted embodiment, the first and second recesses 110*a*, 110*b* are generally equal in size.

Referring now to FIGS. 7, 8, 13 and 14, the cable spool assembly 62 will be described. The cable spool assembly 62 is adapted to rotate relative to the tray 60. In the depicted embodiment, the cable spool assembly 62 is rotatably engaged to the base panel 64 of the tray 60. The cable spool assembly 62 includes a stored position (shown in FIG. 7). In one embodiment, the cable spool assembly 62 can be releasably secured in the stored position. The cable spool assembly 62 is adapted to be rotated from the stored position to deploy fiber optic cable wrapped about the cable spool assembly 62.

The cable spool assembly 62 includes a hub 120, a first flange 122 engaged to the hub 120 and a second flange 124 engaged to the hub 120 opposite the first flange 122. The hub 120 includes a body 126 having a first surface 128 and an oppositely disposed second surface 130. In one embodiment, the distance between the first and second surfaces 128, 130 is less than or equal to about 0.75 inches. In another embodiment, the distance between the first and second surfaces 128, 130 is less than or equal to about 0.5 inches.

In another embodiment, the distance between the first and second surface 128, 130 is in a range of about 0.25 inches to about 0.5 inches.

In the depicted embodiment, the body 126 of the hub 120 is generally oval in shape. The oval shape of the body 126 of the hub 120 allows for a greater length of fiber optic cable to be coiled around the body 126 for a given depth and width of the cable spool assembly 62. The body 126 of the hub 120 includes a major dimension, as measured along a major axis of the body 126, and a minor dimension, as measured along a minor axis. In the depicted embodiment, the major dimension is greater than the minor dimension. When in the stored position, the major axis is generally parallel to the lateral direction L. In another embodiment, the major axis is generally parallel to a plane that extends through the first opening 52 of the chassis 12 when the cable spool assembly 62 is in the stored position. While the body 126 of the hub 120 has been described as being oval in shape, it will be understood that the scope of the present disclosure is not limited to the body 126 of the hub 120 being oval in shape. The body 126 of the hub 120 can have various geometric shapes (e.g., circular, obround, etc.).

In one embodiment, the depth of the cable spool assembly 62 is less than or equal to about 16 inches. In another embodiment, the depth of the cable spool assembly 62 is less than or equal to about 15 inches. In another embodiment, the width of the cable spool assembly 62 is less than or equal to about 18 inches. In another embodiment, the width of the cable spool assembly 62 is less than or equal to about 17 inches. In one embodiment, the body 126 is configured to receive at least about 500 feet of 3 mm fiber optic cable. In another embodiment, the body 126 is configured to receive at least about 400 feet of 3 mm fiber optic cable. In another embodiment, the body 126 is configured to receive at least about 200 feet of 3 mm fiber optic cable. In another embodiment, the body 126 is configured to receive at least about 250 feet of dual-zip 3 mm fiber optic cable. In another embodiment, the body 126 is configured to receive at least about 200 feet of dual-zip 3 mm fiber optic cable. In another embodiment, the body 126 is configured to receive at least about 100 feet of dual-zip 3 mm fiber optic cable.

The body 126 of the hub 120 includes a first longitudinal end 132, an oppositely disposed second longitudinal end 134, a first longitudinal side 136 that extends between the first and second longitudinal ends 132, 134 and an oppositely disposed second longitudinal side 138 that extends between the first and second longitudinal ends 132, 134. The first and second longitudinal ends 132, 134 are generally arcuate in shape. In the depicted embodiment, the first and second longitudinal ends 132, 134 are generally semi-circular in shape.

The hub 120 further includes a strain relief protrusion 140 that extends outwardly from the second surface 130 of the hub 120. In the depicted embodiment, the strain relief protrusion 140 is generally cylindrical in shape. The strain relief protrusion 140 has an outer diameter that is less than a distance between the first and second longitudinal sides 136, 138.

The hub 120 defines a cable transition notch 142 disposed in the first longitudinal side 136 of the body 126. The cable transition notch 142 extends inward into the body 126 from the first longitudinal end 132 to the strain relief protrusion 140. In the depicted embodiment, the cable transition notch 142 angles inwardly from the first longitudinal end 132 of the body 126 to the strain relief protrusion 140. The cable transition notch 142 is adapted to provide a location at which fiber optic cable coiled about the body 126 of the hub 120 can pass to the strain relief protrusion 140.

The hub 120 further defines a central bore 144. The central bore 144 extends through the first and second surfaces 128, 130 and through the strain relief protrusion 140.

The first flange 122 is engaged to the hub 120. In the subject embodiment, the first flange 122 is fastened (e.g., screwed, bolted, riveted, welded, bonded, etc.) to the first surface 128 of the hub 120. The first flange 122 is generally planar and oval in shape. The first flange 122 defines a bore 146 that is adapted for alignment with the central bore 144 of the hub 120 when the first flange 122 is engaged to the hub 120.

The second flange 124 is engaged to the hub 120. In the depicted embodiment, the second flange 124 is fastened (e.g., screwed, bolted, riveted, welded, bonded, etc.) to the second surface 130 of the hub 120.

The second flange 124 includes a central opening 148 that extends through the second flange 124. The central opening 148 is adapted to receive the strain relief protrusion 140 of the hub 120 when the second flange 124 is engaged to the hub 120 so that the strain relief protrusion 140 extends outwardly from the second flange 124 of the cable spool assembly 62. In the depicted embodiment, the central opening 148 is oversized to allow the fiber optic cable which passes through the cable transition notch 142 to pass through the central opening 148.

The second flange 124 includes an outer surface 150. The outer surface 150 includes a cable management area 152 and a termination area 154 disposed adjacent to the cable management area 152.

The cable management area 152 includes a plurality of fan-out mounting brackets 156. The fan-out mounting brackets 156 are spaced apart to receive a fan-out 158 (shown in FIG. 8), which separates optical fibers of a fiber optic cable, between the fan-out mounting brackets 156. The fan-out mounting brackets 156 extend outwardly from the outer surface 150 of the second flange 124. In the depicted embodiment, the fan-out mounting brackets 156 extend outwardly in a generally perpendicular direction. Each of the fan-out mounting brackets 156 includes at least one receptacle 160. In the depicted embodiment, each of the fan-out mounting brackets 156 includes two receptacles 160.

Referring now to FIGS. 8 and 15-18, the fan-out 158 is retained in the fan-out mounting bracket 156 by a fan-out clip 162. The fan-out clip 162 includes a cover plate 164 and a plurality of latches 166 that extend outwardly from the cover plate 164.

In the depicted embodiment, the cover plate 164 is similar in shape to the outline of the fan-out 158. The cover plate 164 includes a first end 168 and an oppositely disposed second end 170. The second end 170 includes a width that is less than a width of the first end 168 so that the cover plate 164 tapers from the first end 168 to the second end 170.

The latches 166 extend outwardly from the first end 168 of the cover plate 164 in a direction that is generally perpendicular to the cover plate 164. Each of the latches 166 includes a base end 172 and a free end 174. The base end 172 is engage to the cover plate 164. The free end 174 includes a latch protrusion 176 that is adapted for receipt in the receptacle 160 of the fan-out mounting bracket 156.

An alignment pin 178 extends outwardly from the second end 170 of the cover plate 164 of the fan-out clip 162. In the depicted embodiment, the alignment pin 178 extends in a direction that is generally parallel to the latches 166. The alignment pin 178 is sized to fit within a first alignment opening 180a in the fan-out 158. In one embodiment, the outer surface 150 of the second flange 124 includes a protrusion that is adapted to fit with a second alignment opening 180b of the fan-out 158. With the fan-out 158 disposed between the fan-out mounting brackets 156, the alignment pin 178 of the fan-out clip 162 is aligned with the first alignment opening 180a of the fan-out 158. The fan-out clip 162 is pressed down toward the outer surface 150 of the second flange 124 until the latch protrusion 176 engages the receptacle 160 of the fan-out mounting bracket 156.

In the depicted embodiment, the mounting brackets 156 are adapted to hold multiple fan-outs 158. Each of the fan-out mounting brackets 156 includes one receptacle 160 per fan-out 158 that the fan-out mounting brackets 156 can hold. In the depicted embodiment, the fan-out mounting brackets 156 can hold two fan-outs 158. So, in the depicted embodiment, each of the fan-out mounting brackets 156 defines two receptacles 160. If only one fan-out 158 is disposed in the fan-out mounting brackets 156, the fan-out clip 162 is pressed down until the latch protrusions 176 engage the receptacles 160 closest to the outer surface 150 of the second flange 124. If two fan-outs 158 are disposed in the fan-out mounting brackets 156, the fan-out clip 162 is pressed down until the latch protrusions 176 engage the receptacles 160 adjacent to the receptacles 160 closest to the outer surface 150 of the second flange 124.

Referring now to FIGS. 7 and 8, the cable management area 152 includes a plurality of bend radius protectors 182. The bend radius protectors 182 are disposed on the outer surface 150 of the second flange 124. The bend radius protectors 182 are adapted to prevent damage to the optical fibers that are routed from the fan-out 158 to the termination area 154. In the depicted embodiment, each of the bend radius protectors 182 is arcuate in shape and includes a retention projection 184 that extends outwardly from a convex surface 186 of the bend radius protector 182.

Figure 19:
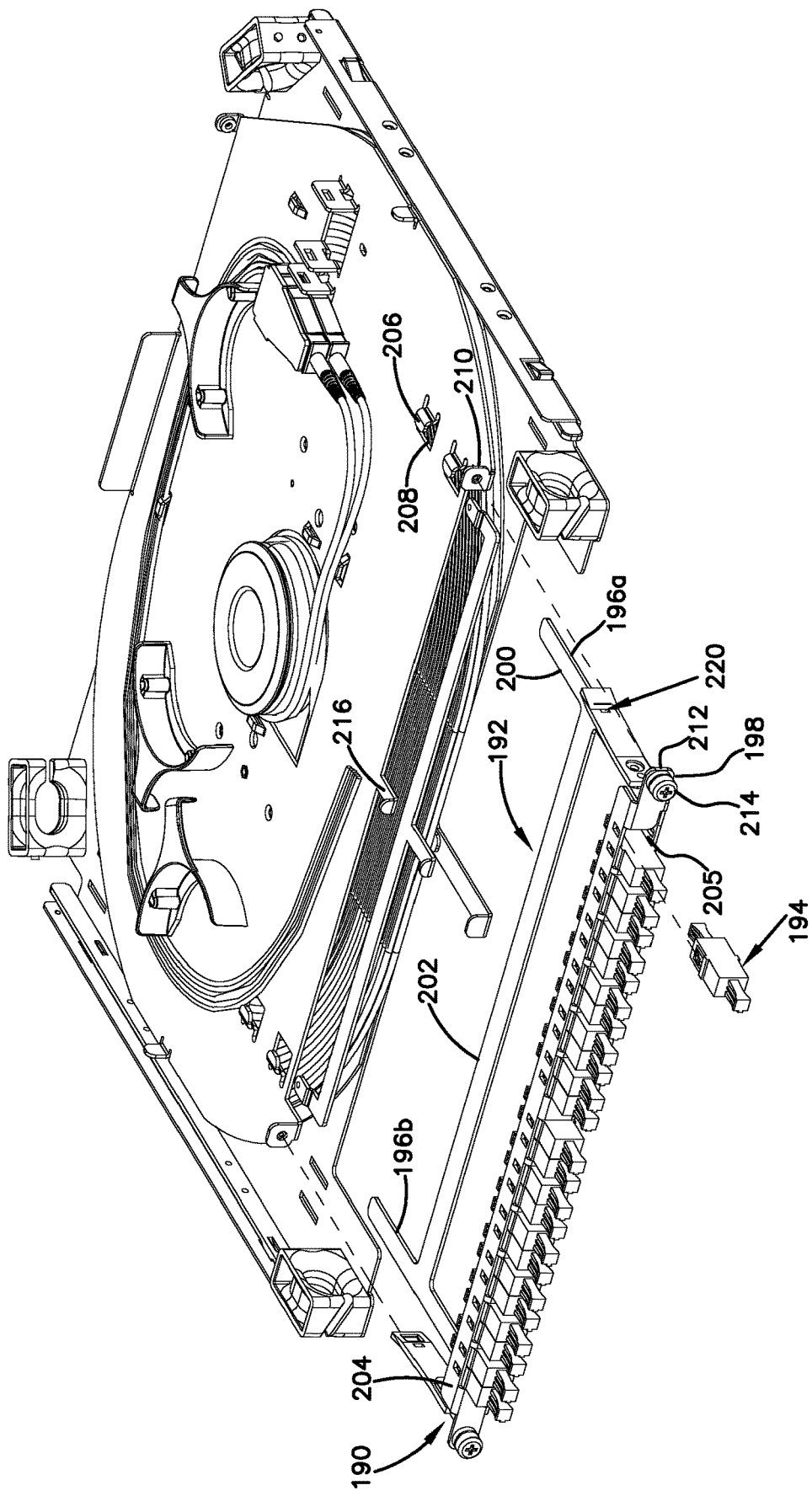
FIG. 19 is a perspective view of the tray assembly of FIG. 7 showing an adapter module.
Figure 20:
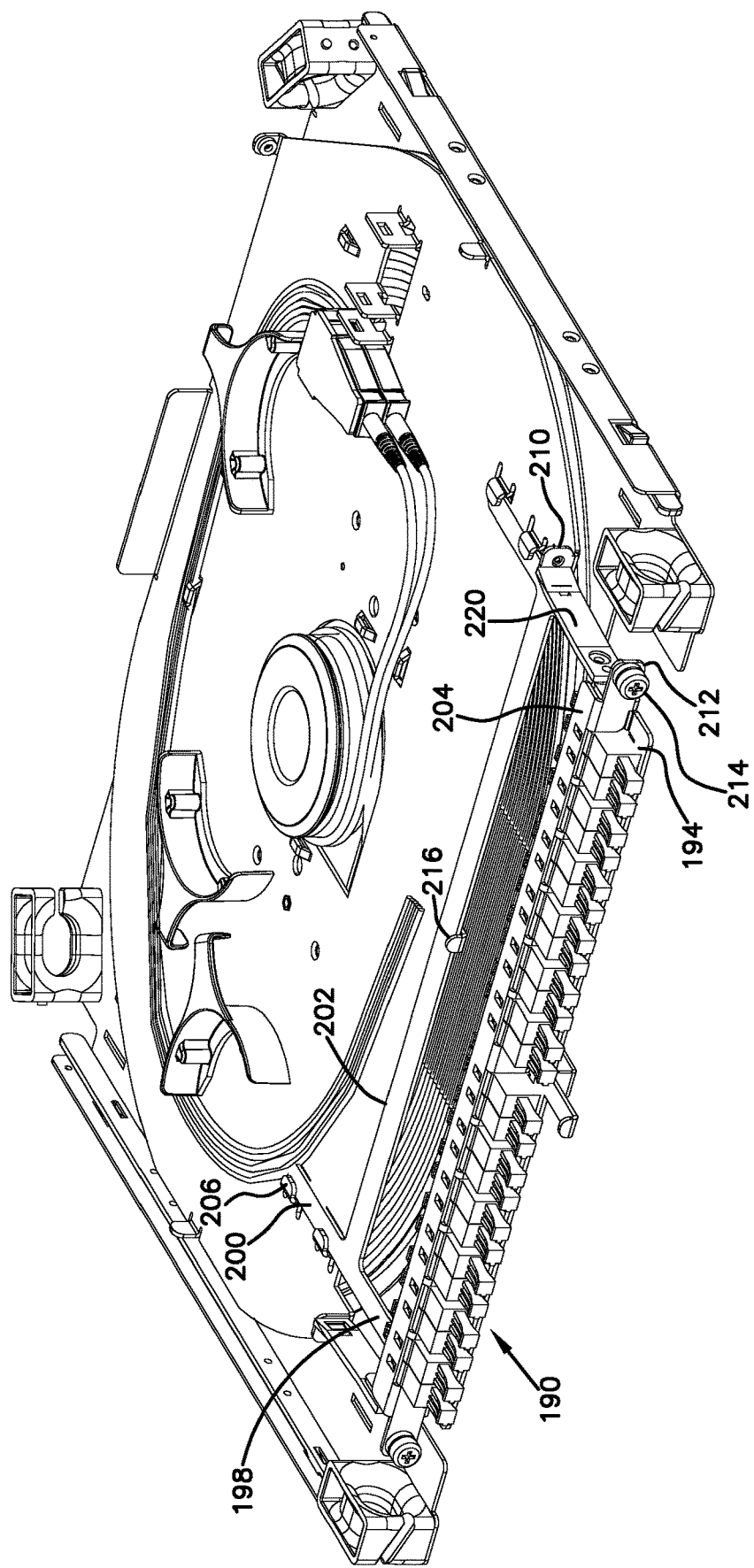
FIG. 20 is a perspective view of the tray assembly of FIG. 7 with the adapter module in an extended position.

Referring now to FIGS. 7, 19, and 20, the termination area 154 includes an adapter module 190 (e.g., a termination unit, etc.). The adapter module 190 is adapted to rotate in unison with the cable spool assembly 62 and to slide relative to the second flange 124. The adapter module 190 is adapted to slide relative to the second flange 124 in a direction that is generally parallel to the second flange 124 between a retracted position (shown in FIG. 7) and an extended position (shown in FIG. 20). In the depicted embodiment, the adapter module 190 is adapted to slide in a direction that is generally parallel to the front-to-back direction F-B. The adapter module 190 includes a carrier 192 and a plurality of adapters 194 disposed in the carrier 192.

In the depicted embodiment, the carrier 192 includes a first rail 196a and a second rail 196b. Each of the first and second rails 196a, 196b includes a first axial end 198 and a second axial end 200. The carrier 192 further includes a cross-support 202 that extends between the first and second rails 196a, 196b at a location between the first and second axial ends 198, 200.

An adapter mounting bracket 204 is engaged with the first axial ends 198 of the first and second rails 196a, 196b. The adapter mounting bracket 204 defines a plurality of adapter openings 205 that is adapted to receive the plurality of adapters 194. In the depicted embodiment, the adapter openings 205 are arranged in a line that is generally perpendicular to the direction of slide movement of the adapter module 190 so that the direction of slide movement of the adapter module 190 is generally perpendicular to the line of adapters 194 mounted in the adapter mounting bracket 204.

In one embodiment, the adapter mounting bracket 204 is adapted to receive twenty-four adapters 194. In another embodiment, the adapter mounting bracket 204 is adapted to receive twelve adapters 194. In another embodiment, the adapter mounting bracket 204 is adapted to receive forty-eight adapters 194.

The first and second rails 196a, 196b of the adapter module 190 are slidably engaged to the outer surface 150 of the second flange 124 by a plurality of guides 206. The guides 206 extend outwardly from the outer surface 150 and define channels 208 in which the first and second rails 196a, 196b are slidably disposed.

The second flange 124 defines a plurality of mounting tabs 210 that extend outwardly from a perimeter of the outer surface 150. The mounting tabs 210 are adapted to abut mounts 212 that extend outwardly from the first axial ends 198 of the first and second rails 196a, 196b when the adapter module 190 is in the retracted position. With the adapter module 190 in the retracted position, fasteners 214 (e.g., screws, bolts, rivets, etc.) disposed through the mounts 212 can be engaged to the mounting tabs 210 to retain the adapter module 190 in the retracted position. In one embodiment, the fasteners 214 are captive thumb screws.

With the fasteners 214 disengaged from the mounting tabs 210, the adapter module 190 can be translated outwardly from the second flange 124 of the cable spool assembly 62 in a direction that is generally parallel to the front-to-back direction F-B to the extended position. In one embodiment, the adapter module 190 has a range of travel of at least two inches. In another embodiment, the adapter module 190 is adapted to slide a distance that provides access to inward facing ports of the adapters 194 when the tray assembly 14 is engaged to the chassis 12. By providing access to the inward facing ports of the adapters 194, connectorized ends of fiber optic cables that are plugged into the inward facing ports of the adapters 194 can be removed and cleaned while the tray assembly 14 is engaged to the chassis 12.

In the extended position, a catch 216 abuts the cross-support 202 and prevents the adapter module 190 from moving farther outward from the second flange 124. In the depicted embodiment, the catch 216 extends outwardly from a perimeter of the second flange 124.

The adapter module 190 includes a plurality of resilient latches 220 that is engaged with the first axial ends 198 of the first and second rails 196a, 196b. The resilient latches 220 are disposed between the first and second rails 196a, 196b and the mounting tabs 212. When the adapter module 190 is in the extended position (shown in FIG. 20), the resilient latches are adapted to engage the mounting tabs 212 to prevent the adapter module 190 from being moved inwardly toward the second flange 124. The engagement of the resilient latches 220 and the mounting tabs 212 prevents the adapter module 190 from moving toward the retracted position as connectorized ends of fiber optic cables are inserted into outward facing ports of the adapters 194.

Figure 21:
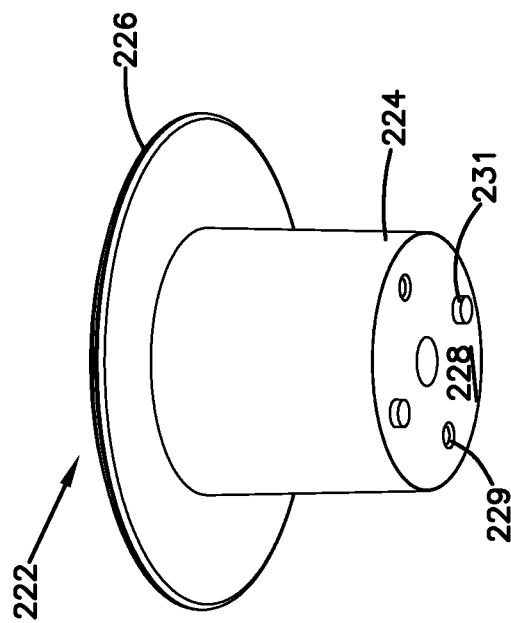
FIG. 21 is a perspective view of a bushing suitable for use with the tray assembly.
Figure 22:
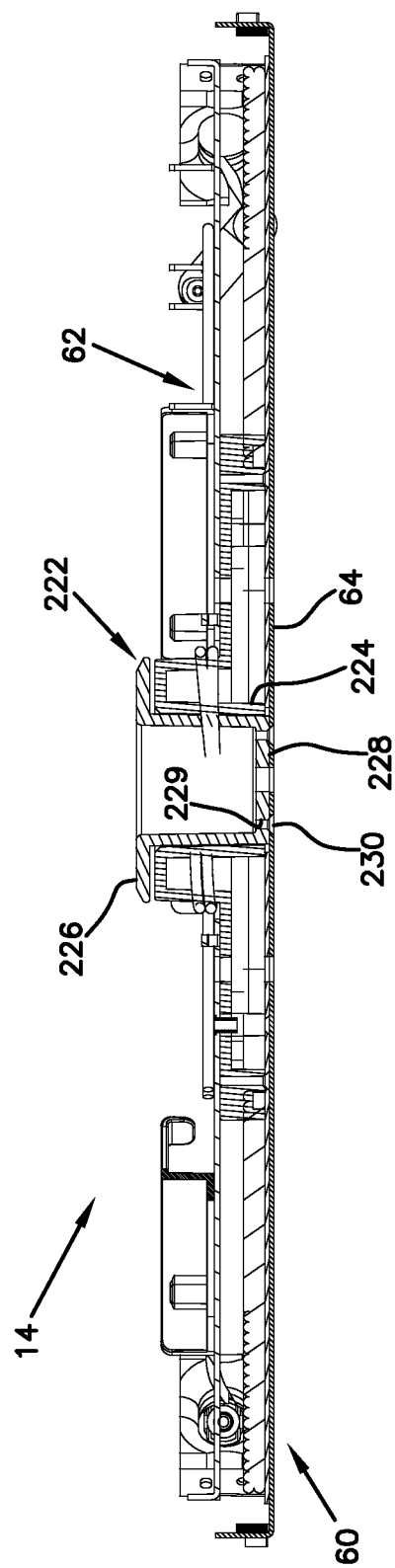
FIG. 22 is a cross-sectional view of the tray assembly taken through the bushing.

Referring now to FIGS. 8, 21, and 22, the installation of the cable spool assembly 62 to the tray 60 will be described. The cable spool assembly 62 is rotatably engaged to the tray 60 by a bushing 222. In the depicted embodiment, the bushing 222 provides the engagement between the cable spool assembly 62 and the base panel 64 of the tray 60.

The bushing 222 is generally cylindrical in shape. The bushing 222 includes a first axial end 224 and a second axial end 226. The first axial end 224 of the bushing 222 includes an end surface 228. The end surface 228 is adapted for abutment with the base panel 64 of the tray 60. In one embodiment, the end surface 228 defines a hole 229 that extends through the end surface 228. The hole 229 is adapted to receive a fastener 230 (e.g., screw, bolt, etc.) that is used to secure or anchor the bushing 222 to the tray 60. The end surface 228 includes a peg 231 that extends outwardly from the end surface 228. The peg 231 is adapted for receipt in an opening in the base panel 64 of the tray 60. The peg 231 is adapted to prevent the bushing 222 from rotating relative to the tray 60.

The first axial end 224 has an outer diameter that is less than the inner diameter of the central bore 144 of the hub 120 so that the first axial end 224 of the bushing 222 can be inserted into the central bore 144 of the hub 120. The second axial end 226 has an outer diameter that is greater than the inner diameter of the central bore 144 of the hub 120. With the first axial end 224 of the bushing 222 disposed in the central bore 144 of the hub 120 and the fastener securing the end surface 228 to the base panel 64, the second axial end 226 abuts an end surface of the strain relief protrusion 140 of the hub 120 and captures the cable spool assembly 62 between the base panel 64 of the tray 60 and the second axial end 226 of the bushing 222. As the bushing 222 is generally cylindrical in shape, the cable spool assembly 62 can rotate about the bushing 222. In one embodiment, the bushing 222 is keyed to the base panel 64 so that the bushing 222 is stationary relative to the tray 60.

Figure 14:
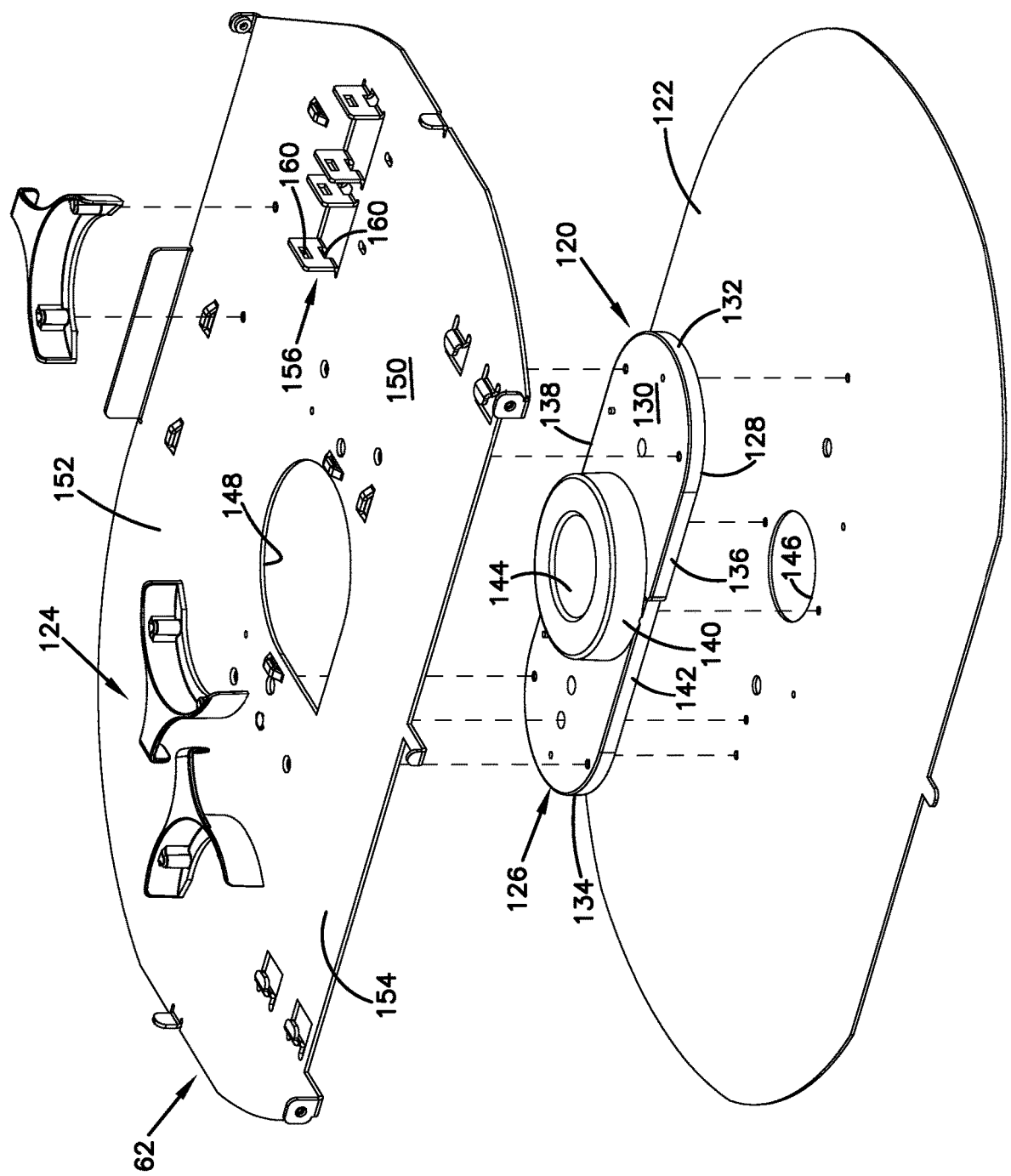
FIG. 14 is an exploded view of the cable spool assembly of FIG. 13.

Referring now to FIGS. 7 and 14, the routing of a fiber optic cable 232 in the tray assembly 14 will be described. The fiber optic cable 232 includes a first end and a second end. The fiber optic cable 232 is coiled about the body 126 of the hub 120 of the cable spool assembly 62 between the first and second flanges 122, 124.

The first end of the fiber optic cable 232 is disposed closest to the hub 120. A portion of the first end passes through the cable transition notch 142 in the hub 120 and through the central opening 148 of the second flange 124. The portion of the first end of the fiber optic cable 232 is coiled at least once around the strain relief protrusion 140 of the hub 120. In one embodiment, the first end is anchored to the second flange 124 (e.g., with a cable tie) after being wrapped at least once around the strain relief protrusion 140. The first end is routed from the strain relief protrusion 140 to the fan-out 158. Optical fibers 233 are separated from the fiber optic cable 232 at the fan-out 158. Each of the optical fibers 233 includes a connectorized end. The connectorized ends of the optical fibers 233 are routed to the adapters 194 and engaged to inward facing ports of the adapters 194.

In one embodiment, the second end of the fiber optic cable 232 has a multi-fiber connector 353c. The second end can be routed outside of the tray assembly 14 at a location adjacent to the first end portion 66 of the base panel 64 of the tray 60 or at an opposite location adjacent to the second end portion 68 of the base panel 64 of the tray 60. The second end is routed through the passage 98 of any one of the bend radius protectors 90 disposed on the tray 60.

Referring now to FIG. 3, the insertion of the tray assembly 14 into the chassis 12 will be described. The tray assembly 14 is adapted for insertion into the chassis 12 through either the first opening 52 or the second opening 54 of the chassis 12.

To insert the tray assembly 14 into the first opening 52 of the chassis 12, the second axial ends 78 of the first and second resilient latches 74a, 74b of the tray assembly 14 are flexed inwardly. The second end portion 68 of the base panel 64 of the tray 60 is inserted through the first opening 52 of the chassis 12. The tray assembly 14 is then pushed into the interior region 50 of the chassis 12 until the first and second protrusions 80, 82 on each of the first and second resilient latches 74a, 74b are engaged in the holes 48 of the first and second sidewalls 18, 20 of the chassis 12. In the depicted embodiment, the first and second protrusions 80, 82 on each of the first and second resilient latches 74a, 74b provide four-point contact between the tray assembly 14 and the chassis 12.

The first protrusions 80 of the first and second resilient latches 74a, 74b prevent the tray assembly 14 from being removed through the first opening 52 of the chassis 12 by abutting the holes 48 in the chassis 12 but allow the tray assembly to be removed through the second opening 54 of the chassis 12. The second protrusions 82 of the first and second resilient latches 74a, 74b prevent the tray assembly 14 from being removed through the second opening 54 of the chassis 12 but allow the tray assembly 14 to be removed through the first opening 52 of the chassis 12.

To remove the tray assembly 14 from the first opening 52 of the chassis 12, the first axial end portions 76 of the resilient latches 74a, 74b of the tray assembly 14 are flexed inwardly until the lips 84 of the first protrusions 80 are no longer disposed in the holes 48 of the chassis 12. With the first axial end portions 76 of the resilient latches 74a, 74b of the tray assembly 14 flexed inwardly, the tray assembly 14 is pulled out of the first opening 52 of the chassis 12. As the tray assembly 14 is pulled out of first opening 52, the angled surfaces 86 of the second protrusions 82 contact an edge of the hole 48 that causes the second axial end portions 78 of the resilient latches 74a, 74b to flex inwardly.

To insert the tray assembly 14 into the second opening 54 (shown in FIG. 4) of the chassis 12, the first axial end portions 76 of the first and second resilient latches 74a, 74b of the tray assembly 14 are flexed inwardly. The first end portion 66 of the base panel 64 of the tray 60 is inserted through the second opening 54 of the chassis 12. The tray assembly 14 is pushed into the interior region 50 of the chassis 12 until the first and second protrusion of the first and second resilient latches are engaged in the holes 48 of the first and second sidewalls 18, 20 of the chassis 12.

To remove the tray assembly 14 from the second opening 54 of the chassis 12, the second axial end portions 78 of the resilient latches 74a, 74b of the tray assembly 14 are flexed inwardly until the lips 84 of the second protrusions 82 are no longer disposed in the holes 48 of the chassis 12. With the second axial end portions 78 of the resilient latches 74a, 74b of the tray assembly 14 flexed inwardly, the tray assembly 14 is pulled out of the second opening 54 of the chassis 12. As the tray assembly 14 is pulled out of first opening 52, the angled surfaces 86 of the first protrusions 80 contact an edge of the hole 48 that causes the first axial end portions 76 of the resilient latches 74a, 74b to flex inwardly.

With the tray assembly 14 installed in the chassis 12, the fiber optic cable 232 can be deployed by pulling the second end of the fiber optic cable 232 through one of the first and second openings 52, 54 of the chassis 12. As the fiber optic cable 232 is pulled, the cable spool assembly 62 rotates about the bushing 222. As the cable spool assembly 62 rotates, the adapter module 190 rotates in unison. Since the adapter module 190 rotates in unison with the cable spool assembly 62, the connectorized ends of the first end of the fiber optic cable 232 can be engaged in the inwardly facing ports of the adapters 194. The second end of the fiber optic cable 232 is pulled until a desired length of fiber optic cable 232 has been deployed.

Figure 23:
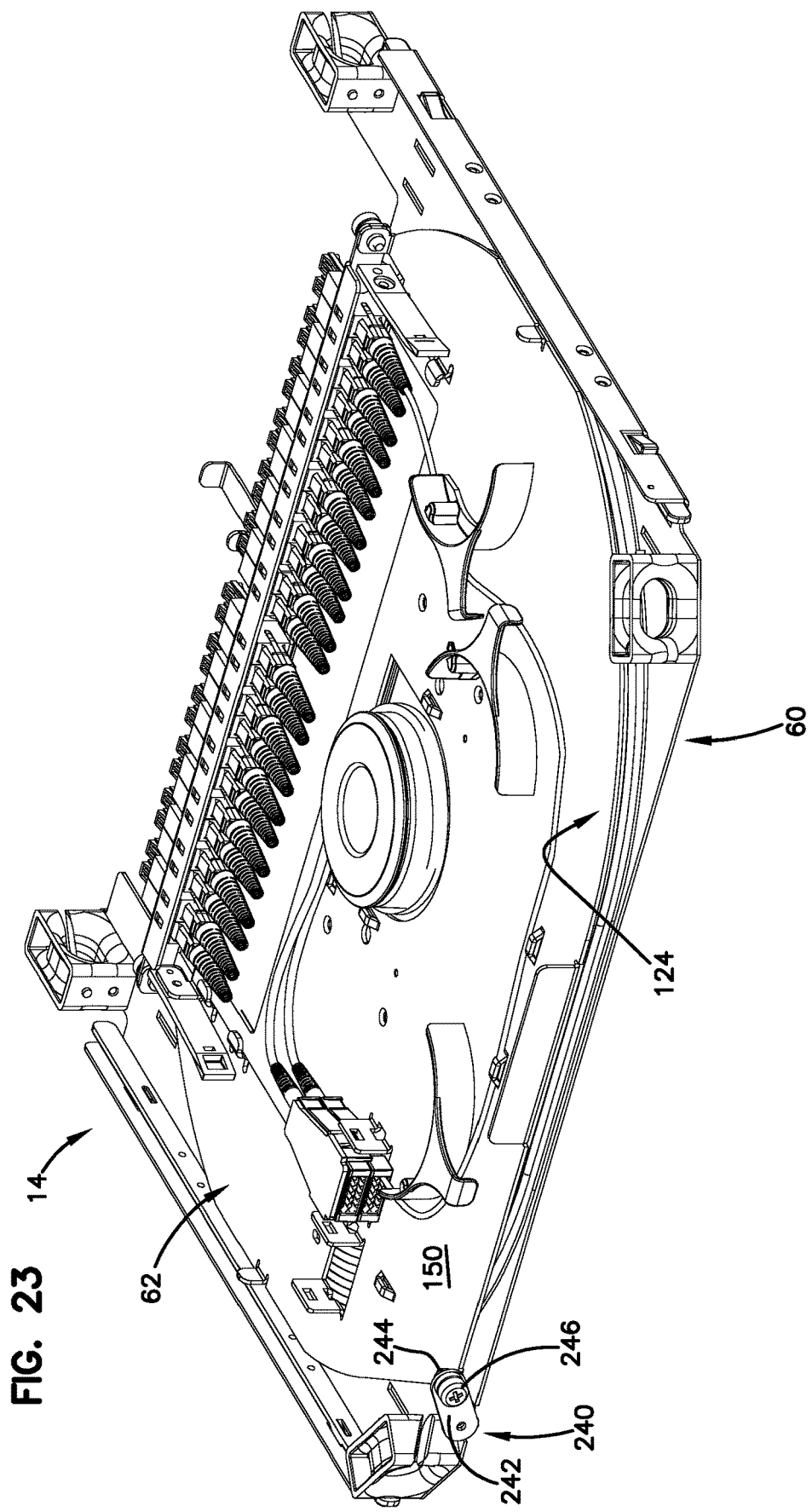
FIG. 23 is a perspective view of a locking mechanism suitable for use with the tray assembly of FIG. 7.
Figure 24:
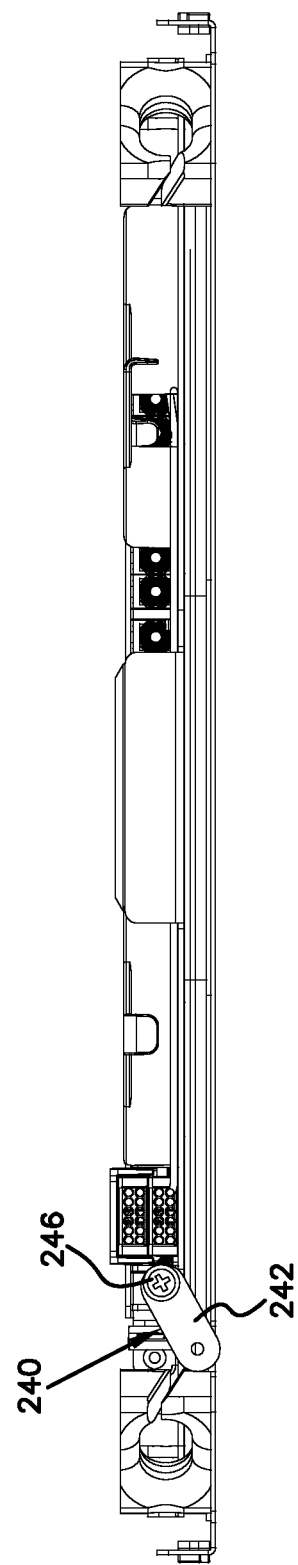
FIG. 24 is a view of the locking mechanism of FIG. 23.

Referring now to FIGS. 23 and 24, a locking mechanism 240 is shown. The locking mechanism 240 is adapted to prevent the cable spool assembly 62 from rotating relative to the tray 60. In one embodiment, the locking mechanism 240 provides an electrical connection between the tray 60 and the cable spool assembly 62 so as to serve as a ground. A separate ground is provided between the tray 60 and the chassis 12.

The locking mechanism 240 includes an arm 242 that pivots about a location on the tray 60. In the depicted embodiment, the arm 242 pivots about a location disposed at the second end portion 68 of the base panel 64 of the tray 60.

When a desired length of fiber optic cable 232 has been deployed, the arm 242 is pivoted toward the second flange 124 of the cable spool assembly 62. The second flange 124 includes a lock mount 244 (best shown in FIG. 13) that extends outwardly from the outer surface 150 of the second flange 124 and is disposed at an outer perimeter of the second flange 124. The arm 242 of the locking mechanism 240 is pivoted until a fastener 246 (e.g., thumbscrew) that extends through the arm 242 is aligned with an opening 248 in the lock mount 244. The fastener 246 is then engaged with the opening 248 to secure the cable spool assembly 62 in position relative to the tray 60.

Figure 25:
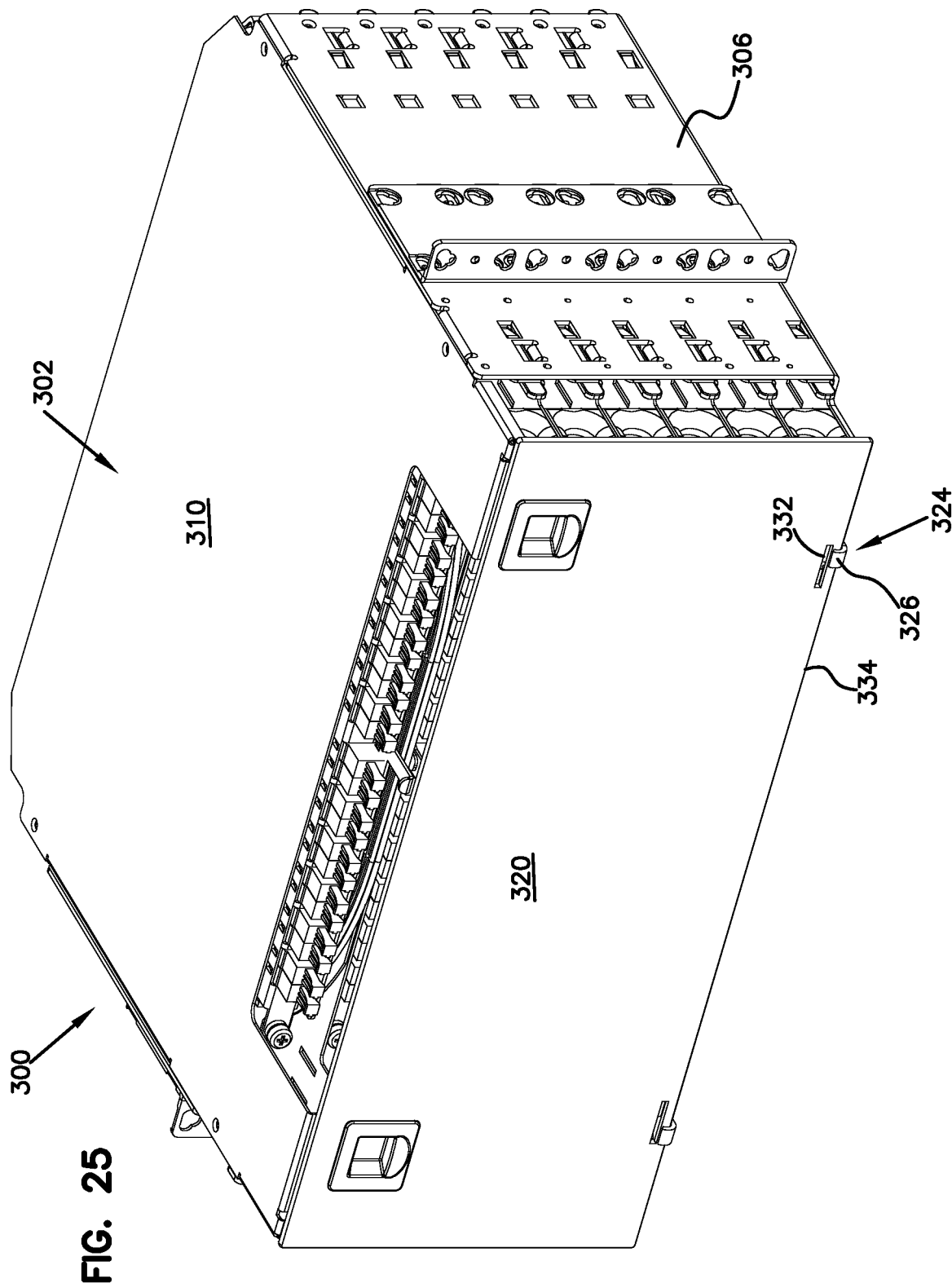
FIG. 25 is an alternate embodiment of a telecommunications assembly having exemplary features of aspects in accordance with the principles of the present disclosure.
Figure 26:
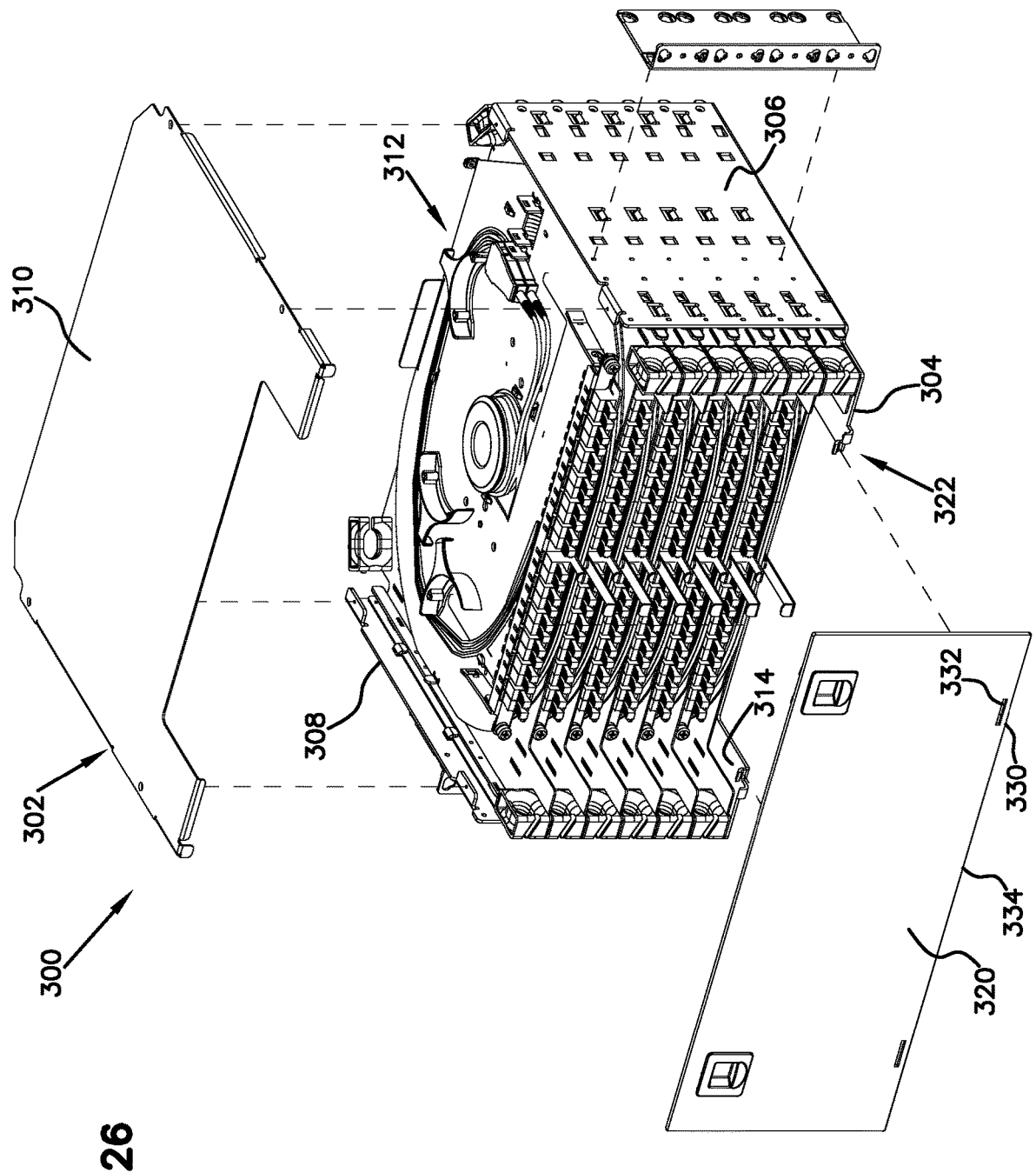
FIG. 26 is an exploded perspective view of the telecommunications assembly of FIG. 25.
Figure 27:
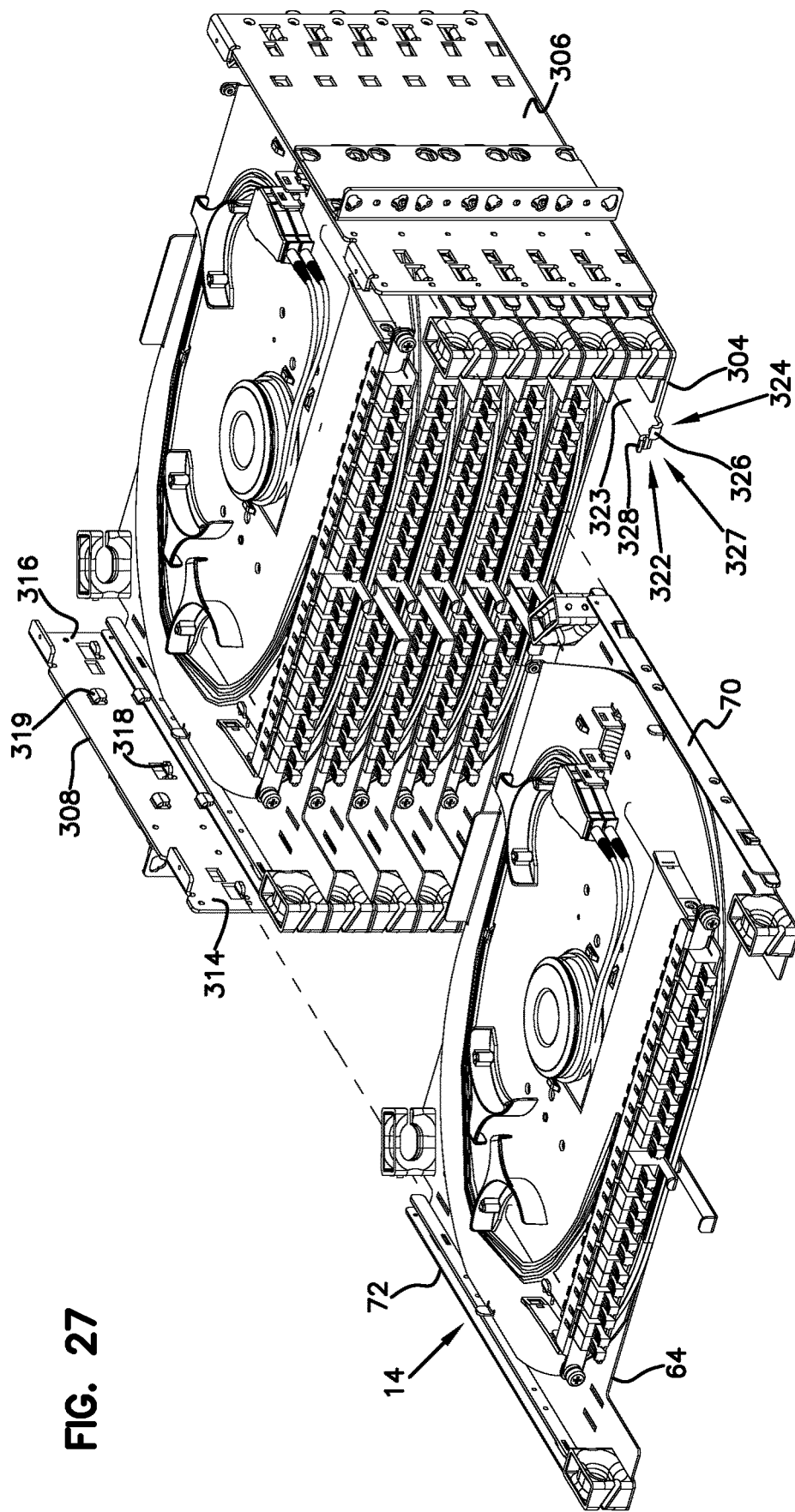
FIG. 27 is a perspective view of the telecommunications assembly of FIG. 25 with a tray removed.

Referring now to FIGS. 25-27, an alternate embodiment of a telecommunications assembly 300 is shown. The telecommunications assembly 300 includes a chassis 302 and multiple tray assemblies 14.

The chassis 302 is similar to the chassis 12 previously described except that the chassis 302 is adapted to receive multiple tray assemblies 14. Therefore, it will be understood that the features described with regard to the chassis 12 may be incorporated in the chassis 302.

The chassis 302 includes a base wall 304, a first sidewall 306 that extends outwardly from the base wall 304, an oppositely disposed second sidewall 308 and a cover 310. The base wall 304, the first and second sidewalls 306, 308 and the cover 310 cooperatively define an interior region 312 that is adapted to receive the plurality of tray assemblies 14. The base wall 304, the first and second sidewalls 306, 308 and the cover 310 further define a first opening 314 to the interior region 312 and an oppositely disposed second opening 316 to the interior region 312.

The first and second sidewalls 306, 308 of the chassis 302 include a plurality of first tray guides 318 (best shown in FIG. 27). The first tray guides 318 extend into the interior region 312 of the chassis 302. The first tray guides 318 are adapted to abut the base panel 64 of the tray assembly 14 and to support the tray assembly 14 in the interior region 312 of the chassis 302.

The first and second sidewalls 306, 308 of the chassis 302 further include a plurality of second tray guides 319. The second tray guides 319 define a channel through which the first and second side portions 70, 72 of the base panel 64 of the tray assembly 14 pass.

The tray assemblies 14 can be installed into the chassis 302 in a manner that is similar to the installation of the tray assembly 14 in the chassis 12, which was previously described. In the depicted embodiment, the tray assemblies 14 are disposed in a vertical orientation in the interior region 312 of the chassis 302.

In one embodiment, the telecommunications assembly 300 includes a front cover plate 320. The front cover plate 320 is engaged to the base wall 304 by a hinge 322. In the depicted embodiment, the hinge 322 is integral with a first end 323 of the base wall 304. The hinge 322 includes a first arm 324 having a first curved portion 326 that opens in a first direction and a second arm 327 having a second curved portion 328 that opens in an opposite second direction. The first and second curved portions 326, 328 are adapted to capture a bar 330 of the front cover plate 320 that is disposed between an opening 332 through the front cover plate 320 and an adjacent edge 334 of the front cover plate 320. In the depicted embodiment, the front cover plate 320 is adapted to pivot between an open position and a closed position (shown in FIG. 23).

Figure 28:
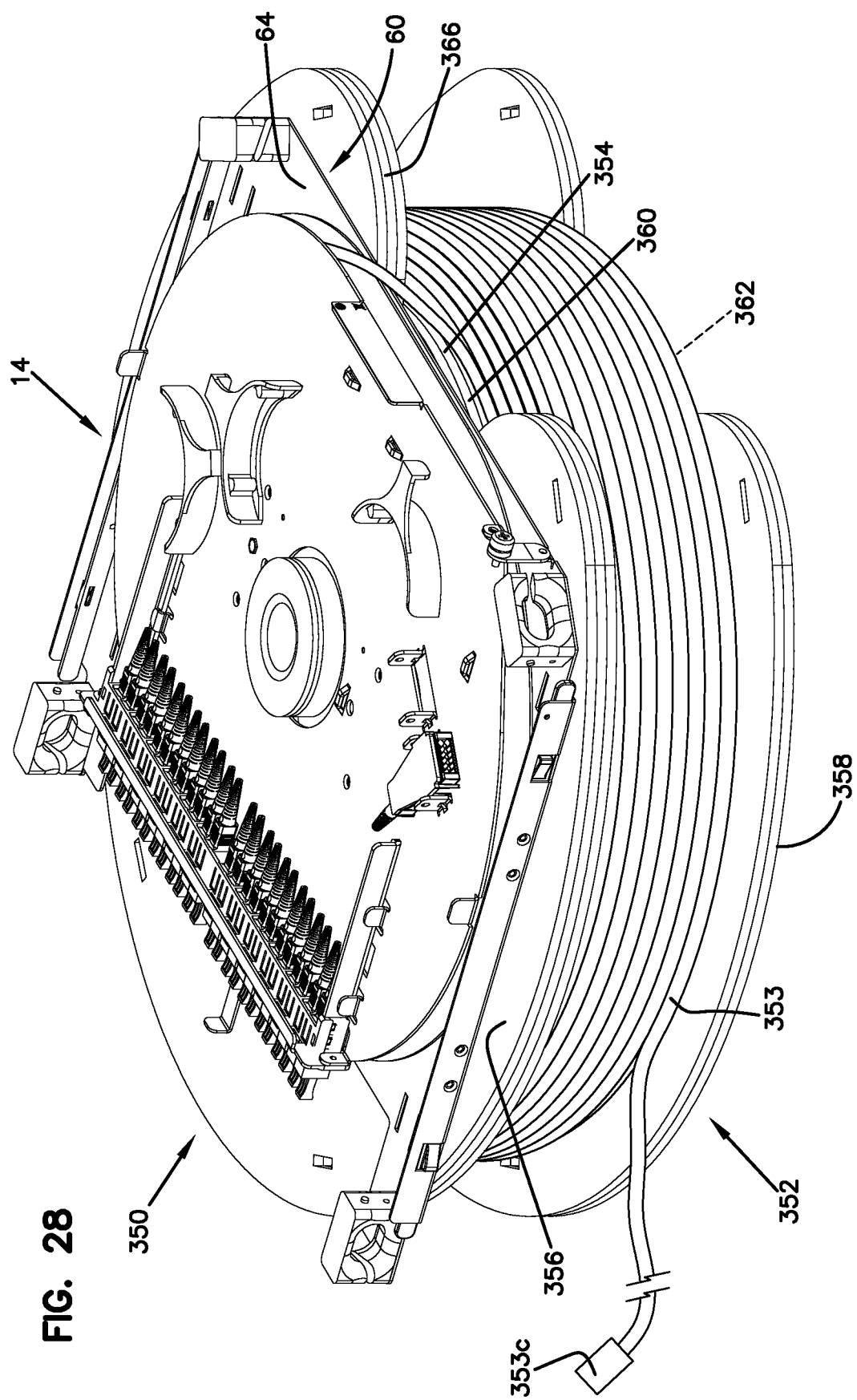
FIG. 28 is a perspective view of a cable assembly.
Figure 29:
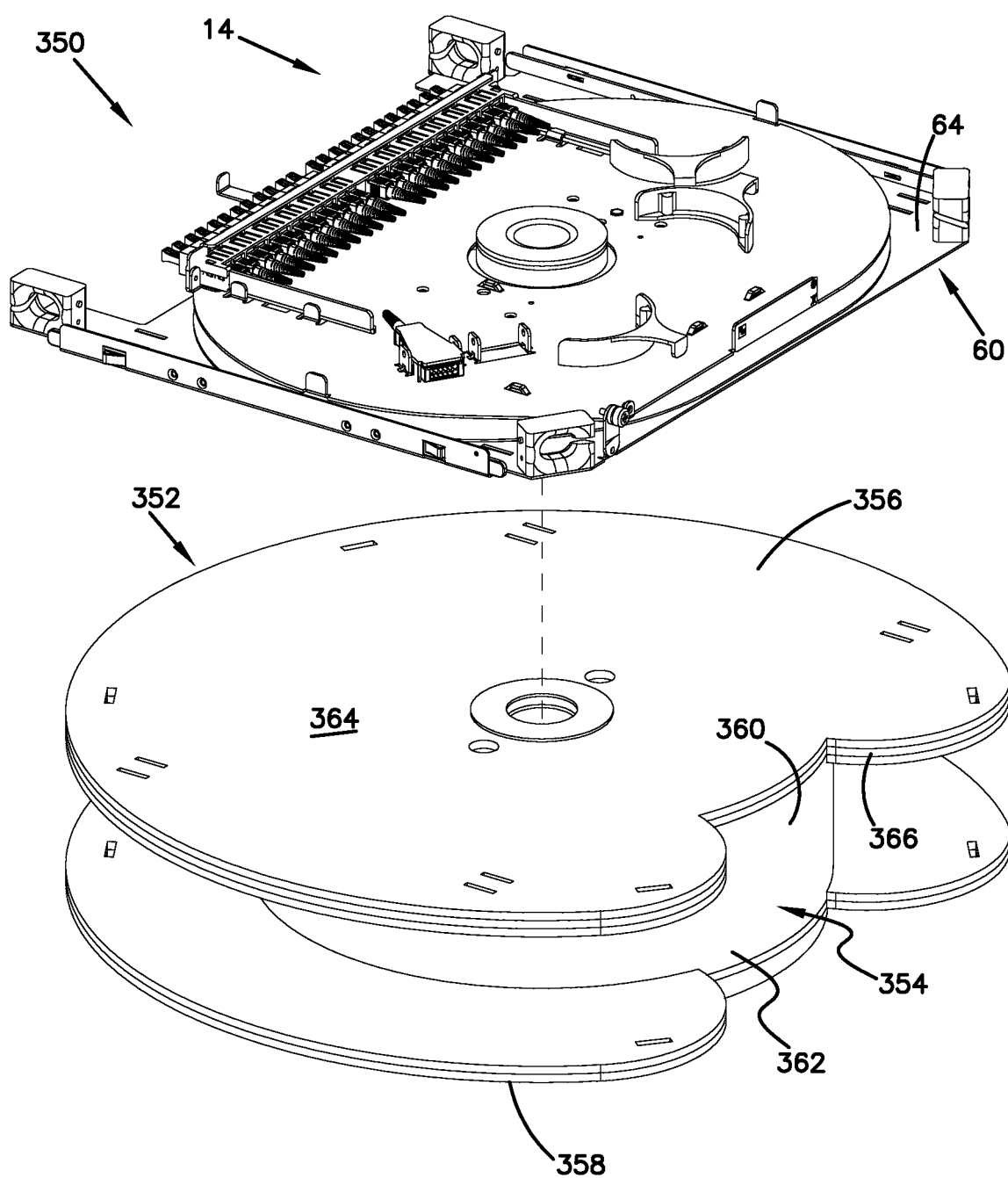
FIG. 29 is an exploded perspective view of the cable assembly of FIG. 28.

Referring now to FIGS. 28 and 29, a cable assembly 350 is shown. The cable assembly 350 includes the tray assembly 14 mounted to a cable spool 352. The cable assembly 350 is adapted to provide a length of fiber optic cable 353 that is greater than the length that can fit around the cable spool assembly 62 of the tray assembly 14. In the depicted embodiment, the cable spool 352 can hold a length of the fiber optic cable 353 that is greater than or equal to 500 feet of 3 mm fiber optic cable. In another embodiment, the cable spool 352 can hold a length of the fiber optic cable 353 that is greater than or equal to 1,000 feet of 3 mm fiber optic cable.

The cable spool 352, including a drum 354 and/or flanges 356, 358, can be manufactured of a plastic material, a paper board material (e.g., cardboard or like material) or a recycled material. In one embodiment, the cable spool 352 is recyclable or disposable after use.

The cable spool 352 includes the drum 354, the first flange 356, and the second flange 358. The drum 354 is adapted to receive the fiber optic cable 353 coiled around the drum 354. The drum 354 includes a first axial end 360 and an oppositely disposed second axial end 362. The first flange 356 is engaged to the first axial end 360 of the drum 354. The second flange 358 is engaged to the second axial end 362 of the drum 354.

The tray assembly 14 is mounted to an outer surface 364 of the first flange 356 of the cable spool 352. In one embodiment, the tray assembly 14 is tied down to the first flange 356 so that the base panel 64 of the tray 60 abuts the outer surface 364 of the first flange 356.

To assemble the cable assembly 350, a first end of a length of the fiber optic cable 353 is coiled around the cable spool assembly 62 of the tray assembly 14. The fiber optic cable 353 is routed from the cable spool assembly 62 of the tray assembly 14 through one of the bend radius protectors 90 and through a notch 366 in the first flange 356 and around the drum 354. The notch 366 in the first flange 356 extends inwardly from an outer edge of the first flange 356 to the drum 354. The notch 366 allows the fiber optic cable 353 to pass to the drum 354 of the cable spool 352 from an off-drum location.

To deploy the fiber optic cable 353 from the cable assembly 350, the cable assembly 350 is positioned in front of or behind a telecommunications mount (e.g., rack 15, frame, etc.), which is adapted to receive the telecommunications assembly 10, 300, depending on whether the telecommunications assembly 10, 300 is to installed from the front or back of the telecommunications mount. The fiber optic cable 353 is deployed from the cable spool 352 of the cable assembly 350. In one embodiment, the cable spool 352 with tray assembly 14 attached thereto is mounted to a spindle/rotation structure 370 (see FIG. 35). The fiber optic cable 353 is pulled from the cable spool 352, which causes rotation of the cable spool 352 and concurrent rotation of the tray assembly 14 carried by the cable spool 352.

After the fiber optic cable 353 is paid out from the cable spool 352, the cable spool assembly 62 of the tray assembly 14 is rotated relative to the tray 60 and the cable spool 352 to pay off additional fiber optic cable 353 disposed about the cable spool assembly 62. With the fiber optic cable 353 paid out or partially paid out, the multi-fiber connector 353*c* of the second end of the fiber optic cable 353 is plugged into a component.

The cable spool 352 is then removed from the tray assembly 14. In one embodiment, the cable spool 352 is discarded (e.g., disposed of or recycled). The tray assembly 14 is moved toward the rack 15 (shown in FIG. 1). As the tray assembly 14 is moved toward the rack 15, the cable spool assembly 62 rotates relative to the tray 60 to provide additional length of the fiber optic cable 353. The tray assembly 14 is then installed into the chassis 12, 302, which, in one embodiment, is pre-mounted in the rack 15. If it is desired to route the fiber optic cable 353 out the front of the chassis 12 or the front of the rack 15, the tray assembly 14 is inserted into the rack 15 from the front. If it is desired to route the fiber optic cable 353 out the back of the chassis 12 or the back of the rack 15, the tray assembly 14 is inserted into the rack 15 from the back. With the tray assembly 14 engaged to the chassis 12, the telecommunications assembly 10, 300 is installed in the telecommunications mount.

The cable assembly 350 is depicted at FIGS. 28 and 29 including the cable spool 352. In other embodiments, other spool assemblies may be used. For example, the spool assemblies disclosed at U.S. provisional patent application Ser. No. 61/370,070, filed Aug. 2, 2010, hereby incorporated by reference in its entirety, can be included in certain embodiments. In still other embodiments, a cable spool 352', described below, can be included.

Turning now to FIGS. 30-34, a tray assembly 14' of the present disclosure is illustrated. The tray assembly 14' is similar to the tray assembly 14, disclosed above. The tray assembly 14' includes a tray 60' (e.g., a shelf, a drawer, etc.) and a cable spool assembly 62' rotatably mounted to the tray 60'. The tray 60' is similar to the tray 60, and the cable spool assembly 62' is similar to the cable spool assembly 62. Similar to the tray assembly 14, the tray assembly 14' is adapted for insertion and removal from the chassis 12 and 302 as a unit, without requiring the cable spool assembly 62' to be detached from the tray 60'.

The tray 60' includes a base panel 64' having a first end portion 66' (e.g., a front end portion), an oppositely disposed second end portion 68' (e.g., a back end portion), a first side portion 70' that extends at least partially between the first and second end portions 66', 68' and an oppositely disposed second side portion 72' that extends at least partially between the first and second end portions 66', 68'. In the depicted embodiment, the first and second side portions 70', 72' extend outwardly from the base panel 64' in a generally perpendicular direction.

Figure 31:
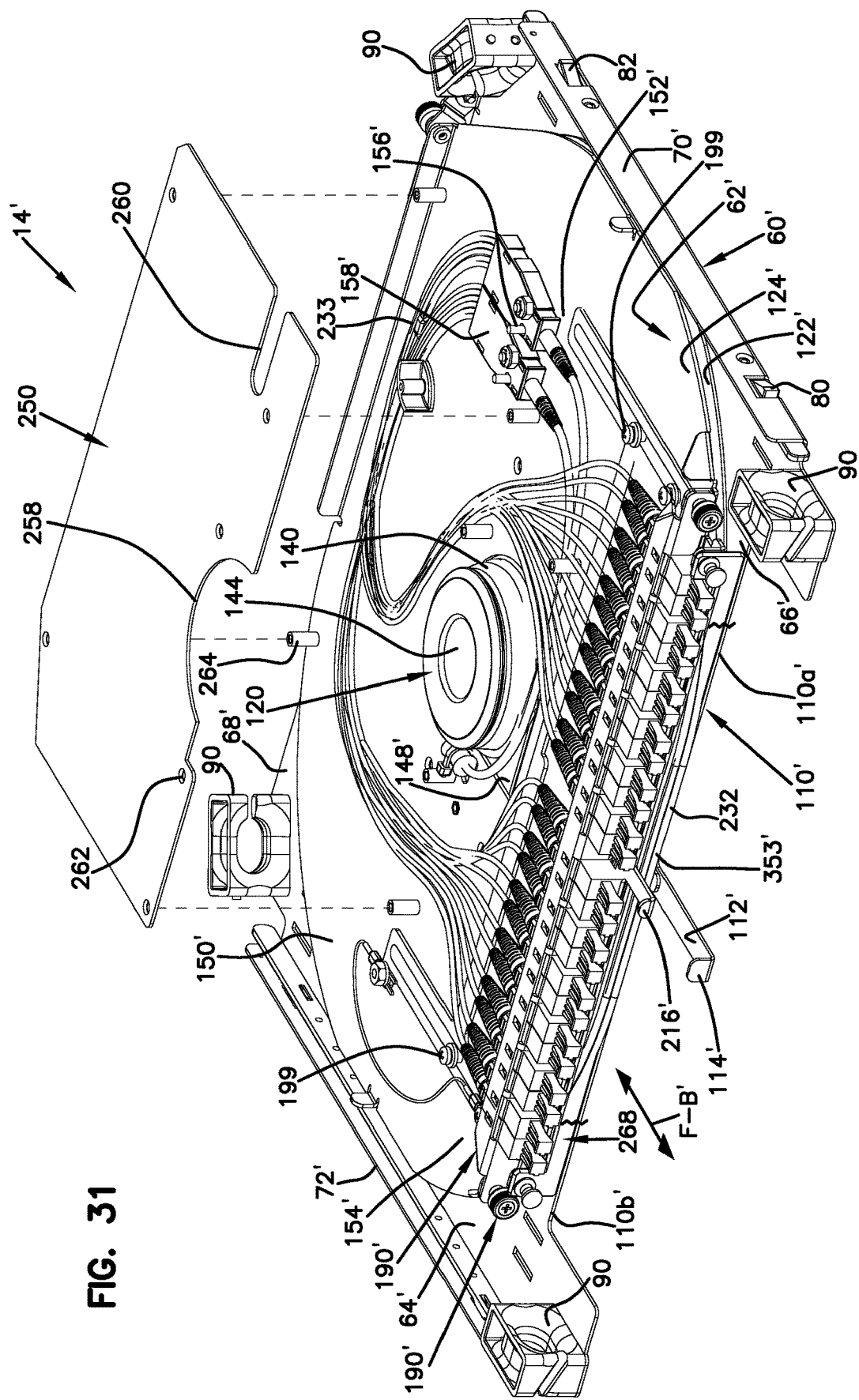
FIG. 31 is an exploded perspective view of the tray assembly of FIG. 30.

Referring now to FIG. 31, the first end portion 66' of the tray 60' defines a recess 110'. A tab 112' extends from the base panel 64' into the recess 110' and separates the recess 110' into a first recess 110*a'* and a second recess 110*b'*. The tab 112' is generally coplanar with the base panel 64'. The tab 112' includes a free end 114' that extends in a direction that is generally perpendicular to the base panel 64'. In the depicted embodiment, the first and second recesses 110*a'*, 110*b'* are generally equal in size.

Similar to the cable spool assembly 62, the cable spool assembly 62' is adapted to rotate relative to the tray 60'. In the depicted embodiment, the cable spool assembly 62' is rotatably engaged to the base panel 64' of the tray 60'. The cable spool assembly 62' includes a stored position (shown in FIGS. 30-31). In one embodiment, the cable spool assembly 62' can be releasably secured in the stored position. The cable spool assembly 62' is adapted to be rotated from the stored position to deploy fiber optic cable wrapped about the cable spool assembly 62'.

The cable spool assembly 62' can include the hub 120, a first flange 122' engaged to the hub 120 and a second flange 124' engaged to the hub 120 opposite the first flange 122'. In the subject embodiment, the first flange 122' is fastened (e.g., screwed, bolted, riveted, welded, bonded, etc.) to the first surface 128 of the hub 120. The first flange 122' is generally planar and oval in shape. In the depicted embodiment, the second flange 124' is fastened (e.g., screwed, bolted, riveted, welded, bonded, etc.) to the second surface 130 of the hub 120.

The second flange 124' includes a central opening 148' that extends through the second flange 124'. The central opening 148' is adapted to receive the strain relief protrusion 140 of the hub 120 when the second flange 124' is engaged to the hub 120 so that the strain relief protrusion 140 extends outwardly from the second flange 124' of the cable spool assembly 62'. In the depicted embodiment, the central opening 148' is oversized to allow the fiber optic cable which passes through the cable transition notch 142 to pass through the central opening 148'.

The second flange 124' includes an outer surface 150'. The outer surface 150' includes a cable management area 152' and a termination area 154' disposed adjacent to the cable management area 152'.

The cable management area 152' includes a plurality of fan-out mounting features 156'. The fan-out mounting features 156' are spaced apart to receive one or more fan-outs 158', similar to the fan-out 158, which separates optical fibers of a fiber optic cable. As depicted, the fan-out mounting features 156' extend outwardly from the outer surface 150' of the second flange 124'. In the depicted embodiment, the fan-out mounting features 156' extend outwardly in a generally perpendicular direction. As depicted, the fan-out mounting features 156' can include a post and a fastening arrangement (e.g., a stud and a nut). Referring now to FIG. 31, the fan-out 158' is retained by the fan-out mounting feature 156' and a nut. The fan-out 158' includes at least one mounting hole. As depicted, the fan-out 158' includes two mounting holes with one mounting hole mounted over the post and the other mounting hole mounted over the stud of the mounting feature 156'.

Referring now to FIGS. 30-34, the termination area 154' includes an adapter module 190' (e.g., a termination unit, etc.). The adapter module 190' is adapted to rotate in unison with the cable spool assembly 62' and to slide relative to the second flange 124'. The adapter module 190' is adapted to slide relative to the second flange 124' in a direction that is generally parallel to the second flange 124' between a retracted position (shown in FIGS. 30-32) and an extended position (similar to that shown in FIG. 20). In the depicted embodiment, the adapter module 190' is adapted to slide in a direction that is generally parallel to a front-to-back direction F-B'. In certain embodiments, the cable spool assembly 62' will not be able to rotate 360 degrees (i.e., rotate through a full revolution) with the adapter module 190' in the extended position. With the adapter module 190' in the extended position, the adapter module 190', and particularly corners of the adapter module 190', may interfere with the first and second side portions 70', 72' of the base panel 64' and/or interfere with the chassis 12.

Figure 32:
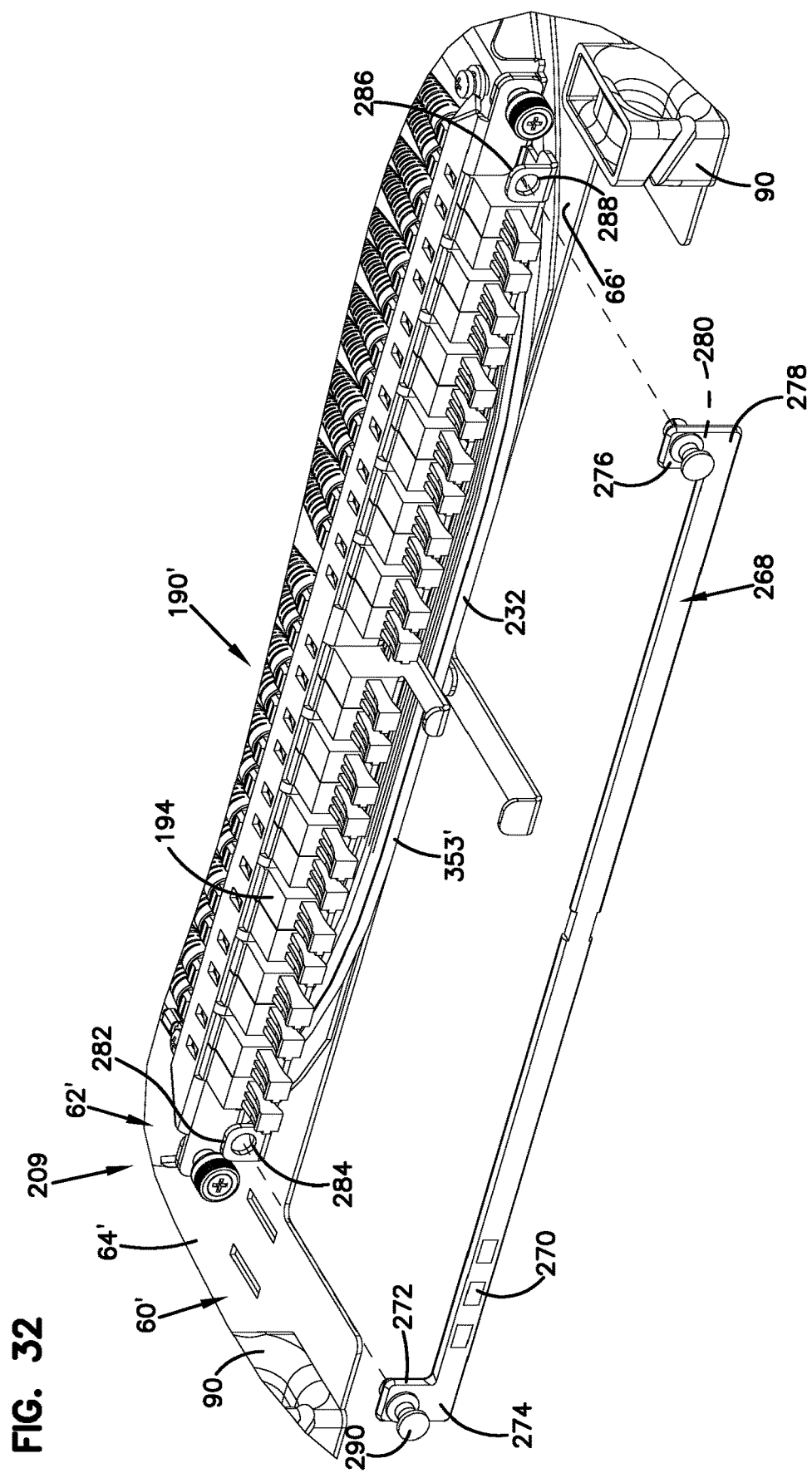
FIG. 32 is an exploded partial perspective view of the tray assembly of FIG. 30.

As illustrated at FIGS. 32-34, the adapter module 190' includes a carrier 192' and a plurality of adapters 194 disposed in the carrier 192'. In the depicted embodiment, the carrier 192' includes a first rail 196*a'* and a second rail 196*b'*.

Each of the first and second rails 196a', 196b' includes a first axial end 198' and a second axial end 200'. The carrier 192' further includes a cross-support 202' that extends between the first and second rails 196a', 196b' at a location between the first and second axial ends 198', 200'.

The first and second rails 196a', 196b' of the carrier 192' each include a slot 197 that extends in the front-to-back direction F-B'. Fasteners 199 attach the adapter module 190' via the slots 197 to the cable spool assembly 62'. As depicted, the fasteners 199 attach the carrier 192' to the second flange 124' at fastening holes in the second flange 124'. The fasteners 199 allow the adapter module 190' to travel between the retracted position and the extended position with the fasteners 199 loosened and can provide stops at the retracted position and the extended position. The adapter module 190' may be secured at the retracted position, the extended position, or an intermediate position by tightening the fasteners 199.

Figure 30:
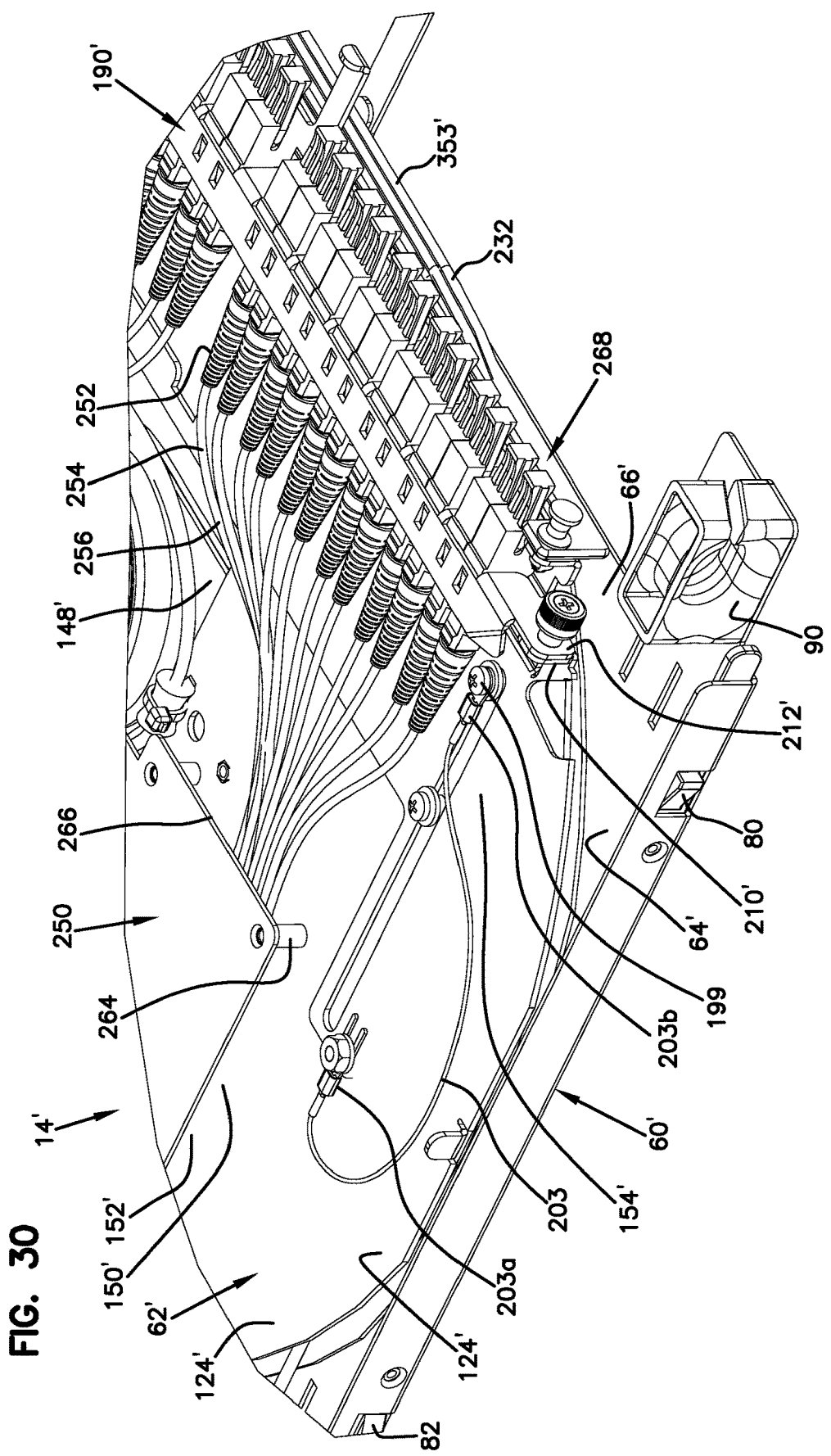
FIG. 30 is a partial perspective view of a tray assembly suitable for use with the telecommunications assembly of FIG. 2.

As illustrated at FIG. 33, an attachment location 201 can be included at the second axial end 200' of either or both of the first and second rails 196a', 196b' of the carrier 192'. As depicted at FIGS. 30 and 33, the attachment location 201 is a stud at the second axial end 200' of the second rail 196b'. The attachment location 201 is attached to a first end 203a of a tether 203. A second end 203b of the tether 203 is attached to the second flange 124' by one of the fasteners 199. As depicted, the second end 203b is attached by one of the fasteners 199 closest to an adapter mounting bracket 204' of the carrier 192'.

The tether 203 provides electrical grounding to the adapter module 190' from the cable spool assembly 62'. The cable spool assembly 62' can be grounded to the tray 60' by the locking mechanism 240 in a manner similar to the grounding of the cable spool assembly 62 to the tray 60, described above. A separate ground can be provided between the tray 60' and the chassis 12, the chassis 12 and the rack 15, and/or the tray 60' and the rack 15. Thus, the adapter module 190', the cable spool assembly 62', the tray 60', the chassis 12, and the rack 15 may all be electrically connected.

The adapter mounting bracket 204' is engaged with the first axial ends 198' of the first and second rails 196a', 196b'. The adapter mounting bracket 204' defines a plurality of adapter openings 205' that is adapted to receive the plurality of adapters 194. In the depicted embodiment, the adapter openings 205' are arranged in a line that is generally perpendicular to the direction of slide movement of the adapter module 190' so that the direction of slide movement of the adapter module 190' is generally perpendicular to the line of adapters 194 mounted in the adapter mounting bracket 204'.

In one embodiment, the adapter mounting bracket 204' is adapted to receive twenty-four adapters 194. In another embodiment, the adapter mounting bracket 204' is adapted to receive twelve adapters 194. In another embodiment, the adapter mounting bracket 204' is adapted to receive forty-eight adapters 194.

The second flange 124' defines a plurality of mounting tabs 210' (see FIG. 30) that extend outwardly from a perimeter of the outer surface 150'. The mounting tabs 210' are adapted to abut mounts 212' that extend outwardly from the first axial ends 198' of the first and second rails 196a', 196b' when the adapter module 190' is in the retracted position. With the adapter module 190' in the retracted position, fasteners 214' (e.g., screws, bolts, rivets, thumb screws, etc.) disposed through the mounts 212' can be engaged to the mounting tabs 210' to retain the adapter module 190' in the retracted position. In the depicted embodiment, the fasteners 214' are captive thumb screws.

With the fasteners 214' disengaged from the mounting tabs 210', the adapter module 190' can be translated outwardly from the second flange 124' of the cable spool assembly 62' in a direction that is generally parallel to the front-to-back direction F-B' to the extended position. In one embodiment, the adapter module 190' has a range of travel of at least two inches. In another embodiment, the adapter module 190' is adapted to slide a distance that provides access to inward facing ports of the adapters 194 when the tray assembly 14' is engaged to the chassis 12. By providing access to the inward facing ports of the adapters 194, connectorized ends of fiber optic cables that are plugged into the inward facing ports of the adapters 194 can be removed and cleaned while the tray assembly 14' is engaged to the chassis 12.

In the extended position, a catch 216' abuts the cross-support 202' and prevents the adapter module 190' from moving farther outward from the second flange 124'. As depicted, the catch 216' extends outwardly from a perimeter of the second flange 124'.

As depicted at FIGS. 33 and 34, guiding tabs 207 are provided on the adapter module 190' to facilitate the rotation of the cable spool assembly 62' within and/or about the chassis 12. In particular, the depicted embodiment includes a pair of the guiding tabs 207 at opposite ends of the adapter mounting bracket 204'. The guiding tabs 207 are angled downwardly and positioned adjacent corners 209 of the cable spool assembly 62'. As the cable spool assembly 62' rotates within the chassis 12, the guiding tabs 207 prevent or reduce the potential of the corners 209 of the cable spool assembly 62' getting snagged and/or caught on various features, including the openings 52, 54, of the chassis 12. The guiding tabs 207 may be functional in both rotational directions of the cable spool assembly 62'.

As depicted at FIGS. 30 and 31, a cover 250 can be provided over the cable management area 152'. The cover 250 can cover or partially cover the optical fibers 233, the fan-outs 158', and other components and features in the cable management area 152'. By covering at least a portion of the cable management area 152', the optical fibers 233 are prevented or held back from becoming entangled as the tray assembly 14' is rotated within the chassis 12, 302 or inserted into the chassis 12, 302. By covering at least a portion of the cable management area 152', the fan-outs 158' and other components and features in the cable management area 152' are prevented from bumping against features and components of the chassis 12, 302 as the tray assembly 14' is rotated within the chassis 12, 302 or inserted into the chassis 12, 302. The cover 250 can serve as a guide to the optical fibers 233 and other optical fiber cables within and near the cable management area 152'. The optical fibers 233 and other optical fiber cables within and near the cable management area 152' can be sandwiched between the cover 250 and the outer surface 150' of the second flange 124'. An edge 266 of the cover 250 may be spaced from the adapter module 190' to allow connectors 252 of fiber optic cables 254 to be inserted and withdrawn from the adapter module 190' without removing the cover 250. The cover 250 and the adapter module 190' may effectively keep uncovered portions 256 of the fiber optic cables 254 in position and prevent their tangling.

The cover 250 can include a clearance relief 258 (e.g., a hole, a recess, a slot) around or near the hub 120. The cover 250 can include a clearance relief 260 (e.g., a hole, a recess, a slot) around or near the fan-outs 158'. The cover 250 can include a plurality of fastener holes 262 for attaching the cover 250 to the second flange 124'. The second flange 124' can include standoffs 264 for attaching the cover 250 to the second flange 124'. The standoffs 264 can space the cover 250 from the second flange 124'. The standoffs 264 can prevent the cover 250 from clamping the optical fibers 233, 254, the fan-outs 158', and other components and features in the cable management area 152' against the outer surface 150' of the second flange 124'. The standoffs 264 can be threaded standoffs. Fasteners (not shown) can be inserted through the fasteners holes 262 and into the standoffs 264 and thereby attach the cover 250 to the second flange 124'.

As depicted at FIGS. 30-32, a panel 268 can be provided on the adapter module 190'. FIGS. 30 and 31 show the panel 268 assembled and broken away to reveal the fiber optic cable 232 within the cable spool assembly 62'. FIG. 32 shows the panel 268 separated from the adapter module 190'. The panel 268 can serve as a place to affix labels 270 that relate to the adapter module 190'. For example, indices that relate to or number individual fiber optic adapters 194 can be appropriately positioned on the panel 268. The labels 270 can be pre-applied to or stamped on the panel 268 at a factory and/or can be applied by a service technician (e.g. as stickers). As depicted, the panel 268 is positioned below the fiber optic adapters 194 and covers a front portion of the cable spool assembly 62' and thereby covers a front portion of the fiber optic cable 232 that is within the cable spool assembly 62'. The panel 268 can thereby give the adapter module 190' and the tray assembly 14' a cleaner appearance by hiding or obscuring the fiber optic cable 232. The panel 268 can also protect the fiber optic cable 232.

As depicted, the panel 268 includes a first tab 272 at a first end portion 274 and a second tab 276 at a second end portion 278. Each of the tabs 272, 276 includes a fastening feature 280 (e.g., a hole). The adapter module 190' includes a first tab 282 with a fastening feature 284 (e.g., a hole) and also includes a second tab 286 with a fastening feature 288 (e.g., a hole). In the depicted embodiment, a push-in fastener 290 is mounted in each of the holes 280 of the tabs 272, 276. The panel 268 can be removably mounted to the adapter module 190' by inserting the push-in fasteners 290 of each of the tabs 272, 276 into their corresponding holes 284, 288. The push-in fasteners 290 may snap in and snap out of their corresponding holes 284, 288. The push-in fasteners 290 may be retained by the hole 280.

Referring now to FIGS. 35-37, a cable assembly 350' is shown. The cable assembly 350' includes the tray assembly 14, 14', or 14" mounted to a first cable spool $352_1$'. The first cable spool $352_1$' may be mounted to a second cable spool $352_2$'. Additional cable spools 352' can be added in like manner, as needed. As with the similar cable assembly 350, described above, the cable assembly 350' is adapted to provide a length of fiber optic cable 353' that is greater than the length that can fit around the cable spool assembly 62, 62' of the tray assembly 14, 14', 14". In the depicted embodiment, the cable spool 352' can hold a length of the fiber optic cable 353' that is generally equal to the lengths or range of lengths held by the cable spool 352, described above.

The cable spool 352' can be manufactured of materials similar to the materials used in the cable spool 352, described above. The cable spool 352' includes a drum 354', a first flange 356', and a second flange 358'. The flanges 356', 358' can be made of cardboard. The drum 354', the first flange 356', and the second flange 358' are generally respectively similar in form and function to the drum 354, the first flange 356, and the second flange 358, described above. The second flange 358' of the first cable spool $352_1$' may attach to the first flange 356' of the second cable spool $352_2$'.

The tray assembly 14, 14', 14" and the first cable spool $352_1$' of the cable assembly 350' are assembled similarly to the tray assembly 14 and the cable spool 352 of the cable assembly 350, described above.

The flanges 356', 358' each include a notch 366' similar to the notch 366, described above. The notch 366' allows the fiber optic cable 353' to pass from the drum $354_1$' to the drum $354_2$'. As the fiber optic cable 353' passes from the drum $354_1$' to the drum $354_2$', a transition in cable radius is made. In particular, adjacent the transition, the cable radius on the drum $354_1$' is at or near a large radius or a maximum radius, and the cable radius on the drum $354_2$' is at or near a small radius or a minimum radius. Guiding features 371 of the notch 366' keep the transition snag-free.

To deploy the fiber optic cable 353' from the cable assembly 350', the cable assembly 350' can be positioned relative to the telecommunications mount similar to the positioning of the cable assembly 350, described above. The fiber optic cable 353' is first paid out from the second cable spool $352_2$' (or the last cable spool 352'). The fiber optic cable 353' is pulled from the cable spool $352_2$', which causes rotation of the cable assembly 350', including the tray assembly 14, 14', 14", carried by the cable spool $352_1$'. When the second cable spool $352_2$' is empty of cable 353', the cable 353' corresponding to the transition is paid out, over/through the guiding features 371, followed by the cable 353' wrapped about the first cable spool $352_1$'. The details of paying out the cable 353' from the first cable spool $352_1$' and the cable spool assembly 62, 62' are similar to the paying out of cable 353 from the cable spool 352 and the cable spool assembly 62, described above.

To facilitate unwinding and winding of the cable 353', the spindle/rotation structure 370 may be employed (see FIG. 35). The spindle structure 370 includes a base 372 and a rotation mount 374. As depicted, the rotation mount 374 is a shaft. The cable assembly 350' preferably includes a bushing or bearing 376 adapted to rotatably mount over the shaft 374. As depicted, the bearing 376 is positioned on the second flange 358'. As depicted, the spindle structure 370 is positioned opposite the tray assembly 14, 14', 14" about the cable assembly 350'. In other embodiments, the spindle structure 370 is positioned adjacent the tray assembly 14, 14', 14". The rotation mount 374 can mount to the bushing 222 of the tray assembly 14, 14', 14" (e.g., within an inside diameter of the bushing 222, as shown at FIG. 22). To reduce rotational friction, anti-friction features 378 can be included on the second flange 358'. The anti-friction features 378 may be made from Teflon® or other suitable material with a sufficiently low coefficient of friction. As depicted, the anti-friction features 378 may ride/glide on the base 372. The anti-friction features 378 may provide stability to the cable assembly 350'. The anti-friction features 378 may act as thrust bushings. Other thrust bushings (e.g. flange type) can also or alternatively be used.

The spindle/rotation structure 370 may be set on a floor, a cabinet, or other suitable structure when unwinding or winding the cable 353' from the cable spool 352'. The spindle/rotation structure 370 may be reused.

The cable spools 352' are removed from the tray assembly 14, 14', 14" after the cable 353' has been removed from them. The cable spools 352' and the tray assembly 14, 14', 14" are respectively disposed of and installed similar to the cable spool 352 and the tray assembly 14, discussed above.

The cable assembly 350' provides advantages in stocking, shipping, storing, and deploying the fiber optic cable 353'. In particular, the cable assembly 350' can be factory pre-built and stocked in several discrete configurations of varying length. The pre-building can include applying terminations 353c (e.g., connectors) to the fiber optic cable 353'. Each of the pre-built cable assemblies 350' can be deployed to a range of installations with a range of length requirements for the fiber optic cable 353'. In general, the minimum cable length installation that the cable assembly 350' could service would include a deployed cable length about equal to the length of the cable 353' initially wound on the cable spool(s) 352'. In general, the maximum cable length installation that the cable assembly 350' could service would include a deployed cable length about equal to the length of the cable 353' initially wound on the cable spool(s) 352' plus the length of the cable 353' initially wound on the cable spool assembly 62, 62'. Installation lengths between the minimum and the maximum cable length installation could be serviced without applying the fiber optic terminations 353c in the field. As a range of cable installation lengths can be serviced by a single cable assembly 350' part number, the cable assembly 350' can be factory pre-built. A few discrete cable assemblies 350' of different deployed cable length ranges can therefor service a wide variety of installations.

The cable assembly 350' allows post-installation flexibility. In particular, if a telecommunications component needs to be moved or the deployed cable 353' of the cable assembly 350' needs to be connected at a substantially different location, within the range of the cable 353' initially wound on the cable spool assembly 62, 62', the fiber optic cable 353' can be taken in or paid out from the cable spool assembly 62, 62'.

A discrete length of the cable 353' is stored and deployed from the cable spool(s) 352'. This discrete length can be roughly matched to a given installation. Preferably, the discrete length of the cable 353' from the cable spool(s) 352' is somewhat shorter than the total length of deployed cable 353' required at the given installation. A discrete length of the cable 353' is stored on the cable spool assembly 62, 62'. However, a variable length of this cable 353' can be deployed to exactly match (i.e., fine tune) the total length of the deployed cable 353' to the requirements of the given installation.

The cable assembly 350' is depicted at FIGS. 35-37 including the cable spool 352'. In other embodiments, other spool assemblies may be used. For example, the spool assemblies disclosed at U.S. provisional patent application Ser. No. 61/370,070, filed Aug. 2, 2010, incorporated by reference above, can be included in certain embodiments. In still other embodiments, the cable spool 352, described above, can be included.

Figure 39:
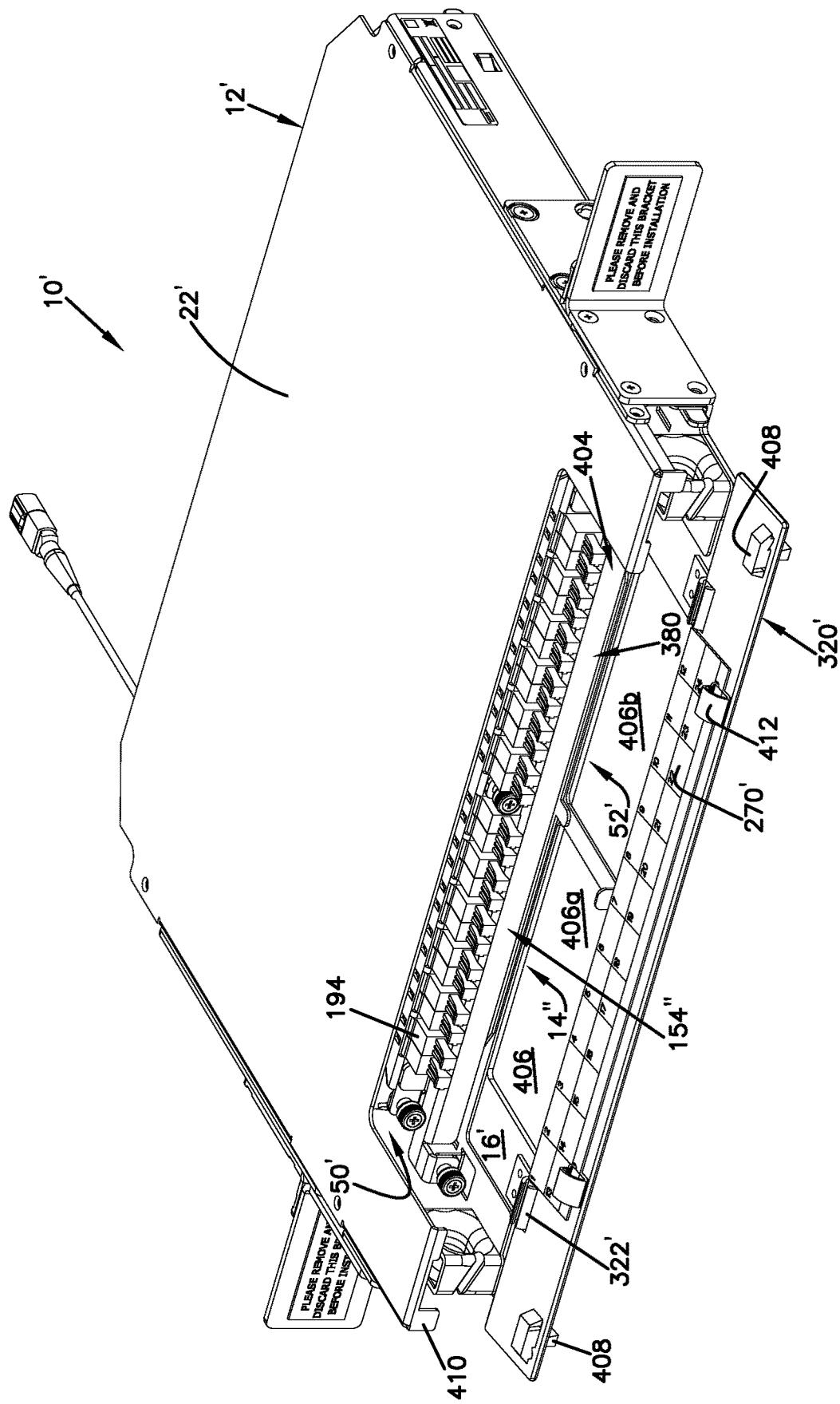
FIG. 39 is a perspective view of the telecommunications assembly of FIG. 38.

Referring now to FIGS. 38 and 39, a telecommunications assembly 10' is shown. The telecommunications assembly 10' is adapted for mounting to the telecommunications rack 15 (see FIG. 1). The telecommunications assembly 10' is similar to the telecommunications assembly 10, described above, and includes a chassis 12', similar to the chassis 12, and a tray assembly 14", similar to the tray assemblies 14, 14', that removably mounts in the chassis 12'. Similar to the chassis 12, the chassis 12' includes a first opening 52' and a second opening 54' (see FIG. 40). As depicted, a cover 22' of the chassis 12' and a base 16' of the chassis 12' are adjacent the first opening 52' and the second opening 54' and are also adjacent an interior region 50' of the chassis 12'. As depicted, the cover 22' is positioned opposite the base 16' about the interior region 50'. The tray assembly 14" is adapted for insertion into the chassis 12' through either the first opening 52' or the second opening 54' of the chassis 12' and into the interior region 50'. In the depicted embodiment, the first opening 52' is a front opening, and the second opening 54' is a back opening. In the depicted embodiment, the second opening 54' is oppositely disposed from the first opening 52'.

As depicted, an access opening 404 is formed by the cover 22', and an access opening 406 is formed by the base 16'. The access opening 406 can include a first region 406a and a second region 406b. The access openings 404, 406 can be adjacent the first opening 52'. In other embodiments, the access openings 404, 406 can be separated from the first opening 52'. The access opening 404 provides access to an adapter module 190" of a termination area 154". The adapter module 190" is similar to the adapter modules 190 and 190', described above, and the termination area 154" is similar to the termination areas 154 and 154', also described above. The access openings 404, 406 allow fiber optic cables to be routed to the adapter module 190" and thereby allow the fiber optic cables to be connected to the fiber optic adapters 194 mounted in the adapter module 190". The access opening 404 allows the fiber optic cables to be routed adjacent and/or through the cover 22', and the access opening 406 allows the fiber optic cables to be routed adjacent and/or through the base 16'. The fiber optic cables can thereby be routed to other areas about the telecommunications rack 15. Thus, fiber optic cables can be routed to the adapter module 190" from above and/or below the telecommunications assembly 10'.

In certain embodiments, the telecommunications assembly 10' includes a front cover plate 320'. The front cover plate 320' is engaged to a hinge 322'. In the depicted embodiment, the hinge 322' is connected between the front cover plate 320' the base 16'. The hinge 322' can be similar in form and function to the hinge 322, described above. In the depicted embodiment, the front cover plate 320' is adapted to pivot between an open position (shown at FIGS. 38 and 39) and a closed position (shown at FIG. 40). As depicted, when in the closed position, the front cover plate 320' extends between the cover 22' and the base 16' and substantially covers the interior region 50' from a front side. As depicted, when in the closed position, the front cover plate 320' substantially covers the first opening 52' from the front side. The front cover plate 320' can be held in the closed position by latches 408. As depicted, the latches 408 can engages tabs 410 of the cover 22'.

The front cover plate 320' can include labels 270'. The labels 270' can be similar in form and function to the labels 270, described above. As depicted, the labels 270' can be associated with individual fiber optic adapters 194. As depicted, the labels 270' can be viewed when the front cover plate 320' is in the open position. As depicted, the front cover plate 320' does not cover the access openings 404, 406. A clip 412 of the front cover plate 320' can be used to hold the labels 270'.

The telecommunications assembly 10' includes a panel 380 (i.e., a bracket and/or a cover). The panel 380 includes a first fastening location 382 and a second fastening location 384. As depicted, the first fastening location 382 is adjacent a first end portion 386 of the panel 380, and the second fastening location 384 is at or near a center portion 388. The center portion 388 is positioned between the first end portion 386 and a second end portion 390. The panel 380 can be mounted to the telecommunications assembly 10'. In particular, the first fastening location 382 is joined to an attachment location 392 of the tray assembly 14", and the second fastening location 384 is joined to an attachment location 394 of the tray assembly 14". In the depicted embodiment, the attachment location 394 is located on the adapter module 190" of the termination area 154". In the depicted embodiment the fasteners 214', described above, are used at the fastening locations 382, 384.

The mounting of the panel 380 to the telecommunications assembly 10' can achieve one or more functions. In particular, a first function is providing a locking mechanism adapted to prevent a cable spool assembly 62" of the tray assembly 14", with the attachment location 394, and a tray 60" of the tray assembly 14", with the attachment location 392, from rotating relative to each other. A second function is providing an electrical connection between the attachment location 392 of the tray 60" and the attachment location 394 of the cable spool assembly 62", and thus electrically ground the cable spool assembly 62" and/or the adapter module 190". A third function is to provide stops 396, 398 that are adapted to prevent the cable spool assembly 62" and the tray 60" from rotating relative to each other. A fourth function is to provide a mounting area 400 for mounting labels 270". The labels 270" can be similar in form and function to the labels 270, 270' described above. A fifth function is to provide a cover 402 that covers the fiber optic cable 232 or a portion of the fiber optic cable 232 within the cable spool assembly 62".

As depicted, the panel 380 has an "L" shaped configuration extending from the first end portion 386 to the second end portion 390. As depicted the first fastening location 382, the second fastening location 384, and the stops 396, 398 can be formed from tabs that extend from the "L" shaped extrusion.

The panel 380 may be used in applications with restricted access to the rear of the telecommunications assembly 10' (e.g., in outdoor applications). For example, in applications where access to the second opening 54' is restricted and/or blocked, the panel 380, which can be mounted through the first opening 52', can be used to lock and/or ground the cable spool assembly 62" and thereby avoid using a lock and/or a grounding member at or near the second opening 54'.

Figure 40:
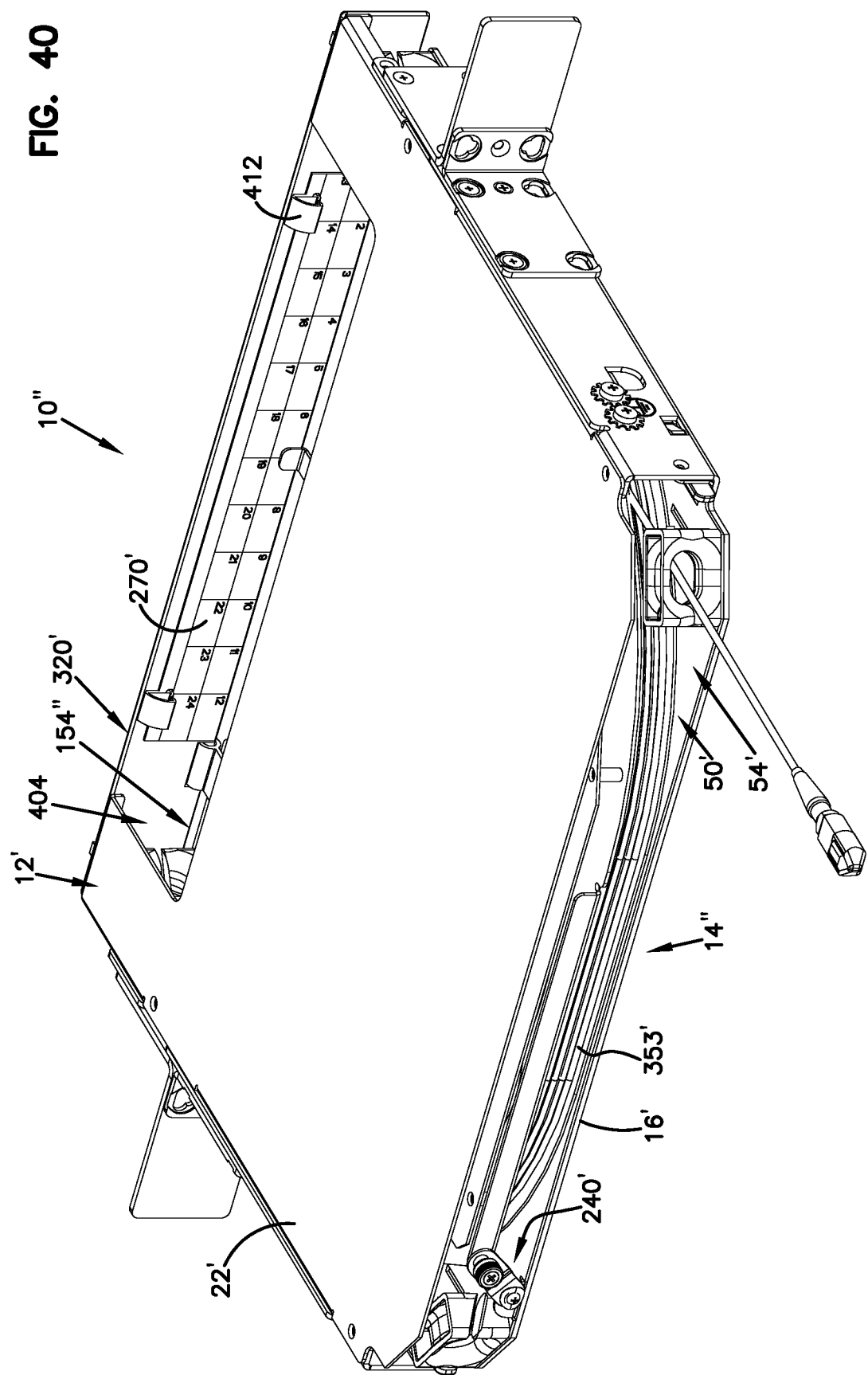
FIG. 40 is a perspective view of a telecommunications assembly having exemplary features of aspects in accordance with the principles of the present disclosure.

Referring now to FIG. 40, a telecommunications assembly 10" is shown. As depicted, the telecommunications assembly 10" is a reconfiguration of the telecommunications assembly 10'. In particular, a locking mechanism 240' is included. The locking mechanism 240' is similar to the locking mechanism 240, described above. The locking mechanism 240' is adapted to prevent the cable spool assembly 62" from rotating relative to the tray 60". In one embodiment, the locking mechanism 240' provides an electrical connection between the tray 60" and the cable spool assembly 62" so as to serve as a ground. The locking mechanism 240' may be used in applications with access to the second opening 54' and/or the rear of the telecommunications assembly 10" (e.g., in indoor applications). The telecommunications assembly 10" may or may not include the panel 380.

The present disclosure describes components and embodiments that are similar to other components and embodiments. The various features and components of one embodiment may also be included in other embodiments, where appropriate.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A telecommunications apparatus comprising:
a panel housing having a top wall, a bottom wall, two opposite sides, a front end, and a rear end, that together define a panel interior, the panel housing having a front opening that provides access to the panel interior;
an adapter module accessible at the front opening of the panel housing, the adapter module including at least twelve adapters;
a cable deployment assembly mounted within the panel interior of the panel housing, the cable deployment assembly being adapted to slide in a rearward direction to a retracted position, the cable deployment assembly being movable relative to the panel housing in a direction that is generally parallel to the panel housing, wherein when in the retracted position, the cable deployment assembly extends partially out the rear end of the panel housing, and, wherein the adapter module is adapted to be moved in a forward direction relative to the cable deployment assembly out the front opening;
a length of fiber optic cable stored on the cable deployment assembly, the fiber optic cable having a first end and a second end, the fiber optic cable including a jacket containing at least one optical fiber; and
a fiber optic connector coupled to the at least one optical fiber at the first end of the fiber optic cable, the fiber optic cable being payable from the panel interior of the panel housing by pulling the second end of the fiber optic cable from the cable deployment assembly through the rear end of the panel housing.

2. The telecommunications apparatus of claim 1, wherein the adapter module is slidable relative to the panel housing.

3. The telecommunications apparatus of claim 1, wherein the adapter module includes a first side and a second side, the first side of the adapter module being accessible from the front end of the panel housing at the front opening.

4. The telecommunications apparatus of claim 3, wherein the adapter module is movable out the front opening of the panel housing to provide access to the second side of the adapter module.

5. The telecommunications apparatus of claim 3, wherein the at least one optical fiber includes a plurality of optical fibers, wherein the plurality of optical fibers are broken-out from the jacket and incorporated into separate pigtails having connectorized ends.

6. The telecommunications apparatus of claim 5, wherein the adapter module includes ports at the second side for receiving fiber optic connectors that connectorize the ends of the separate pigtails.

7. The telecommunications apparatus of claim 5, further comprising a fan-out member for providing a transition between the jacketed fiber optic cable and the pigtails, the fan-out member being coupled to the panel housing.

8. The telecommunications apparatus of claim 1, wherein the panel housing includes a pivotal front door for opening and closing the front opening.

9. The telecommunications apparatus of claim 1, wherein the panel housing is adapted for connection to a telecommunications rack.

10. The telecommunications apparatus of claim 1, further comprising a mounting bracket positioned at the two opposite sides of the panel housing, the mounting bracket being generally L-shaped.

11. A telecommunications device comprising:
a housing with a front opening and a rear opening;
an adapter module mounted at the front opening of the housing, the adapter module including at least twelve adapters;
a cable deployment assembly positioned within the housing which is accessible via the rear opening, the cable deployment assembly being adapted to slide in a rearward direction to a retracted position, the cable deployment assembly being movable relative to the housing in a direction that is generally parallel to the housing, wherein when in the retracted position, the cable deployment assembly extends partially out the rear opening of the housing, and wherein the adapter module is adapted to be moved forwardly relative to the cable deployment assembly out the front opening;
a length of fiber optic cable stored about the cable deployment assembly, the fiber optic cable having a first end and a second end, the fiber optic cable including a jacket containing at least one optical fiber; and
a mounting bracket positioned at opposite sides of the housing for mounting the housing to a telecommunications rack;
the fiber optic cable being payable from the cable deployment assembly from inside the housing by pulling the second end of the fiber optic cable from the cable deployment assembly through the rear opening of the housing.

12. The telecommunications device of claim 11, wherein the adapter module is slidable relative to the housing.

13. The telecommunications device of claim 11, wherein the adapter module includes a first side and a second side, the first side of the adapter module being accessible from the front opening of the housing.

14. The telecommunications device of claim 13, wherein the adapter module is movable out the front opening of the housing to provide access to the second side of the adapter module.

15. The telecommunications device of claim 11, wherein the housing includes a pivotal front door for opening and closing the front opening.

16. A telecommunications device comprising:
a housing with a front opening and a rear opening, the front opening of the housing including a first opening and a second opening;
first and second sets of adapters, the first and second sets of adapters being respectively mounted at the first and second openings, the first and second sets of adapters being aligned in a single row at the front opening of the housing, and the first and second sets of adapters being separated by a gap;
a cable deployment assembly positioned within the housing which is accessible via the rear opening, the cable deployment assembly being adapted to slide in a rearward direction to a retracted position, the cable deployment assembly being movable relative to the housing in a direction that is generally parallel to the housing, wherein when in the retracted position, the cable deployment assembly extends partially out the rear opening of the housing;
a length of fiber optic cable stored about the cable deployment assembly, the fiber optic cable having a first end and a second end, the fiber optic cable including a jacket containing at least one optical fiber; and
a mounting bracket positioned at opposite sides of the housing for mounting the housing to a telecommunications rack;
the fiber optic cable being payable from the cable deployment assembly from inside the housing by pulling the second end of the fiber optic cable from the cable deployment assembly through the rear opening of the housing.

17. The telecommunications device of claim 16, wherein the housing includes a pivotal front door for opening and closing the front opening.

18. A telecommunications apparatus comprising:
a housing adapted to be mounted to a telecommunications rack, the housing having a top wall, a bottom wall, two opposite sides, a front end, and a rear end, that together define an interior, the housing having a front opening that provides access to the interior;
a cable deployment assembly mountable within the housing in a housed position, the cable deployment assembly being slidable relative to the housing in a rearward direction from the housed position to cause at least a portion of the cable deployment assembly to extend rearwardly beyond the rear end of the housing;
an adapter module that mounts to the cable deployment assembly such that the adapter module is carried with the cable deployment assembly when the cable deployment assembly is slid within the housing, the adapter module including at least twelve fiber optic adapters each having a front port and a rear port, the adapter module mounting to the cable deployment assembly such that the front ports of the fiber optic adapters are accessible from the front of the housing when the cable deployment assembly is in the housed position, the adapter module being forwardly movable relative to the cable deployment assembly to provide access to the rear ports of the fiber optic adapters from the front end of the housing while the cable deployment assembly is in the housed position;
a length of fiber optic cable stored on the cable deployment assembly, the fiber optic cable including a jacket containing a plurality of optical fibers, the plurality of optical fibers having first ends that are connectorized by single fiber connectors that plug into the rear ports of the fiber optic adapters; and
a multi-fiber connector coupled to second ends of the plurality of optical fibers, the multi-fiber connector terminating an end of the fiber optic cable, the fiber optic cable being payable from the interior of the housing while the cable deployment assembly is in the housed position by pulling the end of the fiber optic cable terminated by the multi-fiber connector from the cable deployment assembly through the rear end of the housing.

* * * * *